(12) United States Patent
Barde et al.

(10) Patent No.: US 8,074,287 B2
(45) Date of Patent: Dec. 6, 2011

(54) RENEWABLE AND INDIVIDUALIZABLE ELEMENTS OF A PROTECTED ENVIRONMENT

(75) Inventors: Sumedh N. Barde, Redmond, WA (US); Rebecca Claire Weiss, Charlottesville, VA (US); Alexandre V. Grigorovitch, Redmond, WA (US); Chaitanya Dutt Upadhyay, Kirkland, WA (US); Reid Joseph Kuhn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/191,448

(22) Filed: Jul. 28, 2005

(65) Prior Publication Data
US 2005/0268115 A1    Dec. 1, 2005

Related U.S. Application Data

(63) Continuation-in-part of application No. 10/835,951, filed on Apr. 30, 2004, now Pat. No. 7,500,267, and a continuation-in-part of application No. 11/116,598, filed on Apr. 27, 2005.

(51) Int. Cl.
*G06F 7/04* (2006.01)

(52) U.S. Cl. ......................................................... 726/29

(58) Field of Classification Search ..................... 726/29
See application file for complete search history.

(56) References Cited

U.S. PATENT DOCUMENTS

| | | | |
|---|---|---|---|
| 4,183,085 A | 1/1980 | Roberts et al. | |
| 4,405,829 A | 9/1983 | Rivest et al. | |
| 5,050,213 A | 9/1991 | Shear | |
| 5,303,370 A | 4/1994 | Brosh et al. | |
| 5,457,699 A | 10/1995 | Bode et al. | |
| 5,509,070 A | 4/1996 | Schull | |
| 5,636,292 A | 6/1997 | Rhoads | |
| 5,638,513 A | 6/1997 | Ananda | |
| 5,715,403 A | 2/1998 | Stefik | |
| 5,721,788 A | 2/1998 | Powell et al. | |
| 5,799,088 A | 8/1998 | Raike | |
| 5,825,877 A | 10/1998 | Dan et al. | |
| 5,943,248 A | 8/1999 | Clapp | |
| 6,058,476 A | 5/2000 | Matsuzaki et al. | |
| 6,157,721 A | 12/2000 | Sibert et al. | |
| 6,298,446 B1 | 10/2001 | Schreiber et al. | |
| 6,327,652 B1 * | 12/2001 | England et al. | 713/2 |
| 6,334,189 B1 | 12/2001 | Granger et al. | |
| 6,409,089 B1 | 6/2002 | Eskicioglu | |
| 6,442,690 B1 | 8/2002 | Howard et al. | |
| 6,671,803 B1 | 12/2003 | Pasieka | |
| 6,850,252 B1 | 2/2005 | Hoffberg | |
| 6,895,504 B1 * | 5/2005 | Zhang et al. | 713/175 |
| 7,043,633 B1 | 5/2006 | Fink et al. | |

(Continued)

FOREIGN PATENT DOCUMENTS

EP    1120967    8/2001

(Continued)

OTHER PUBLICATIONS

International Search Report for PCT/US05/30489 mailed Aug. 2, 2007. 9 Pages.
Kuan-Ting Shen et al., "A New Digital Watermarking Technique for Video," Recent Advances in Visual Information Systems, 5th International Conference, VISUAL 2002, Proceedings, Hsin Chu, Taiwan, Mar. 11-13, 2002, 2314, 269-275.
Lotspiech, J. et al., "Broadcast Encryption's Bright Future," Computer, 2002, 35 (8), 57-63.

(Continued)

*Primary Examiner* — Jeffrey D Popham

(57) ABSTRACT

Systems and methods for providing a protected computing environment comprising separating out a protected environment management component from a kernel of a computing device, providing identification information as a part of the protected environment management component, and providing individualization information as part of the protected environment management component.

15 Claims, 34 Drawing Sheets

U.S. PATENT DOCUMENTS

| | | | |
|---|---|---|---|
| 7,103,574 B1 | 9/2006 | Peinado et al. | |
| 7,124,938 B1 | 10/2006 | Marsh | |
| 7,213,266 B1 | 5/2007 | Maher et al. | |
| 7,222,062 B2 | 5/2007 | Goud et al. | |
| 7,233,948 B1 | 6/2007 | Shamoon et al. | |
| 7,254,836 B2 | 8/2007 | Alkove | |
| 7,296,154 B2 | 11/2007 | Evans | |
| 7,296,296 B2 | 11/2007 | Dunbar | |
| 7,343,496 B1 | 3/2008 | Hsiang et al. | |
| 7,353,209 B1 | 4/2008 | Peinado | |
| 7,376,976 B2 | 5/2008 | Fierstein | |
| 7,426,752 B2 | 9/2008 | Agrawal et al. | |
| 7,441,121 B2 | 10/2008 | Cutter | |
| 7,500,267 B2 | 3/2009 | McKune et al. | |
| 7,526,649 B2 | 4/2009 | Wiseman et al. | |
| 7,552,331 B2 | 6/2009 | Evans | |
| 7,558,463 B2 | 7/2009 | Jain | |
| 7,584,502 B2 | 9/2009 | Alkove | |
| 7,590,841 B2 | 9/2009 | Sherwani | |
| 7,617,401 B2 | 11/2009 | Marsh et al. | |
| 7,653,943 B2 | 1/2010 | Evans | |
| 7,665,143 B2 | 2/2010 | Havens | |
| 7,703,141 B2 | 4/2010 | Alkove | |
| 7,739,505 B2 | 6/2010 | Reneris | |
| 7,752,674 B2 | 7/2010 | Evans | |
| 7,810,163 B2 | 10/2010 | Evans | |
| 7,903,117 B2 | 3/2011 | Howell | |
| 2001/0021252 A1 | 9/2001 | Carter et al. | |
| 2001/0044782 A1 | 11/2001 | Hughes et al. | |
| 2002/0049679 A1 | 4/2002 | Russell et al. | |
| 2002/0095603 A1 | 7/2002 | Godwin et al. | |
| 2003/0005335 A1 | 1/2003 | Watanabe | |
| 2003/0065918 A1 | 4/2003 | Willey | |
| 2003/0069981 A1 | 4/2003 | Trovato | |
| 2003/0120935 A1 | 6/2003 | Teal et al. | |
| 2003/0133576 A1 | 7/2003 | Grumiaux | |
| 2003/0185395 A1 | 10/2003 | Lee et al. | |
| 2003/0188179 A1* | 10/2003 | Challener et al. | 713/193 |
| 2003/0200336 A1 | 10/2003 | Pal et al. | |
| 2004/0003268 A1 | 1/2004 | Bourne et al. | |
| 2004/0003269 A1 | 1/2004 | Waxman et al. | |
| 2004/0003270 A1 | 1/2004 | Bourne et al. | |
| 2004/0107356 A1 | 6/2004 | Shamoon et al. | |
| 2004/0158742 A1 | 8/2004 | Srinivasan et al. | |
| 2004/0184605 A1 | 9/2004 | Soliman | |
| 2004/0205028 A1 | 10/2004 | Verosub et al. | |
| 2004/0225894 A1 | 11/2004 | Colvin | |
| 2005/0021992 A1 | 1/2005 | Aida et al. | |
| 2005/0044397 A1 | 2/2005 | Bjorkengren | |
| 2005/0138406 A1 | 6/2005 | Cox | |
| 2005/0149722 A1 | 7/2005 | Wiseman et al. | |
| 2005/0149729 A1* | 7/2005 | Zimmer et al. | 713/168 |
| 2005/0172121 A1 | 8/2005 | Risan et al. | |
| 2005/0210252 A1 | 9/2005 | Freeman et al. | |
| 2005/0268115 A1 | 12/2005 | Barde et al. | |
| 2005/0268174 A1 | 12/2005 | Kumagai | |
| 2006/0015732 A1 | 1/2006 | Liu | |
| 2006/0020821 A1 | 1/2006 | Waltermann et al. | |
| 2006/0020860 A1 | 1/2006 | Tardif et al. | |
| 2006/0045267 A1 | 3/2006 | Moore et al. | |
| 2006/0129496 A1 | 6/2006 | Chow et al. | |
| 2006/0149966 A1 | 7/2006 | Buskey et al. | |
| 2006/0156416 A1 | 7/2006 | Huotari et al. | |
| 2006/0173787 A1 | 8/2006 | Weber et al. | |
| 2006/0212945 A1* | 9/2006 | Donlin et al. | 726/29 |
| 2006/0242406 A1 | 10/2006 | Barde et al. | |
| 2006/0248594 A1 | 11/2006 | Grigorovitch et al. | |
| 2007/0058807 A1 | 3/2007 | Marsh | |
| 2009/0158036 A1 | 6/2009 | Barde et al. | |
| 2010/0177891 A1 | 7/2010 | Keidar et al. | |
| 2011/0128290 A1 | 6/2011 | Howell et al. | |

FOREIGN PATENT DOCUMENTS

| | | |
|---|---|---|
| GB | 2359969 | 9/2001 |
| WO | WO01/52020 | 7/2001 |
| WO | WO02/19598 | 3/2002 |
| WO | WO03073688 | 9/2003 |
| WO | WO03107588 | 12/2003 |

OTHER PUBLICATIONS

Memon, N. et al., "Protecting Digital Media Content," Communications of the ACM, 1998, 41 (7), 34-43.

Ripley, M. et al., "Content Protection in the Digital Home," Intel Technology J., 2002, 6(4), 49-56.

Steinebach, M. et al., "Digital Watermakring Basics—Applications—Limits," NFD Information—Wissenschaft und Praxis, Jul. 2002, 53(5), 261-268.

DMOD WorkSpace OEM Unique Features; http://www.dmod.com/oem_features.

International Search Report for PCT/US06/10664 mailed Oct. 23, 2007; 9 pages.

Arbaugh, et al.; "A Secure and Reliable Bootstrap Architecture"; IEEE Symposium on Security and Privacy; May 1971; pp. 65-71.

International Search Report for PCT/US06/10327 mailed Oct. 22, 2007; 7 pages.

International Search Report and Written Opinion for PCT/US05/30490 issued Sep. 18, 2007, 9 pgs.

European Search Report from EP03011235.3; Dec. 23, 2004; 7 pp.

Bajikar, S.; "Trusted Platform Module (TPM) based Security on Notebook PCs—White Paper"; Mobile Platforms Group Intel Corporation; Jun. 20, 2002; XP002259678; Retrieved form the Internet URL http://www.intel.com/design/mobile/platform/downloads/Trusted_Platform_Module_White_Paper.pdf.

Intel, IBM, Matsushita, Toshiba: "Content Protection System Architecture A comprehensive Framework for Content Protection"; Content Protection System Architecture; Feb. 17, 2000; XP02259679; Retrieved from the Internet URL http://www.4centity.com/data/tech/cpsa/cpsa081.pdf.

Menezes, A. et al.; "Handbook of Applied Cryptography"; 1997; CRC Press LLC; pp. 33 and 489-541.

Oh, Kyung-Seok, et al.; "Acceleration technique for volume rendering using 2D texture based ray plane casting on GPU"; 2006 International Conference on Computational Intelligence and Security; vol. 2; Nov. 3-6, 2006; pp. 1755-1758.

"Overview of Security of Windows Media Right Manager"; Microsoft; Dec. 3, 2001; URL: http://msdn.microsoft.com/ja-jp/library/dd148624.aspx.

Pearson, Siani et al.; "Trusted Computing Platforms: TCPA Technology in Context"; 2002; Prentice Hall Inc.; 347 pages.

Pruneda, Andrea; "Windows Media Technologies: Using Windows Media Rights Manager to Protect and Distribute Digital Media"; MDSN Magazine Japanese Version; ASCII Corporation, Japan; Jan. 18, 2002; No. 22; pp. 68-82.

Schneier, Bruce; "Applied Cryptography, Second Edition"; 1996; John Wiley and Sons Inc.; pp. 32-34 and 180.

Slusallek, P., et al.; "Vision—An Architecture for Global Illumination Calculations"; IEEE Transactions on Visualization and Computer Graphics; vol. 1, No. 1; Mar. 1995; pp. 77-96.

Zhao, Hua, et al.; "A New Watermarking Scheme for CAD Engineering Drawings"; 9th International Conference on Computer-Aided Industrial Design and Conceptual Design; CAID/CD 2008; Nov. 22-25, 2008; pp. 518-522.

"Windows Media Technologies: Using Windows Media Rights Manager to Protect and Distribute Digital Media"; Dec. 1, 2001; Retrieved from the Internet URL http://msdn.microsoft.com/msdnmag/issues/01/12/DRM/print.asp.

Shi, Changgui et al.; "A Fast MPEG Video Encryption Algorithm"; 1998; Bristol, UK; pp. 81-88.

CN Patent Appln. 200810189718.4; Second Office Action dated Apr. 13, 2011 (and English translation).

CN Patent Appln. 200810189719.9; Second Office Action dated Apr. 2, 2011 (and English translation).

* cited by examiner

FIG. 17

| Unique Identifier 1700 | Revocation Scope 1710 | Renewal URL 1720 | Other Information 1730 | | |
|---|---|---|---|---|---|
| | | | x | y z | n |
| Component A 1701 | Global 1711 | www.listor-ganizer.com 1721 | | | |
| Component B 1702 | Limited 1712 | www.com-ponentdev-eloper.com 1722 | | | |
| Component C 1703 | Media Content Type 1713 | www.com-ponentdev-eloper.com 1723 | | | |
| Yu2#abc 1704 | Media Source Type 1714 | www.media-object-owner.com 1724 | | | |
| GUID 1705 | Other 1715 | www.other.com 1725 | | | |
| List variation identifier 1750 | | | | | |
| Time of last list update T1 1760 | | | | | |

FIG. 18

Limited Revocation List 1871

| Unique Identifier 1700 | Renewal URL 1720 | Other Information 1831 | | |
|---|---|---|---|---|
| | | x | y | z | n |
| Component B 1702 | www.com-ponentdev-eloper.com 1722 | | | | |
| Component M 1810 | www.com-ponentdev-eloper.com 1813 | | | | |
| Component N 1811 | www.media-object-owner.com 1814 | | | | |
| Component O 1812 | www.other.com 1815 | | | | |
| List variation identifier 1851 | | | | | |
| Time of last list update T1 1861 | | | | | |

Global Revocation List 1870

| Unique Identifier 1700 | Renewal URL 1720 | Other Information 1830 | | |
|---|---|---|---|---|
| | | x | y | z | n |
| Component A 1701 | www.listor-ganizer.com 1721 | | | | |
| Component D 1806 | www.com-ponentdev-eloper.com 1826 | | | | |
| Component E 1807 | www.com-ponentdev-eloper.com 1827 | | | | |
| Component F 1808 | www.media-object-owner.com 1828 | | | | |
| Component G 1809 | www.other.com 1829 | | | | |
| List variation identifier 1850 | | | | | |
| Time of last list update T1 1860 | | | | | |

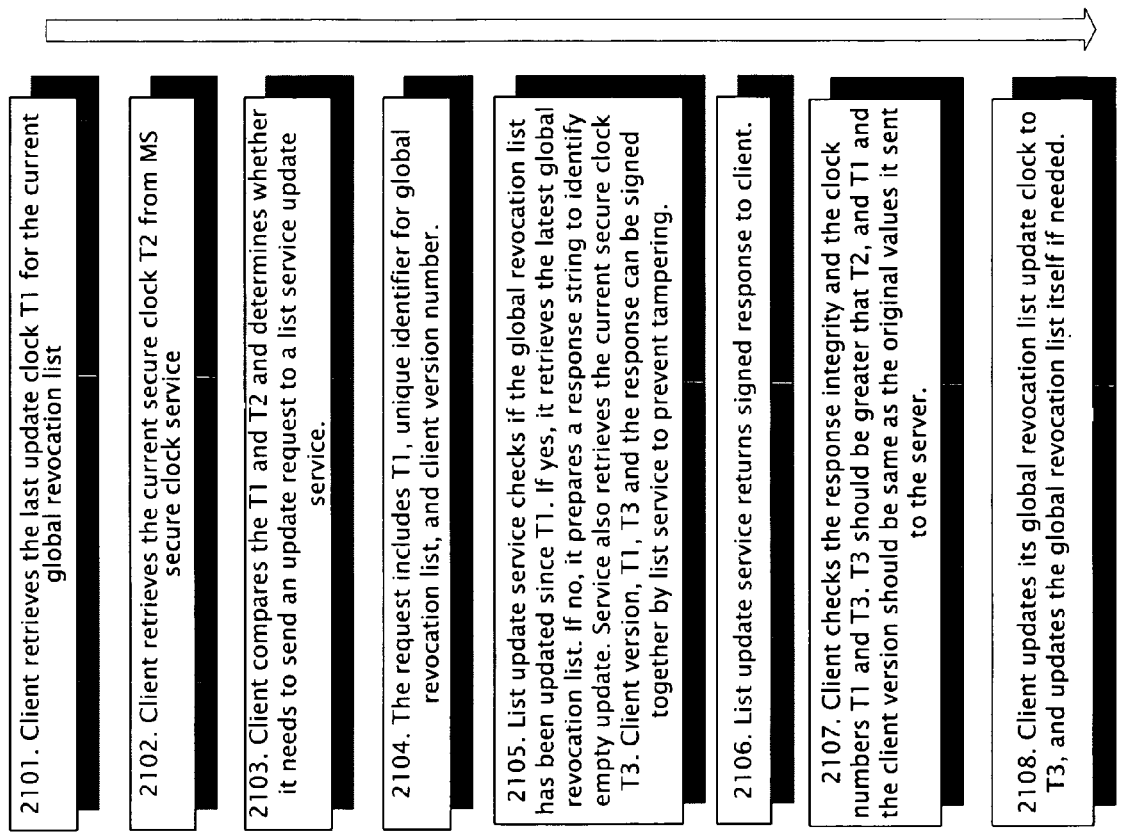
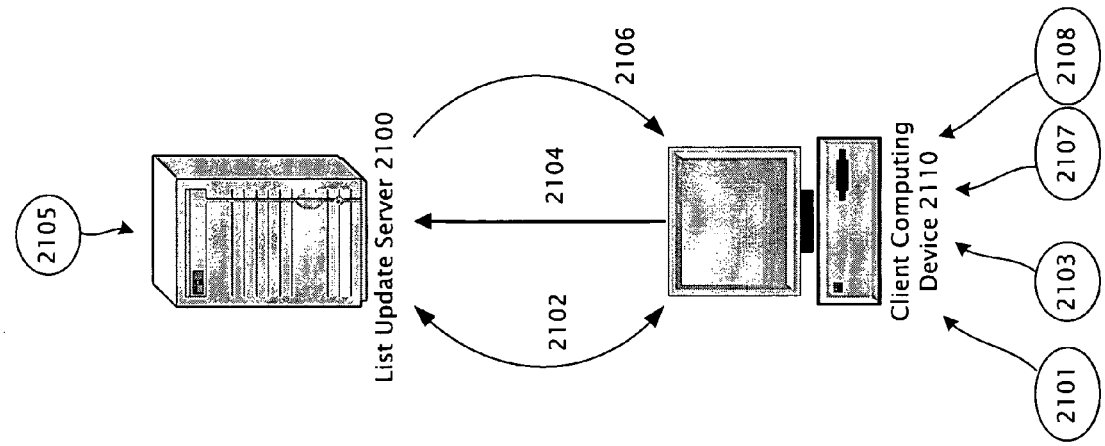
FIG. 21

PRIOR ART
FIG. 25
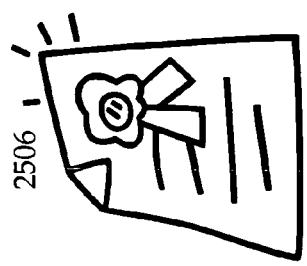
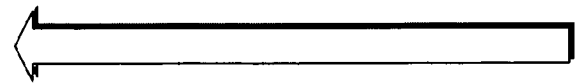
2506
2503
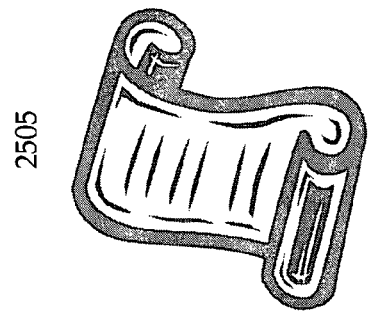
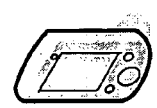
2505
2502
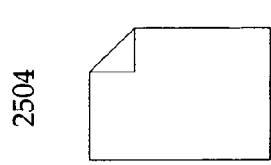
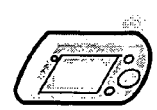
2504
2501

```
<DEVCERT version="1.0">
 <CERTIFICATE type="DEVICE">
  <DATA>
   <UNIQUEID private="1" />
   <PUBLICKEY private="1" />
   <KEYDATA />
  </DATA>
  <MSDRM_SIGNATURE_VALUE />
  <SYMSIGNATURE />
 </CERTIFICATE>
 <FALLBACK>
  <SECURITYVERSION>2.3.0.2</SECURITYVERSION>
  <CERTIFICATE private="1" />
 </FALLBACK>
 <CERTIFICATE type="GROUP">
  <DATA>
   <NAME>CoolNewDevice</NAME>
   <MANUFACTURER>FooInc.</MANUFACTURER>
   <MAKE>UnknownMake</MAKE>
   <DISTRIBUTOR>BarRetailersInc.</DISTRIBUTOR>
   <MODEL>XR-700</MODEL>
   <SECURITYLEVEL>1000</SECURITYLEVEL>
   <HARDWARE_VER_MAJOR>2</HARDWARE_VER_MAJOR>
   <HARDWARE_VER_MINOR>1</HARDWARE_VER_MINOR>
   <FIRMWARE_VER_MAJOR>1</FIRMWARE_VER_MAJOR>
   <FIRMWARE_VER_MINOR>3</FIRMWARE_VER_MINOR>
   <FEATURES>
    <TEMPLATE>0</TEMPLATE>
    <CLOCK>2</CLOCK>
    <SECURECLOCK>
     <URL>http://go.microsoft.com/fwlink/?LinkId=25817</URL>
     <PUBLICKEY>!CNhvvz1WaNV1AFUmetxkvm9iD4UrE9cnGUi!qcqdxMiXmD1*ikYGA==</PUBLICKEY>
    </SECURECLOCK>
    <METERING>1</METERING>
    <LICENSE_ACQ>1</LICENSE_ACQ>
    <LICENSE_SYNC>1</LICENSE_SYNC>
    <ENCRYPTION>1</ENCRYPTION>
   </FEATURES>
   <LIMITS>
    <MAXCHAINDEPTH>2</MAXCHAINDEPTH>
    <MAXLICENSESIZE>10240</MAXLICENSESIZE>
    <MAXHEADERSIZE>5120</MAXHEADERSIZE>
   </LIMITS>
   <PUBLICKEY>JCOnd9zBbmuXUGLRejnachQZ1mvnWkcyuqzCMFXK19cE1K9WaqIKiQ==</PUBLICKEY>
  </DATA>
  <MSDRM_SIGNATURE_VALUE>Wur1VKP!TZIc5NJ0jqCMcxTZ2xC!BgcGPULAwIp4*jREYp04iPu2ZQ==</MSDRM_SIGNATURE_VALUE>
 </CERTIFICATE>
 <CERTIFICATE type="AUTHORIZATION">
  <DATA>
   <SECURITYLEVEL>1000</SECURITYLEVEL>
   <AUTH_ID>42</AUTH_ID>
   <PUBLICKEY>qR!YzDsKeOmtMbmZMoBKLtd34CG1foosdNebvjCu6!6SX3bGbZ2pVw==</PUBLICKEY>
  </DATA>
  <MSDRM_SIGNATURE_VALUE>CLKXqfYPZA5OJnVUR32*3CznkiRSILz5CX6Z5LQLHQDAFaqZ9j2HbQ==</MSDRM_SIGNATURE_VALUE>
 </CERTIFICATE>
 <CERTIFICATE type="AUTHORIZATION_ROOT">
  <DATA>
   <AUTH_ID>1</AUTH_ID>
   <PUBLICKEY>a1t3hxrg!qbOgktnbYaEEi4teCse!gz6RvTPuC!zizKJIpU7xoduSw==</PUBLICKEY>
  </DATA>
  <MSDRM_SIGNATURE_VALUE>yI5BF4OIIZO!XeNtJdWqI0CIJEH6iNPNS*qyjB1rJgTT!!d!Xq2UEg==</MSDRM_SIGNATURE_VALUE>
 </CERTIFICATE>
</DEVCERT>
```

FIG. 29

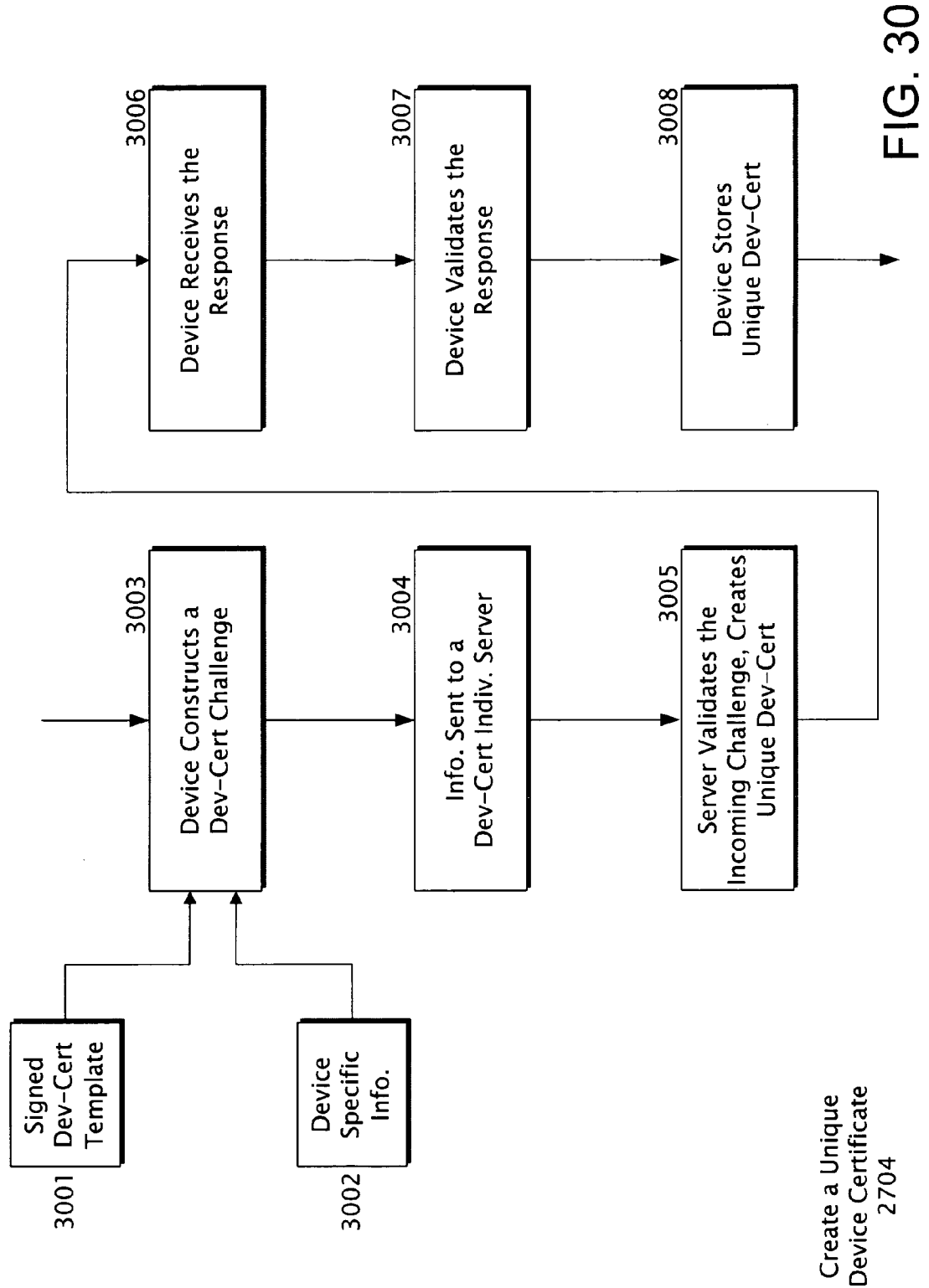

Device Certificate Response received at block 3006

FIG. 33

```
3301  <DEVCERT type ="response">
      <ERROR>
          errorcode
      </ERROR>
3302  <DEVCERT_NEW>
          DevCert will be inserted here.
      </NEW_DEVCERT>
      </DEVCERT>
```

RENEWABLE AND INDIVIDUALIZABLE ELEMENTS OF A PROTECTED ENVIRONMENT

CROSS-REFERENCE TO RELATED APPLICATION APPLICATIONS

This application is a continuation in part application of U.S. patent application Ser. No. 10/835,951, filed on Apr. 30, 2004 and is also a continuation in part application of U.S. patent application Ser. No. 11/116,598, filed on Apr. 27, 2005 which in turn claims the benefit of U.S. Provisional Patent Application No. 60/673,979 filed Apr. 22, 2005.

DESCRIPTION OF THE DRAWINGS

These and other features and advantages of the present example will be better understood from the following detailed description read in light of the accompanying drawings, wherein:

FIG. 17 is a block diagram showing an exemplary list indicating unique identifiers for components to be disabled, as well as additional information as necessary or convenient.

FIG. 18 is a block diagram showing an embodiment in which multiple lists are used.

FIG. 21 is a block diagram showing an exemplary protocol for retrieving an updated list.

FIG. 25 is a block diagram showing a conventional method of manufacturing consumer electronics devices, components or systems with complete device certificates.

FIG. 29 shows an exemplary XML device certificate template.

FIG. 30 is a block diagram showing a process for device certificate individualization to create an exemplary unique device certificate.

FIG. 33 shows an exemplary XML device certificate response.

Like reference numerals are used to designate like elements in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples in connection with the examples illustrated. However, the same or equivalent functions and sequences may be accomplished by different examples.

Although the present examples are described and illustrated herein as being implemented in a computer operating system, the system described is provided as an example and not a limitation. As those skilled in the art will appreciate, the present examples are suitable for application in a variety of different types of computer systems.

A secure computing environment may include elements or components that work together to reduce the possibility of unauthorized access to media content, other data and/or the overall computing environment. However, as with any security or content protection technology, there will likely be attempts to circumvent and/or breach such protective systems. The methods and systems described below, which tend to combine the creation and management of protected computing environments, the revoking and renewing of components and the individualization of components, may operate together to provide a quick response and remedy to such breaches and to slow their spread.

Below is a description of systems and methods for the creation and maintenance of a protected environment followed by a description showing how to form the protected environment such that its elements or components are renewable and/or individualizable. Next is a description of systems and methods for revoking and renewing the components of a protected environment followed by a description of systems and methods for individualizing the components of a protected environment.

Creating and Maintaining Protected Computing Environments

The description below provides systems and methods for creating and maintaining protected computing environments. An example of a protected computing environment is provided in U.S. patent application Ser. No. 11/116,598, filed Apr. 27, 2005, which is hereby incorporated by reference in its entirety and described below.

Figure 1:
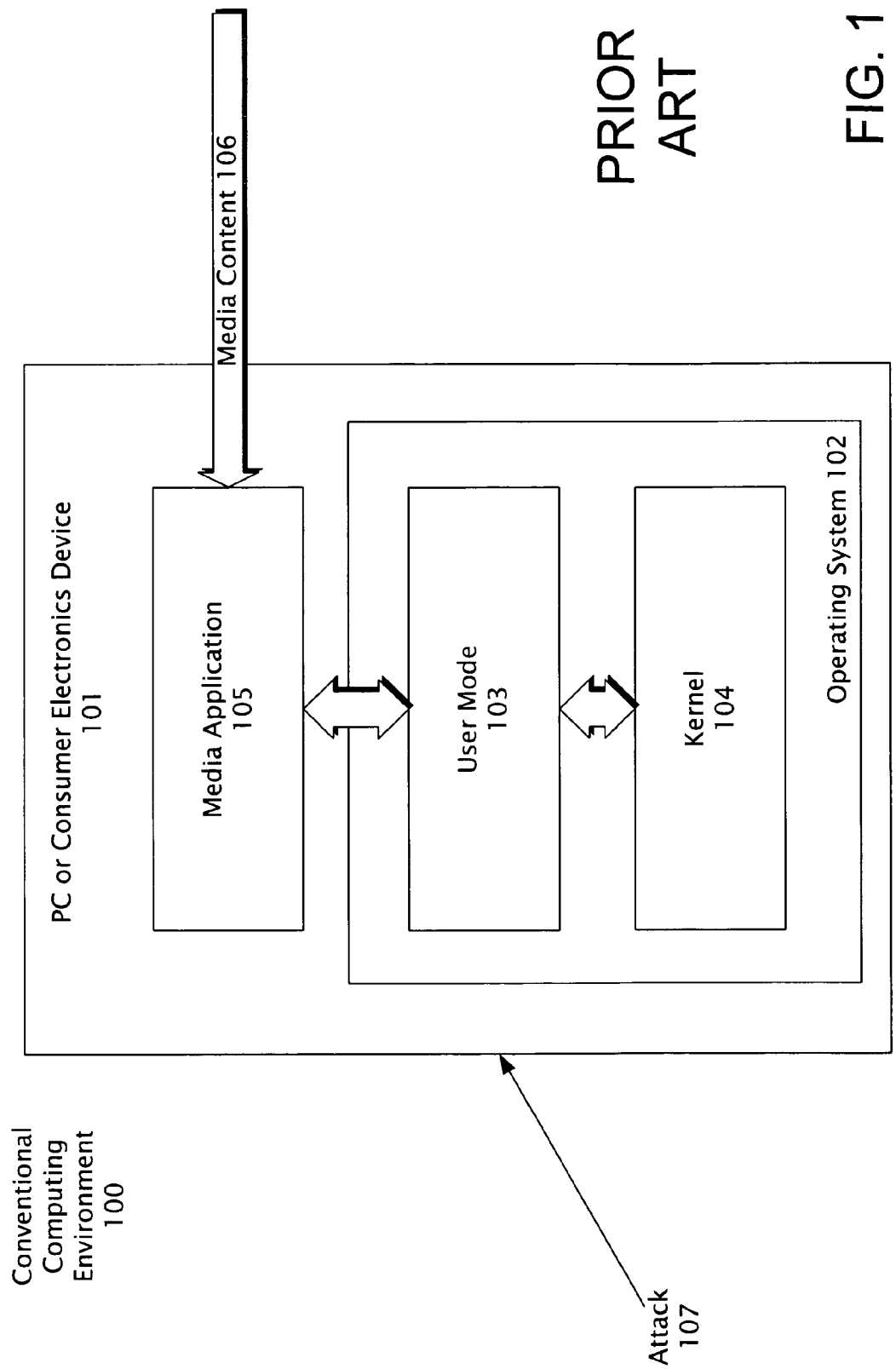
FIG. 1 is a block diagram showing a conventional media application processing media content operating in a conventional computing environment with an indication of an attack against the system.

FIG. 1 is a block diagram showing a conventional media application 105 processing media content 106 operating in a conventional computing environment 100 with an indication of an attack 107 against the system 101. A conventional computing environment 100 may be provided by a personal computer ("PC") or consumer electronics ("CE") device 101 that may include operating system ("OS") 102. Typical operating systems often partition their operation into a user mode 103, and a kernel mode 104. User mode 103 and kernel mode 104 may be used by one or more application programs 105. An application program 105 may be used to process media content 106 that may be transferred to the device 101 via some mechanism, such as a CD ROM drive, Internet connection or the like. An example of content 106 would be media files that may be used to reproduce audio and video information.

The computing environment 100 may typically include an operating system ("OS") 102 that facilitates operation of the application 105, in conjunction with the one or more central processing units ("CPU"). Many operating systems 102 may allow multiple users to have access to the operation of the CPU. Multiple users may have ranges of access privileges typically ranging from those of a typical user to those of an administrator. Administrators typically have a range of access privileges to applications 105 running on the system, the user mode 103 and the kernel 104. Such a computing environment 100 may be susceptible to various types of attacks 107. Attacks may include not only outsiders seeking to gain access to the device 101 and the content 106 on it, but also attackers having administrative rights to the device 101 or other types of users having whatever access rights granted them.

Figure 2:
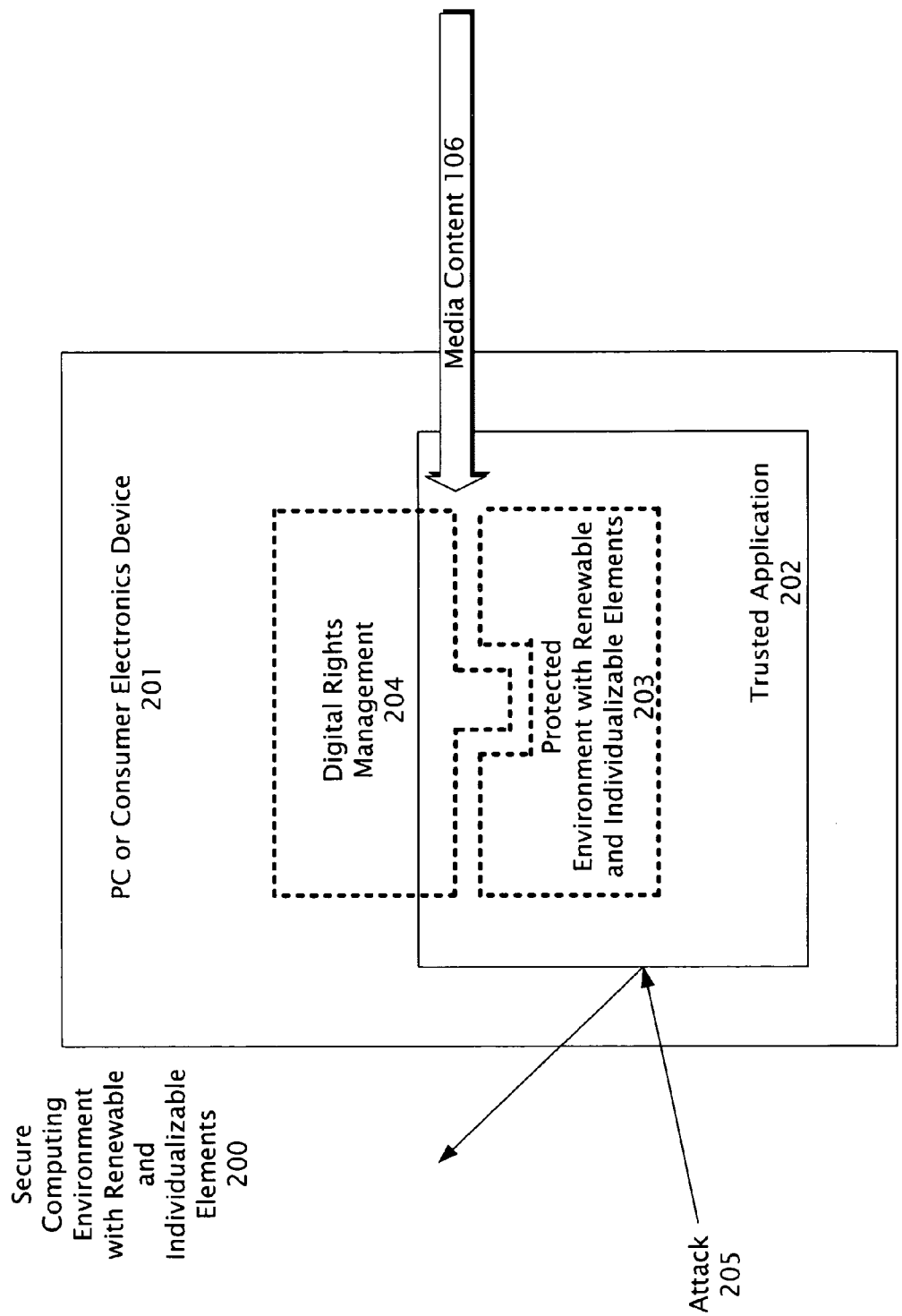
FIG. 2 is a block diagram showing a trusted application processing media content and utilizing a protected environment that tends to be resistant to attacks.

FIG. 2 is a block diagram showing a trusted application 202 processing media content 106 and utilizing a protected environment 203 that tends to be resistant to attack 205. The protected environment 203 may include renewable and/or individualizable elements or components. The term "trusted application", as used here, may be defined as an application that utilizes processes operating in a protected environment such that they tend to be resistant to attack 205 and limit unauthorized access to any media content 106 or other data being processed. Thus, components or elements of an application operating in a protected environment are typically considered "trusted" as they tend to limit unauthorized access and tend to be resistant to attack. Such an application 202 may be considered a trusted application itself or it may utilize another trusted application to protect a portion of its processes and/or data.

For example, a trusted media player 202 may be designed to play media content 106 that is typically licensed only for use such that the media content 106 cannot be accessed in an unauthorized manner. Such a trusted application 202 may not operate and/or process the media content 106 unless the computing environment 200 can provide the required level of security, such as by providing a protected environment 203 resistant to attack 205.

As used herein, the term "process" can be defined as an instance of a program (including executable code, machine instructions, variables, data, state information, etc.) residing and/or operating in a kernel space, user space and/or any other space of an operating system and/or computing environment.

A digital rights management system 204 or the like may be utilized with the protected environment 203. The use of a digital rights management system 204 is merely provided as an example and may not be utilized with a protected environment or a secure computing environment. Typically a digital rights management system utilizes tamper-resistant software ("TRS") which tends to be expensive to produce and may negatively impact computing performance. Utilizing a trusted application 202 may minimize the amount of TRS functionality required to provide enhanced protection.

Various mechanisms known to those skilled in this technology area may be utilized in place of, in addition to, or in conjunction with a typical digital rights management system. These mechanisms may include, but are not limited to, encryption/decryption, key exchanges, passwords, licenses, and the like. Thus, digital right management as used herein may be a mechanism as simple as decrypting an encrypted media, utilizing a password to access data, or other tamper-resistant mechanisms. The mechanisms to perform these tasks may be very simple and entirely contained within the trusted application 202 or may be accessed via interfaces that communicate with complex systems otherwise distinct from the trusted application 202.

Figure 3:
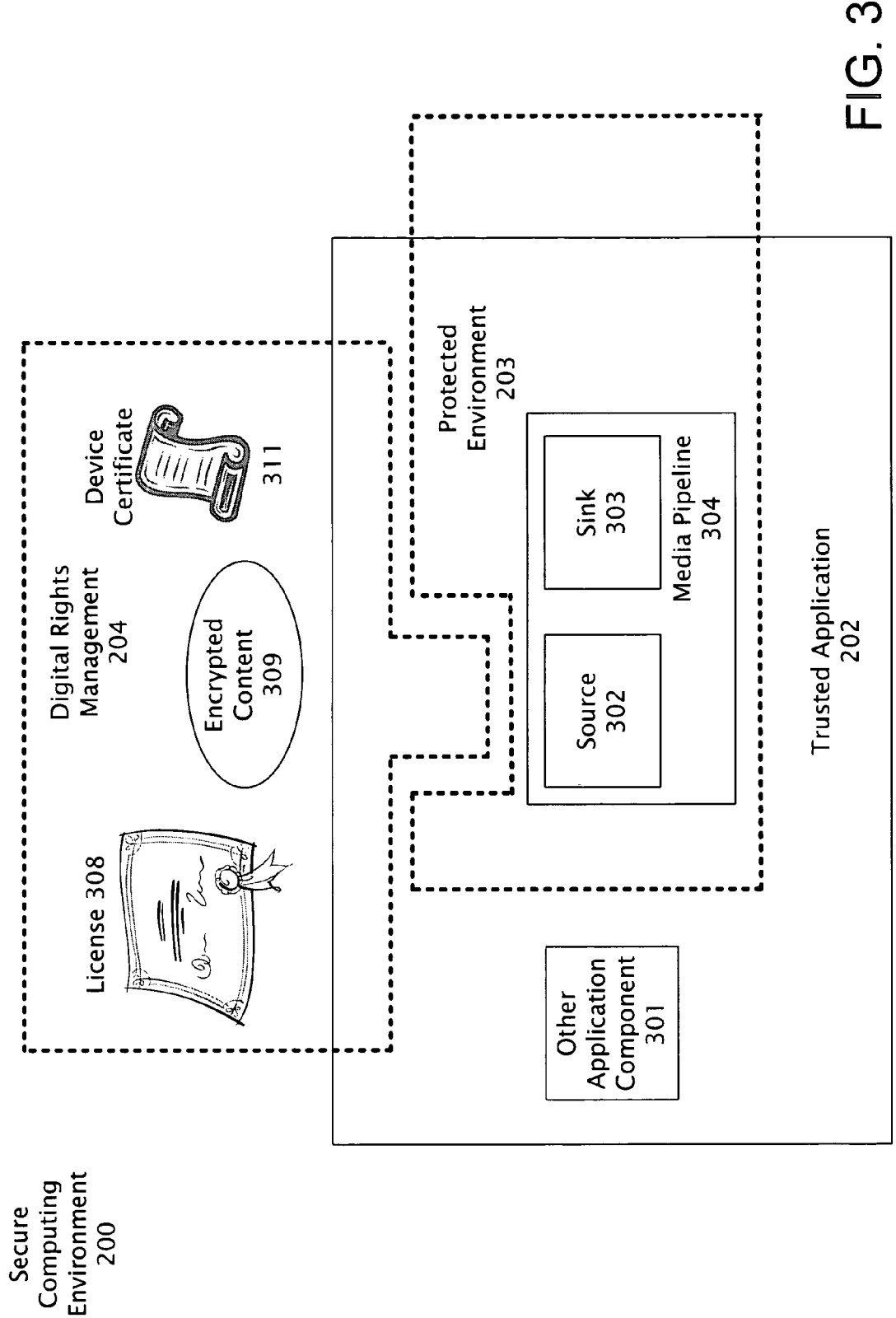
FIG. 3 is a block diagram showing exemplary components of a trusted application that may be included in the protected environment.

FIG. 3 is a block diagram showing exemplary components of a trusted application 202 that may be included in the protected environment 203. A trusted application 202 will typically utilize a protected environment 203 for at least a potion of its subcomponents 302-304. Other components 301 of the trusted application may not utilize a protected environment. Components 302-204 involved in the processing of media content or data that may call for an enhanced level of protection from attack or unauthorized access may operate within a protected environment 203. A protected environment 203 may be utilized by a single trusted application 202 or, possibly, by a plurality of trusted applications. Alternatively, a trusted application 202 may utilize a plurality of protected environments. A trusted application 202 may also couple to and/or utilize a digital rights management system 204.

In the example shown, source 302 and sink 303 are shown as part of a media pipeline 304 operating in the protected environment 203. A protected environment 203 tends to ensure that, once protected and/or encrypted content 309 has been received and decrypted, the trusted application 202 and its components prevent unauthorized access to the content 309.

Digital rights management 204 may provide a further avenue of protection for the trusted application 202 and the content 309 it processes via the description and control of who gets what kind of access to content. Through a system of licenses 308, device certificates 311, and other security mechanisms a content provider is typically able to have confidence that encrypted content 309 has been delivered to the properly authorized device and that the content 309 is used as intended.

Figure 4:
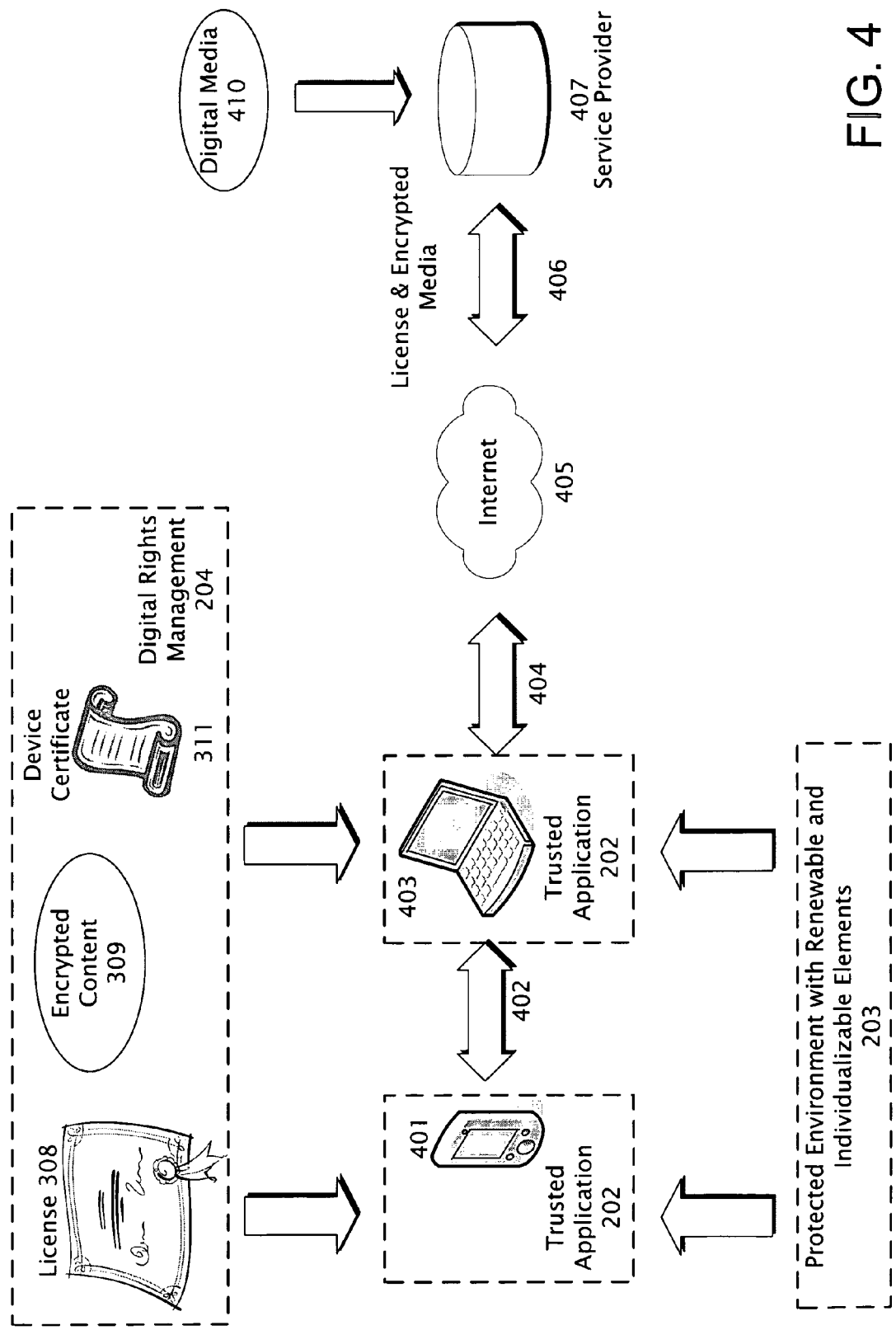
FIG. 4 is a block diagram showing a system for downloading digital media content from a service provider that utilizes an exemplary trusted application utilizing a protected environment.

FIG. 4 is a block diagram showing a system for downloading digital media content 410 from a service provider 407 to an exemplary trusted application 202 utilizing a protected environment 203. In the example shown the trusted application 202 is shown being employed in two places 401, 403. The trusted application 202 may be used in a CE device 401 or a PC 403. Digital media 410 may be downloaded via a service provider 407 and the Internet 405 for use by the trusted application 202. Alternatively, digital media may be made available to the trusted application via other mechanisms such as a network, a CD or DVD disk, or other storage media. Further, the digital media 410 may be provided in an encrypted form 309 requiring a system of decryption keys, licenses, certificates and/or the like which may take the form of a digital rights management system 204. The data or media content 410 provided to the trusted application may or may not be protected, i.e., encrypted or the like.

In one example, a trusted application 202 may utilize a digital rights management ("DRM") system 204 or the like along with a protected environment 203. In this case, the trusted application 202 is typically designed to acknowledge, and adhere to, the content's usage policies by limiting usage of the content to that authorized by the content provider via the policies. Implementing this may involve executing code which typically interrogates content licenses and subsequently makes decisions about whether or not a requested action can be taken on a piece of content. This functionality may be provided, at least in part, by a digital rights management system 204. An example of a Digital Rights Management system is provided in U.S. patent application Ser. No. 09/290,363, filed Apr. 12, 1999, U.S. patent applications Ser. Nos. 10/185,527, 10/185,278, and 10/185,511, each filed on Jun. 28, 2002 which are hereby incorporated by reference in its entirety.

Building a trusted application 202 that may be utilized in the CE device 401 or the PC 403 may include making sure the trusted application 202 which decrypts and processes the content 309 may be "secure" from malicious attacks. Thus, a protected environment 203 typically refers to an environment that may not be easy to attack.

As shown, the trusted applications 202 operate in a consumer electronics device 401, which may be periodically synced to a PC 403 that also provides a trusted application. The PC 403 is in turn coupled 404 to the internet 405. The internet connection allows digital media 410 to be provided by a service provider 407. The service provider 407 may transmit licenses and encrypted media 406 over the internet 405 to trusted application 202. Once encrypted media is delivered and decrypted it may be susceptible to various forms of attack.

A protected computing environment tends to provide an environment that limits hackers and others from gaining unauthorized access to content. A hacker may include hackers acting as a systems administrator. A systems administrator typically has full control of virtually all of the processes being executed on a computer, but this access may not be desirable. For example, if a system user has been granted a license to use a media file, it should not be acceptable for a system administrator different from the user to be able to access the media file. Nor should an administrator or user be able to access the media in a manner outside of the bounds of the rights granted.

A protected environment tends to contribute to the creation of a process in which code that decrypts and processes content can operate without giving hackers access to the decrypted content. A protected environment may also limit unauthorized access to users of privilege, such as administrators, and/or any other user, who may otherwise gain unauthorized access to protected content. Protection may include securing typical user mode processes (FIG. 1, 103) and kernel mode processes (FIG. 1, 104) and any data they may be processing.

The kernel may be used in an attack, as it may have low-level access to objects in the system, including processes. Processes operating in the kernel may be susceptible to attack. For example, in the kernel of a typical operating system objects are created, including processes, that may allow unlimited access by an administrator. Thus, an administrator, typically with full access privileges, may access virtually all processes and thereby intercept content in a way not intended by the content providers.

Protected content may include policy or similar information indicating the authorized use of the content. Such policy may be enforced via a DRM system or other security mechanism. Typically, access to protected content is granted through the DRM system or other mechanism, which may enforce policy. However, a system administrator, or an attacker with access to the system, may find ways to alter the state of the DRM system or mechanism to disregard the content policy.

A protected environment tends to provide a protected space that restricts unauthorized access to media content being processed therein, even for high-privilege users such as an administrator. When a protected environment is used in conjunction with a system of digital rights management or the like, a trusted application may be created in which a content provider may feel that adequate security is provided to protect digital media from unauthorized access and may also protect the content's policy from being tampered with along with any other data, keys or protection mechanisms that may be associated with the media content.

Current operating system ("OS") architectures typically present numerous possible attack vectors that could compromise a media application and any digital media content being processed. For purposes of this example, attacks that may occur in an OS are grouped into two types of attacks, which are kernel mode attacks and user mode attacks.

The first type of attack is the kernel mode attack. Kernel mode is typically considered to be the trusted base of the operating system. The core of the operating system and most system and peripheral drivers may operate in kernel mode. Typically any piece of code running in the kernel is susceptible to intrusion by any other piece of code running in the kernel, which tends not to be the case for user mode. Also, code running in kernel mode typically has access to substantially all user mode processes. A CPU may also provide privilege levels for various code types. Kernel mode code is typically assigned the highest level of privilege by such a CPU, typically giving it full access to the system.

The second type of attack is the user mode attack. Code that runs in user mode may or may not be considered trusted code by the system depending on the level of privilege it has been assigned. This level of privilege may be determined by the user context or account in which it is operating. User mode code running in the context of an administrator account may have full access to the other code running on the system. In addition, code that runs in user mode may be partitioned to prevent one user from accessing another's processes.

These attacks may be further broken down into specific attack vectors. The protected environment is typically designed to protect against unauthorized access that may otherwise be obtained via one or more of these attack vectors. The protected environment may protect against attack vectors that may include: process creation, malicious user mode applications, loading malicious code into a process, malicious kernel code, invalid trust authorities, and external attack vectors.

Process creation is a possible attack vector. An operating system typically includes a "create process" mechanism that allows a parent process to create a child process. A malicious parent process may, by modifying the create process code or by altering the data it creates, make unauthorized modifications to the child process being created. This could result in compromising digital media that may be processed by a child process created by a malicious parent process.

Malicious user mode applications are a possible attack vector. An operating system typically includes administrator level privileges. Processes running with administrator privileges may have unlimited access to many operating system mechanisms and to nearly all processes running on the computer. Thus, in Windows for example, a malicious user mode application running with administrator privileges may gain access to many other processes running on the computer and may thus compromise digital media. Similarly, processes operating in the context of any user may be attacked by any malicious process operating in the same context.

Loading malicious code into a secure process is a possible attack vector. It may be possible to append or add malicious code to a process. Such a compromised process cannot be trusted and may obtain unauthorized access to any media content or other data being processed by the modified process.

Malicious kernel mode code is a possible attack vector. An operating system typically includes a "system level" of privilege. In Windows, for example, all code running in kernel mode is typically running as system and therefore may have maximum privileges. The usual result is that drivers running in kernel mode may have maximum opportunity to attack any user mode application, for example. Such an attack by malicious kernel mode code may compromise digital media.

Invalid trust authorities (TAs) are a possible attack vector. TAs may participate in the validation of media licenses and may subsequently "unlock" the content of a digital media. TAs may be specific to a media type or format and may be implemented by media providers or their partners. As such, TAs may be pluggable and/or may be provided as dynamic link libraries ("DLL") or the like. A DLL may be loaded by executable code, including malicious code. In order for a TA to ensure that the media is properly utilized it needs to be able to ensure that the process in which it is running is secure. Otherwise the digital media may be compromised.

External attacks are another possible attack vector. There are a set of attacks that don't require malicious code running in a system in order to attack it. For instance, attaching a debugger to a process or a kernel debugger to the machine, looking for sensitive data in a binary file on a disk, etc., are all possible mechanisms for finding and compromising digital media or the processes that can access digital media.

Figure 5:
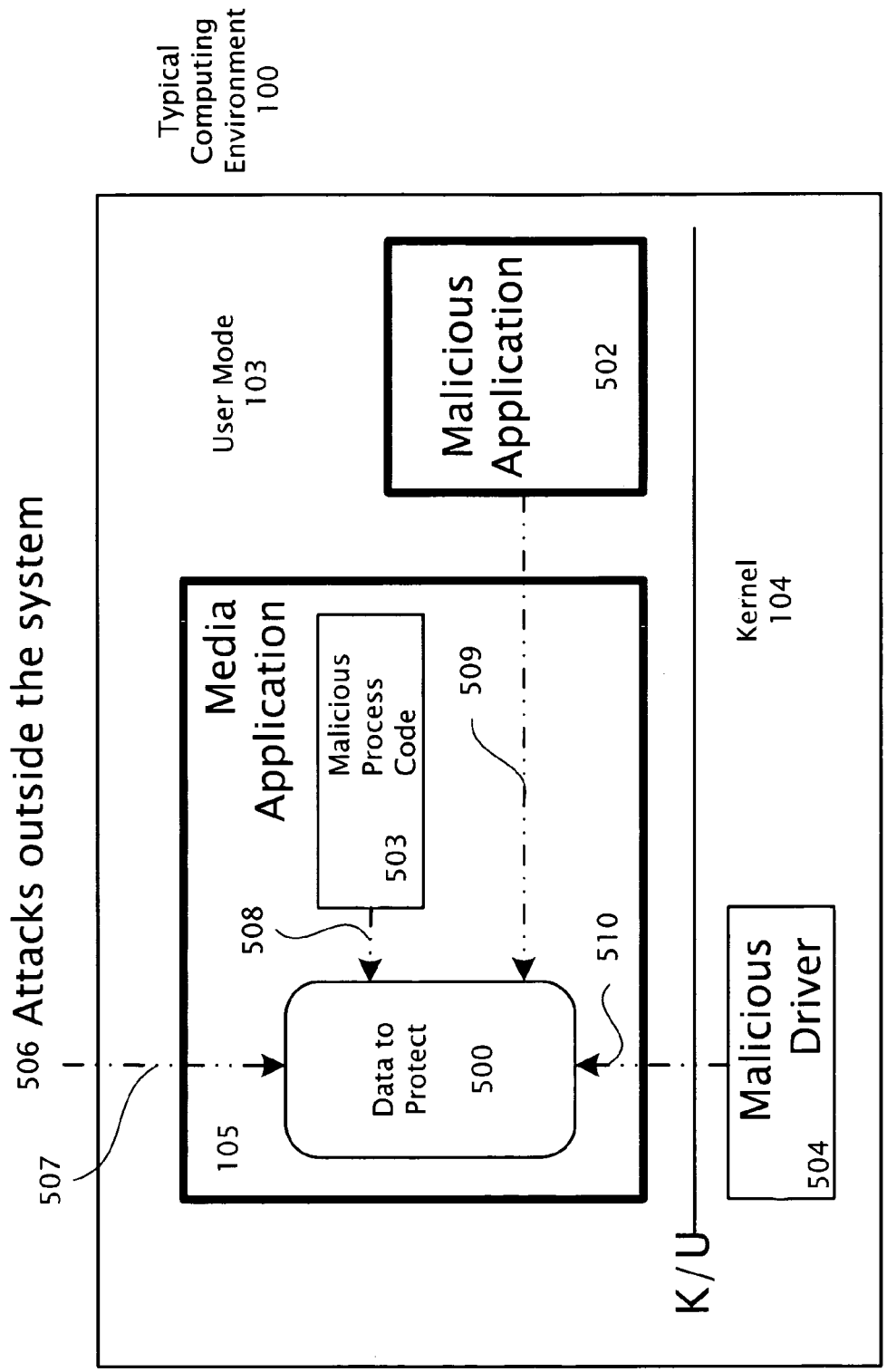
FIG. 5 is a block diagram showing exemplary attack vectors that may be exploited by a user or mechanism attempting to access media content and other data typically present in a computing environment in an unauthorized manner.

FIG. 5 is a block diagram showing exemplary attack vectors 507-510 that may be exploited by a user or mechanism attempting to access media content and other data 500 typically present in a computing environment 100 in an unauthorized manner. A protected environment may protect against these attack vectors such that unauthorized access to trusted applications and the data they process is limited and resistance to attack is provided. Such attacks may be waged by users of the system or mechanisms that may include executable code. The media application 105 is shown at the center of the diagram and the attack vectors 507-510 tend to focus on accessing sensitive data 500 being stored and/or processed by the application 105.

A possible attack vector 509 may be initiated via a malicious user mode application 502. In the exemplary operating system architecture both the parent of a process, and any process with administrative privileges, typically have unlimited access to other processes, such as one processing media content, and the data they process. Such access to media content may be unauthorized. Thus a protected environment may ensure that a trusted application and the media content it processes are resistant to attacks by other user mode applications.

A possible attack vector 508 is the loading of malicious code 503 into a process 501. Having a secure process that is resistant to attacks from the outside is typically only as secure as the code running on the inside forming the process. Given that DLLs and other code are typically loaded into processes for execution, a mechanism that may ensure that the code being loaded is trusted to run inside a process before loading it into the process may be provided in a protected environment.

A possible vector of attack 510 is through malicious kernel mode code 504. Code running in kernel mode 104 typically has maximum privileges. The result may be that drivers running in kernel mode may have a number of opportunities to attack other applications. For instance, a driver may be able to access memory directly in another process. The result of this is that a driver could, once running, get access to a processes memory which may contain decrypted "encrypted media content" (FIG. 3, 309). Kernel Mode attacks may be prevented by ensuring that the code running in the kernel is non-malicious code, as provided by this example.

A possible attack vector 507 is by external attacks 506 to the system 100. This group represents the set of attacks that typically do not require malicious code to be running on the system 100. For instance, attaching a debugger to an application and/or a process on the system, searching a machine for sensitive data, etc. A protected environment may be created to resist these types of attacks.

Figure 6:
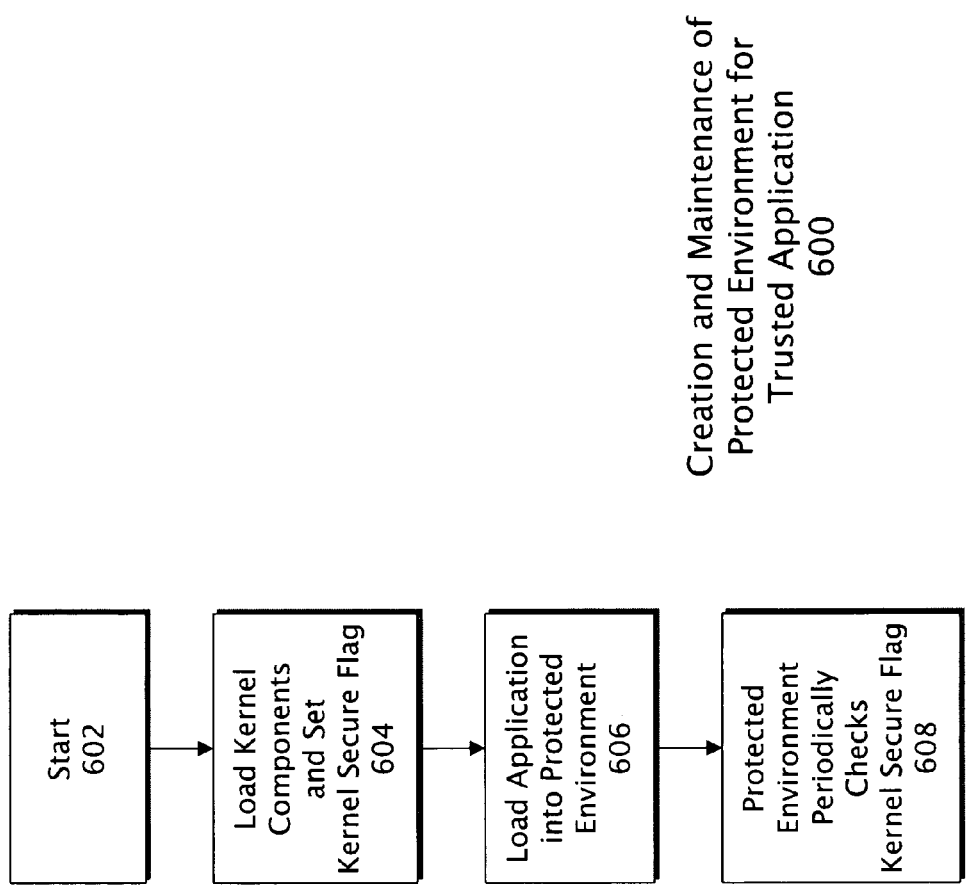
FIG. 6 is a flow diagram showing the process for creating and maintaining a protected environment that tends to limit unauthorized access to media content and other data.

FIG. 6 is a flow diagram showing the process 600 for creating and maintaining a protected environment that tends to limit unauthorized access to media content and other data. The sequence 600 begins when a computer system is started 602 and the kernel of the operating system is loaded and a kernel secure flag is set 604 to an initial value. The process continues through the time that a protected environment is typically created and an application is typically loaded into it 606. The process includes periodic checking 608 via the protected environment that seeks to ensure the system remains secure through the time the secure process is needed.

The term "kernel", as used here, is defined as the central module of an operating system for a computing environment, system or device. The kernel module may be implemented in the form of computer-executable instructions and/or electronic logic circuits. Typically, the kernel is responsible for memory management, process and task management, and storage media management of a computing environment. The term "kernel component", as used here, is defined to be a basic controlling mechanism, module, computer-executable instructions and/or electronic logic circuit that forms a portion of the kernel. For example, a kernel component may be a "loader", which may be responsible for loading other kernel components in order to establish a fully operational kernel.

To summarize the process of creating and maintaining a protected environment:

1. Block 602 represents the start-up of a computer system. This typically begins what is commonly known as the boot process and includes loading of an operating system from disk or some other storage media.

2. Typically one of the first operations during the boot process is the loading of the kernel and its components. This example provides the validation of kernel components and, if all are successfully validated as secure, the setting of a flag indicating the kernel is secure. This is shown in block 604.

3. After the computer system is considered fully operational a user may start an application such as a trusted media player which may require a protected environment. This example provides a secure kernel with an application operating in a protected environment, as shown in block 606.

4. Once the protected environment has been created and one or more of the processes of the application have been loaded into it and are operating, the trusted environment may periodically check the kernel secure flag to ensure the kernel remains secure, as shown in block 608. That is, from the point in time that the trusted application begins operation, a check may be made periodically to determine whether any unauthorized kernel components have been loaded, including whenever a new kernel component is loaded. Such unauthorized kernel components could attack the trusted application or the data it may be processing. Therefore, if any such components are loaded, the kernel secure flag may be set appropriately.

Figure 7:
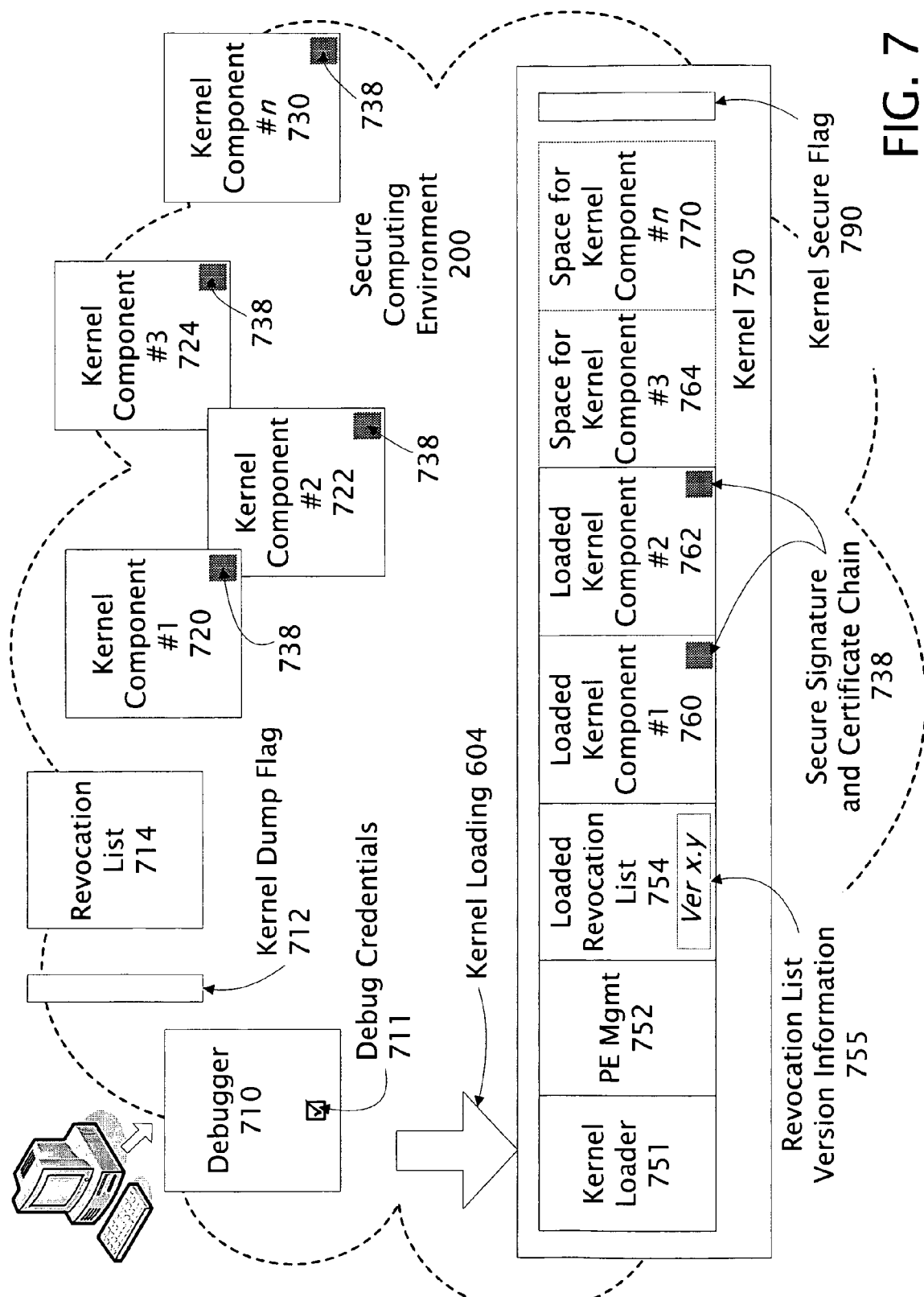
FIG. 7 is a block diagram showing exemplary kernel components and other components utilized for creating an exemplary secure computing environment.

FIG. 7 is a block diagram showing exemplary kernel components 720-730 and other components 710-714 utilized in creating an exemplary secure computing environment 200. This figure shows a computer system containing several components 710-730 typically stored on a disk or the like, several of which are used to form the kernel of an operating system when a computer is started. Arrow 604 indicates the process of loading the kernel components into memory forming the operational kernel of the system. The loaded kernel 750 is shown containing its various components 751-762 and a kernel secure flag 790 indicating whether or not the kernel is considered secure for a protected environment. The kernel secure flag 790 being described as a "flag" is not meant to be limiting; it may be implemented as a boolean variable or as a more complex data structure or mechanism. The various components or elements of the secure computing environment 200 and/or the kernel 750 may be renewable and/or individualizable.

Kernel components 720-730 are typically "signed" and may include a certificate data 738 that may allow the kernel to validate that they are the components they claim to be, that they have not been modified and/or are not malicious. A signature block and/or certificate data 738 may be present in each kernel component 720-730 and/or each loaded kernel component 760, 762. The signature and/or certificate data 738 may be unique to each component. The signature and/or certificate data 738 may be used in the creation and maintenance of protected environments as indicated below. Typically a component is "signed" by its provider in such as way as to securely identify the source of the component and/or indicate whether it may have been tampered with. A signature may be implemented as a hash of the component's header, sometimes referred to as a "header image hash", or by using other techniques. A conventional certificate or certificate chain may also be included with a component that may be used to determine if the component can be trusted. The signature and/or certificate data 738 are typically added to a component before it is distributed for public use. Those skilled in the art will be familiar with these technologies and their use.

When a typical computer system is started or "booted" the operating system's loading process or "kernel loader" 751 may typically load the components of the kernel from disk or the like into a portion of system memory to form the kernel of the operating system. Once all of the kernel components are loaded and operational the computer and operating system are considered "booted" and ready for normal operation.

Kernel component #1 720 thru kernel component #n 730, in the computing environment, may be stored on a disk or other storage media, along with a revocation list 714, a kernel dump flag 712 and a debugger 710 along with a debug credential 711. Arrow 604 indicates the kernel loading process which reads the various components 714-730 from their storage location and loads them into system memory forming a functional operating system kernel 750. The kernel dump flag 712 being described as a "flag" is not meant to be limiting; it may be implemented as a boolean variable or as a more complex data structure or mechanism.

The kernel loader 751 along with the protected environment ("PE") management portion of the kernel 752, the revocation list 754 and two of the kernel components 720 and 722 are shown loaded into the kernel, the latter as blocks 760 and 762, along with an indication of space for additional kernel components yet to be loaded into the kernel, 764 and 770. Finally, the kernel 750 includes a kernel secure flag 790 which may be used to indicate whether or not the kernel 750 is currently considered secure or not. This illustration is provided as an example and is not intended to be limiting or complete. The kernel loader 751, the PE management portion of the kernel 752 and/or the other components of the kernel are shown as distinct kernel components for clarity of explanation but, in actual practice, may or may not be distinguishable from other portions of the kernel.

Included in the computing environment 200 may be a revocation list 714 that may be used in conjunction with the signature and certificate data 738 associated with the kernel components 760 and 762. This object 714 may retain a list of signatures, certificates and/or certificate chains that are no longer considered valid as of the creation date of the list 714. The revocation list 714 is shown loaded into the kernel as object 754. Such lists are maintained because a validly-signed and certified component, for example components 760 and 762, may later be discovered to have some problem. The system may use such a list 754 to check kernel components 720-730 as they are loaded, which may be properly signed and/or have trusted certificate data 738, but that may have subsequently been deemed untrustworthy. Such a revocation list 754 will typically include version information 755 so that it can more easily be identified, managed and updated as required.

Another component of the system that may impact kernel security is a debugger 710. Debuggers may not typically be considered a part of the kernel but may be present in a computing environment 200. Debuggers, including those known as kernel debuggers, system analyzers, and the like, may have broad access to the system and the processes running on the system along with any data. A debugger 710 may be able to access any data in a computing environment 200, including media content that should not be accessed in a manner other than that authorized. On the other hand, debugging is typically a part of developing new functionality and it typically is possible to debug within protected environments the code intended to process protected media content. A debugger 710 may thus include debug credentials 711 which may indicate that the presence of the debugger 710 on a system is authorized. Thus detection of the presence of a debugger 710 along with any accompanying credentials 711 may be a part of the creation and maintenance of protected environments (FIG. 6, 600).

The computing environment 200 may include a kernel dump flag 712. This flag 712 may be used to indicate how much of kernel memory is available for inspection in case of a catastrophic system failure. Alternatively, this or a similar flag may indicate a full memory dump of the system. Such kernel and/or memory dumps may be used for postmortem debugging after such as failure. If such a flag 712 indicates that substantially all memory is available for inspection upon a dump then the kernel 750 may be considered insecure as a hacker could run an application which exposes protected media in system memory and then force a catastrophic failure condition which may result in the memory being available for inspection including that containing the exposed media content. Thus a kernel dump flag 712 may be used in the creation and maintenance of a protected environment (FIG. 6, 600).

Figure 8:
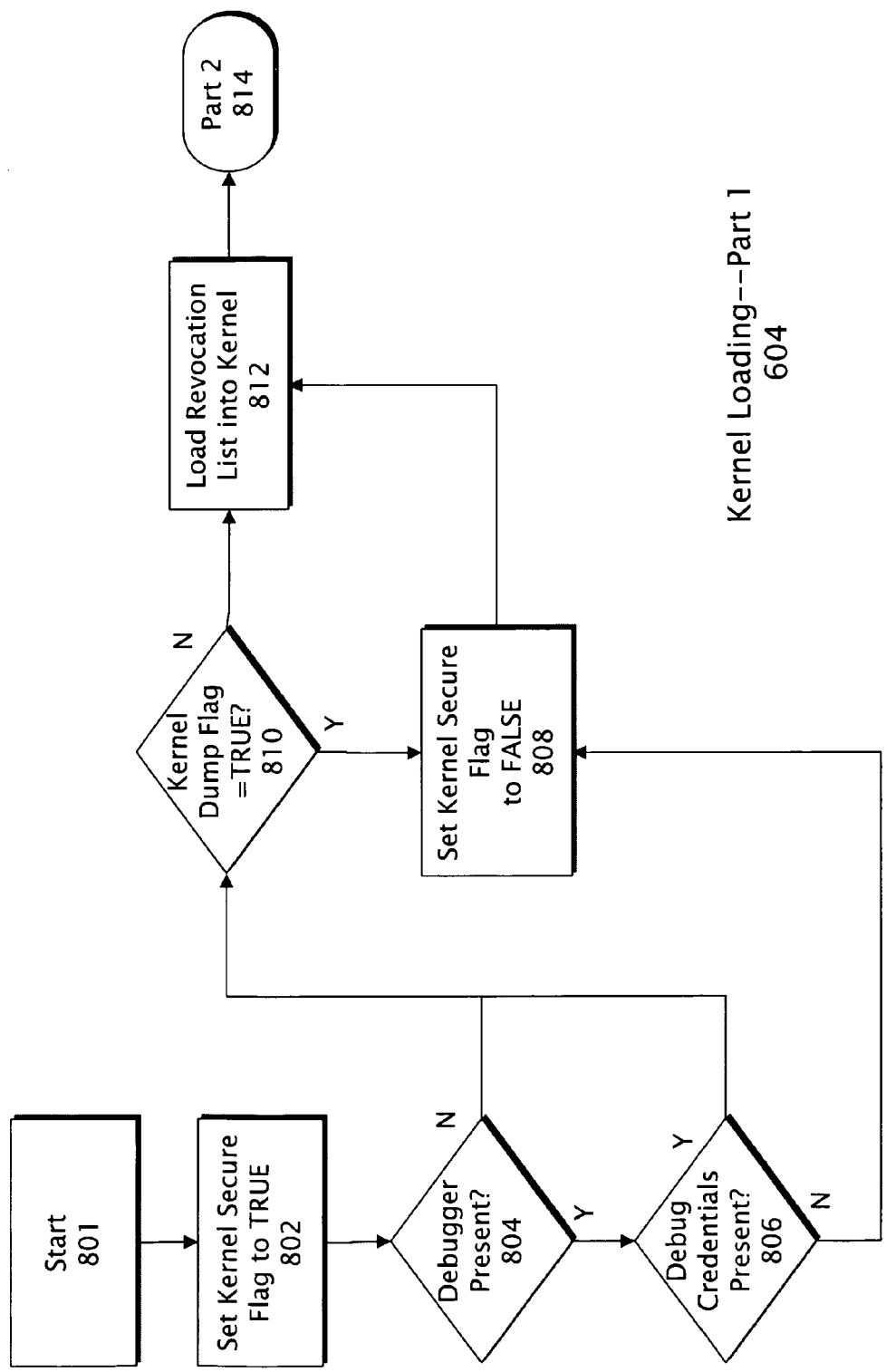
FIG. 8 and FIG. 9 are flow diagrams showing an exemplary process for loading kernel components to create an exemplary secure computing environment.
Figure 9:
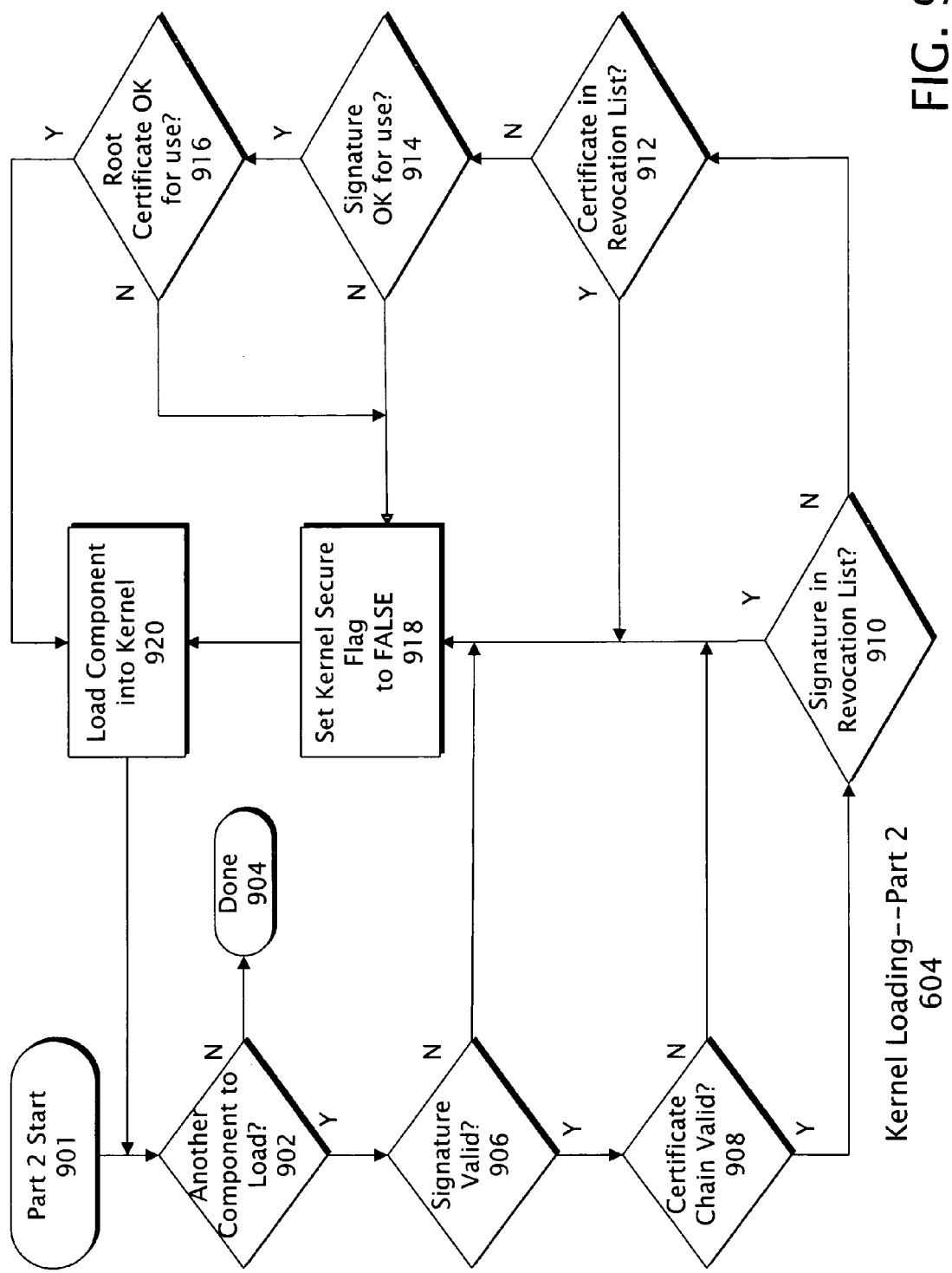

FIG. 8 and FIG. 9 are flow diagrams showing an exemplary process 604 for loading kernel components to create an exemplary secure computing environment. This process 604 begins after the kernel loader has been started and the PE management portion of the kernel has been loaded and made operational. Not shown in these figures, the PE management portion of the kernel may validate the kernel loader itself and/or any other kernel elements that may have been previously loaded. Validation may be defined as determining whether or not a given component is considered secure and trustworthy as illustrate in part 2 of this process 604.

The term "authorized for secure use" and the like as used below with respect to kernel components has the following specific meaning. A kernel containing any components that are not authorized for secure use does not provide a secure computing environment within which protected environments may operate. The opposite may not be true as it depends on other factors such as attack vectors.

1. Block 801 shows the start of the loading process 604 after the PE management portion of the kernel has been loaded and made operational. Any component loaded in the kernel prior to this may be validated as described above.

2. Block 802 shows that the kernel secure flag initially set to TRUE unless any component loaded prior to the PE management portion of the kernel, or that component itself, is found to be insecure at which point the kernel secure flag may be set to FALSE. In practice the indication of TRUE or FALSE may take various forms; the use of TRUE or FALSE here is only an example and is not meant to be limiting. Alternatively, the kernel secure flag may initially be set to FALSE and later set to TRUE when the kernel is found to be secure.

3. Block 804 indicates a check for the presence of a debugger in the computing environment. Alternatively a debugger could reside remotely and be attached to the computing environment via a network or other communications media to a process in the computing environment. If no debugger is detected the loading process 604 continues at block 810. Otherwise it continues at block 809. Not shown in the diagram, this check may be performed periodically and the state of the kernel secure flag updated accordingly.

4. If a debugger is detected, block 806 shows a check for debug credentials which may indicate that debugging may be authorized on the system in the presence of a protected environment. If such credentials are not present, the kernel secure flag may be set to FALSE as shown in block 808. Otherwise the loading process 604 continues at block 810.

5. Block 810 shows a check of the kernel dump flag. If this flag indicates that a full kernel memory dump or the like may be possible then the kernel secure flag may be set to FALSE as shown in block 808. Otherwise the loading process 604 continues at block 812. Not shown in the diagram, this check may be performed periodically and the state of the kernel secure flag updated accordingly.

6. Block 812 shows the loading of the revocation list into the kernel. In cases where the revocation list may be used to check debug credentials, or other previously loaded credentials, signatures, certificate data, or the like, this step may take place earlier in the sequence (prior to the loading of credentials and the like to be checked) than shown. Not shown in the diagram is that, once this component is loaded, any and all previously loaded kernel components may be checked to see if their signature and/or certificate data has been revoked per the revocation list. If any have been revoked, the kernel secure flag may be set to FALSE and the loading process 604 continues at block 814. Note that a revocation list may or may not be loaded into the kernel to be used in the creation and maintenance of a protected environments.

7. Block 814 shows the transition to part 2 of this diagram shown in FIG. 9 and continuing at block 901.

8. Block 902 shows a check for any additional kernel components to be loaded. If all components have been loaded then the load process 604 is usually complete and the kernel secure flag remains in whatever state it was last set to, either TRUE or FALSE. If there are additional kernel components to be loaded the load process 604 continues at block 906.

9. Block 906 shows a check for a valid signature of the next component to be loaded. If the signature is invalid then the kernel secure flag may be set to FALSE as shown in block 918. Otherwise the loading process 604 continues at block 908. If no component signature is available the component may be considered insecure and the kernel secure flag may be set to FALSE as shown in block 918. Signature validity may be determined by checking for a match on a list of valid signatures and/or by checking whether the signer's identity is a trusted identity. As familiar to those skilled in the security technology area, other methods could also be used to validate component signatures.

10. Block 908 shows a check of the component's certificate data. If the certificate data is invalid then the kernel secure flag may be set to FALSE as shown in block 918. Otherwise the loading process 604 continues at block 910. If no component certificate data is available the component may be considered insecure and the kernel secure flag may be set to FALSE as shown in block 918. Certificate data validity may be determined by checking the component's certificate data to see if the component is authorized for secure use. As familiar to those skilled in the art, other methods could also be used to validate component certificate data.

11. Block 910 shows a check of the component's signature against a revocation list loaded in the kernel. If the signature is present on the list, indicating that it has been revoked, then the kernel secure flag may be set to FALSE as shown in block 918. Otherwise the loading process 604 continues at block 912.

12. Block 912 shows a check of the component's certificate data against a revocation list. If the certificate data is present on the list, indicating that it has been revoked, then the kernel secure flag may be set to FALSE as shown in block 918. Otherwise the loading process 604 continues at block 914.

13. Block 914 shows a check of the component's signature to determine if it is OK for use. This check may be made by inspecting the component's leaf certificate data to see if the component is authorized for secure use. Certain attributes in the certificate data may indicate if the component is approved for protected environment usage. If not the component may not be appropriately signed and the kernel secure flag may be set to FALSE as shown in block 918. Otherwise the loading process 604 continues at block 916.

14. Block 916 shows a check of the component's root certificate data. This check may be made by inspecting the component's root certificate data to see if it is listed on a list of trusted root certificates. If not the component may be considered insecure and the kernel secure flag may be set to FALSE as shown in block 918. Otherwise the loading process 604 continues at block 920.

15. Block 920 shows the loading of the component into the kernel where it is now considered operational. Then the loading process 604 returns to block 902 to check for any further components to be loaded.

Figure 10:
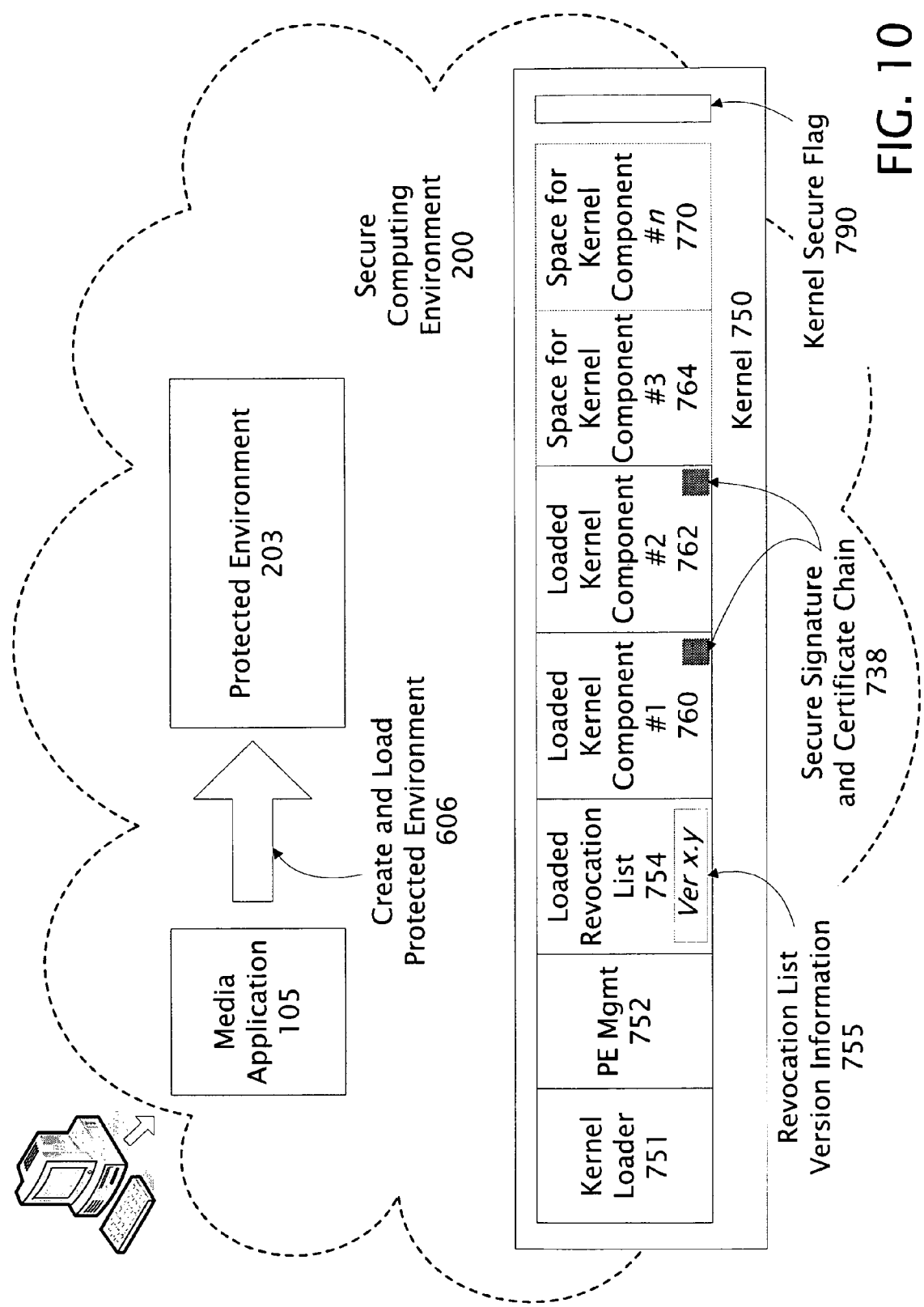
FIG. 10 is a block diagram showing a secure computing environment loading an application into an exemplary protected environment to form a trusted application that is typically resistant to attacks.

FIG. 10 is a block diagram showing a secure computing environment 200 loading an application 105 into an exemplary protected environment 203 to form a trusted application that is typically resistant to attacks. In this example the kernel may be the same as that described in FIG. 7, has already been loaded and the system 200 is considered fully operational. At this point, as an example, a user starts media application 105. The media application 105 may call for the creation of a protected environment 203 for one or more of its processes and/or components to operate within. The protected environment creation process 606 creates the protected environment 203 and loads the application 105 and/or its components as described below.

Figure 11:
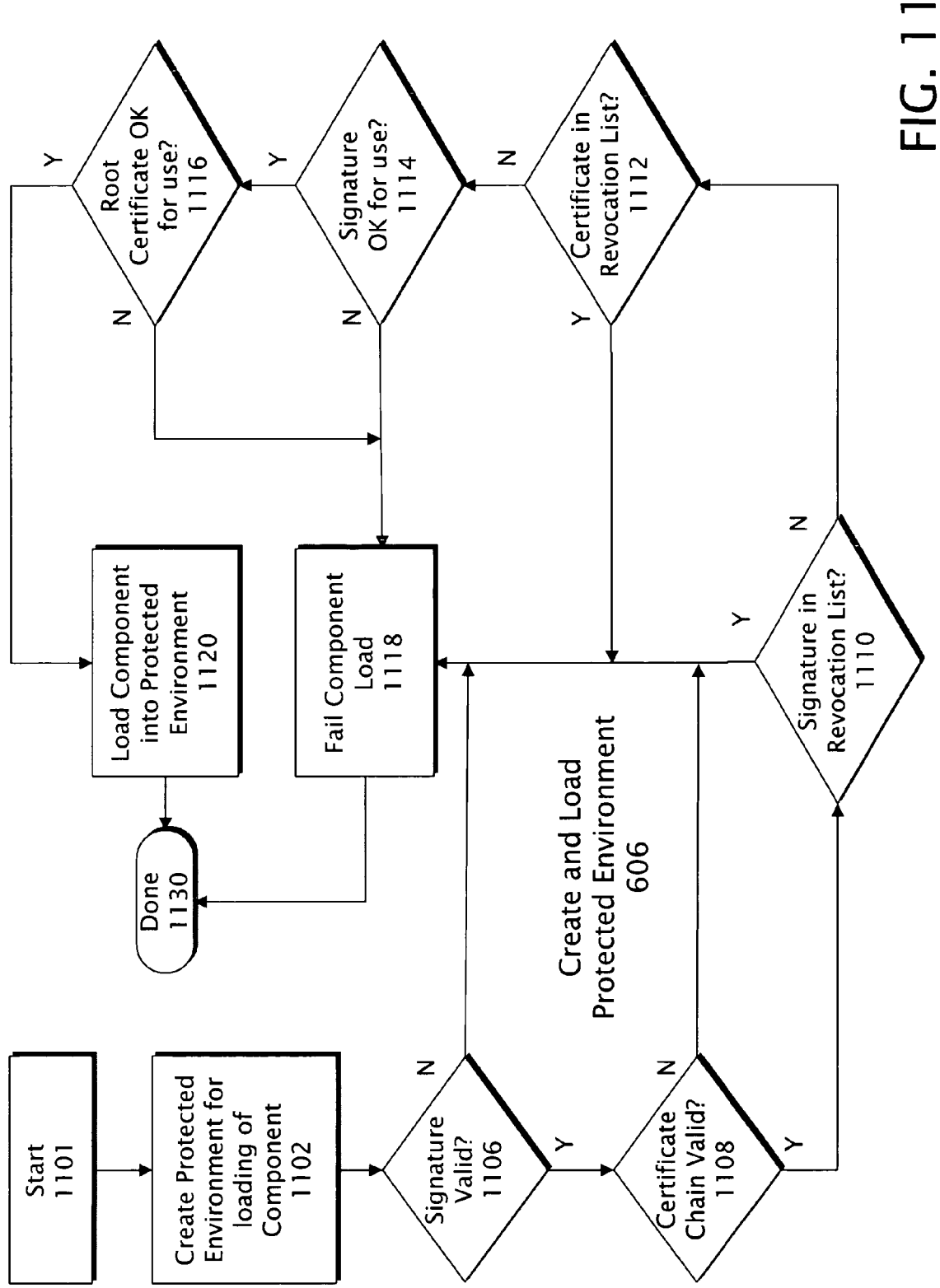
FIG. 11 is a flow diagram showing an exemplary process for creating a protected environment and loading an application into the protected environment.

FIG. 11 is a flow diagram showing an exemplary process 606 for creating a protected environment and loading an application into the protected environment. This process 606 includes the initial step of creating a secure process followed by validating the software component to be loaded into it and then loading the software component into the new secure process and making it operational. Upon success, the result may be a software component operating in a protected environment supported by a secure kernel. Such a software component, along with any digital media content or other data it processes, may be protected from various attacks, including those described above.

1. Block 1101 shows the start of the protected environment creation process 606. This point is usually reached when some application or code calls for a protected environment to operate.

2. Block 1102 shows the establishment of a protected environment. While not shown in the diagram, this may be accomplished by requesting the operating system to create a new secure process. Code later loaded and operating in this secure process may be considered to be operating in a protected environment. If the kernel secure flag is set to FALSE then the "create new secure process" request may fail. This may be because the system as a whole may be considered insecure and unsuitable for a protected environment and any application or data requiring a protected environment. Alternatively, the "create new secure process" request may succeed and the component loaded into the new process may be informed that the system is considered insecure so that it can modify its operations accordingly. Otherwise the process 606 continues at block 1106.

3. Block 1106 shows a check for a valid signature of the software component to be loaded into the new secure process or protected environment. If the signature is invalid then the process 606 may fail as shown in block 1118. Otherwise the process 606 continues at block 1108. Not shown in the process is that the program, or its equivalent, creating the new secure process may also be checked for a valid signature. Thus, for either the component itself and/or the program creating the new secure process, if no signature is available the component may be considered insecure and the process 606 may fail as shown in block 1118. Signature validity may be determined by checking for a match on a list of valid signatures and/or by checking whether the signer's identity is a trusted identity. As familiar to those skilled in the security technology area, other methods could also be used to validate component signatures.

4. Block 1108 shows a check of the software component's certificate data. If the certificate data is invalid then the process 606 may fail as shown in block 1118. Otherwise the process 606 continues at block 1110. If no component certificate data is available the component may be considered insecure and the process 606 may fail as shown in block 1118. Certificate data validity may be determined by checking the component's certificate data to see if the component is authorized for secure use. As familiar to those skilled in the art, other methods could also be used to validate component certificate data.

5. Block 1110 shows a check of the component's signature against a revocation list. If the signature is present on the list, indicating that it has been revoked, then the process 606 may fail as shown in block 1118. Otherwise the process 606 continues at block 1112.

12. Block 1112 shows a check of the component's certificate data against a revocation list. If the certificate data is present on the list, indicating that it has been revoked, then the process 606 may fail as shown in block 1118. Otherwise the process 606 continues at block 1114.

13. Block 1114 shows a check of the component's signature to determine if it is acceptable for use. This check may be made by inspecting the component's leaf certificate data to see if the component is authorized for secure use. Certain attributes in the certificate data may indicate if the component is approved for protected environment usage. If not the component may be considered to not be appropriately signed and the process 606 may fail as shown in block 1118. Otherwise the process 606 continues at block 1116.

14. Block 1116 shows a check of the component's root certificate data. This check may be made by inspecting the component's root certificate data to see if it is listed on a list of trusted root certificates. If not the component may be considered insecure and the process 606 may fail as shown in block 1118. Otherwise the process 606 continues at block 1120.

15. Block 1118 shows the failure of the software component to load followed by block 1130, the end of the protected environment creation process 606.

16. Block 1120 shows the software component being loaded into the protected environment, where it is considered operational, followed by block 1130, the end of the protected environment creation process 606.

Figure 12:
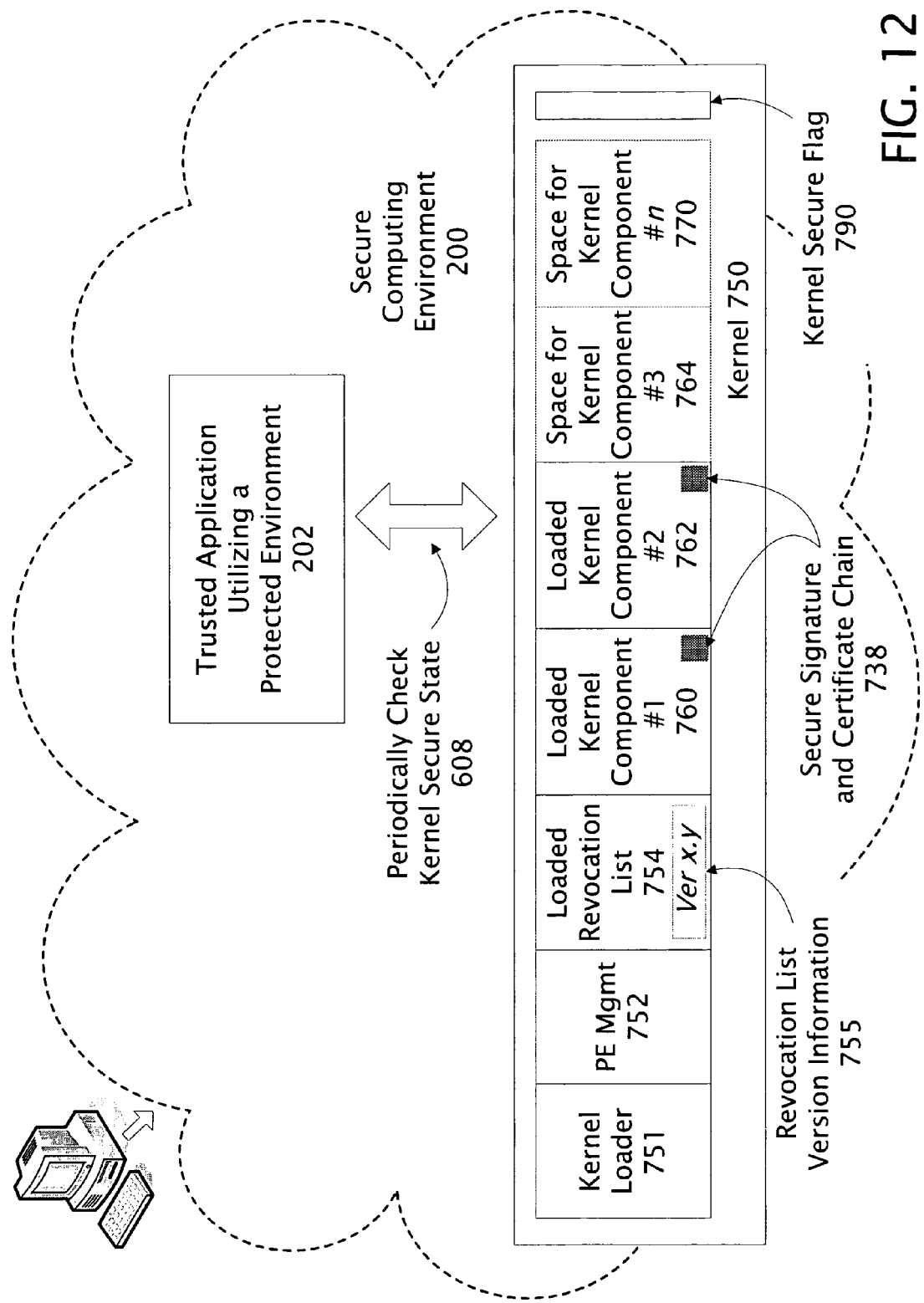
FIG. 12 is a block diagram showing an exemplary trusted application utilizing an exemplary protected environment periodically checking the security state of the secure computing environment.

FIG. 12 is a block diagram showing an exemplary trusted application utilizing an exemplary protected environment 202 periodically checking 608 the security state 790 of the secure computing environment 200. In this example, the computing environment 200 and the kernel 750 may be the same as those described in FIGS. 7 and 8. The kernel 750 has already been loaded and the computer 200 is considered fully operational. Further, a protected environment has been created and the appropriate components of the trusted application have been loaded into it and made operational, establishing a trusted application utilizing a protected environment 202, hereafter referred to simply as the "protected environment".

The protected environment 202 may periodically check with the PE management portion of the kernel 752 to determine whether the kernel 750 remains secure over time. This periodic check may be performed because it is possible for a new component to be loaded into the kernel 750 at any time, including a component that may be considered insecure. If this were to occur, the state of the kernel secure flag 790 would change to FALSE and the code operating in the protected environment 202 has the opportunity to respond appropriately.

For example, consider a media player application that was started on a PC 200 with a secure kernel 750 and a portion of the media player application operating in a protected environment 202 processing digital media content that is licensed only for secure use. In this example, if a new kernel component that is considered insecure is loaded while the media player application is processing the media content, then the check kernel secure state process 240 would note the kernel secure flag 790 has changed to FALSE indicating the kernel 750 may no longer be secure.

Alternatively, the revocation list 745 may be updated and a kernel component previously considered secure may no longer be considered secure, resulting in the kernel secure flag 790 being set to FALSE. At this point the application may receive notification that the system 200 is no longer considered secure and can terminate operation, or take other appropriate action to protect itself and/or the media content it is processing.

Figure 13:
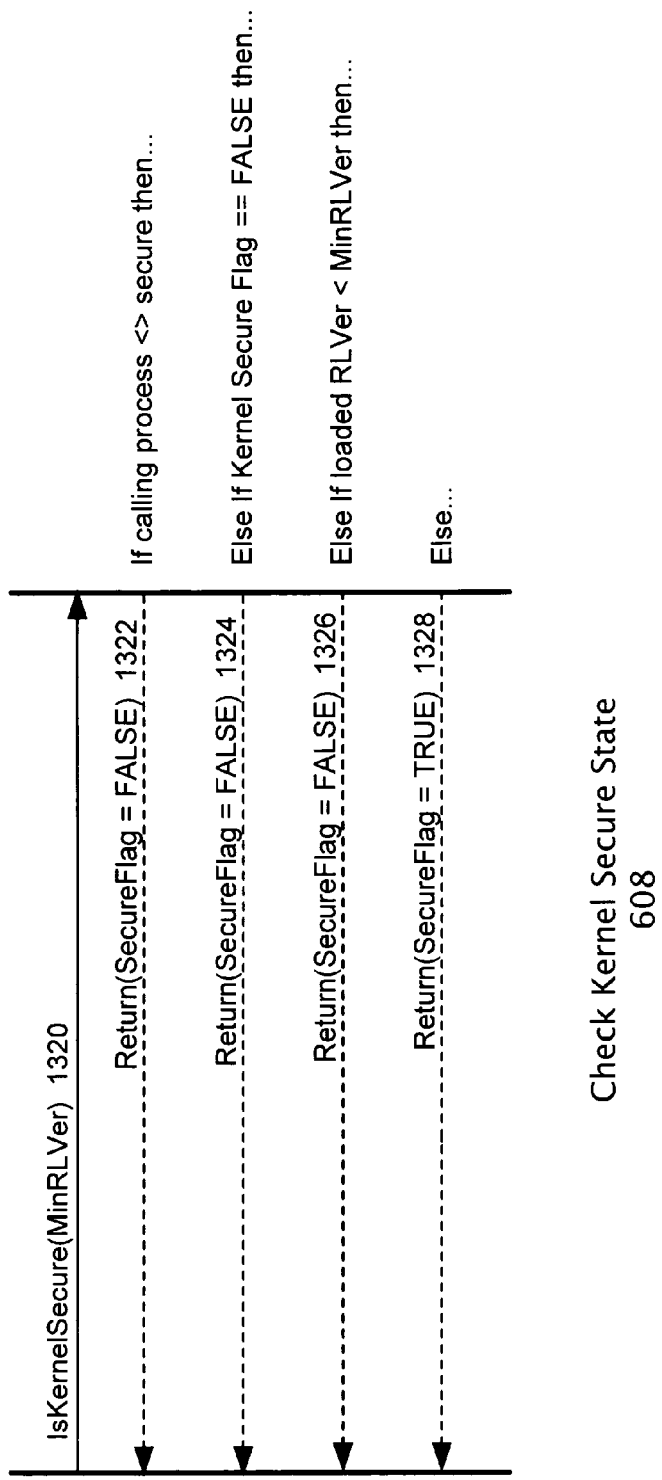
FIG. 13 is a flow diagram showing an exemplary process for periodically checking the security state of the secure computing environment.

FIG. 13 is a flow diagram showing an exemplary process 608 for periodically checking the security state of the secure computing environment. This process 608 may be used by a protected environment 202 to determine if the kernel remains secure over time. The protected environment 202 may periodically use this process 608 to check the current security status of the kernel. The protected environment 202 and/or the software component operating within it may use the current security status information to modify its operation appropriately. Periodic activation of the process may be implemented using conventional techniques.

The diagram shows a sequence of communications 608, illustrated with exemplary pseudo code, between the protected environment 202 and the PE management portion of the kernel 752. This communication may include a check of the version of a revocation list which may give an application the ability to specify a revocation list of at least a certain version. This communications sequence may be cryptographically secured using conventional techniques.

1. The protected environment 202 makes a IsKernelSecure (MinRLVer) call 1320 to the PE management portion of the kernel to query the current security state of the kernel. Included in this call 1320 may be the minimum version (MinRLVer) of the revocation list expected to be utilized.

2. The PE management portion of the kernel checks to see if the protected environment, which is the calling process, is secure. If not, then it may provide a Return (SecureFlag=FALSE) indication 1322 to the protected environment and the communications sequence 608 is complete. This security check may be done by the PE management portion of the kernel checking the protected environment for a valid signature and/or certificate data as described above.

3. Otherwise, the PE management portion of the kernel checks the kernel secure flag in response to the call 1320. If the state of the flag is FALSE then it may provide a Return (SecureFlag=FALSE) indication 1324 to the protected environment and the communications sequence 608 is complete.

4. Otherwise, the PE management portion of the kernel checks the revocation list version information for the revocation list. If the revocation list has version information that is older than that requested in the IsKernelSecure(MinRLVer) call 1320 then several options are possible. First, as indicated in the diagram, the PE management portion of the kernel may provide a Return(SecureFlag=FALSE) indication 1326 to the protected environment and the communications sequence 608 is complete.

Alternatively, and not shown in the diagram, an appropriate version revocation list may be located and loaded into the kernel, all kernel components could be re-validated using this new or updated list, the kernel secure flag updated as appropriate and the previous step #3 of this communications sequence 608 repeated.

5. Otherwise, the PE management portion of the kernel may provide a Return(SecureFlag=TRUE) indication 1328 to the protected environment and the communications sequence 608 is complete.

Figure 14:
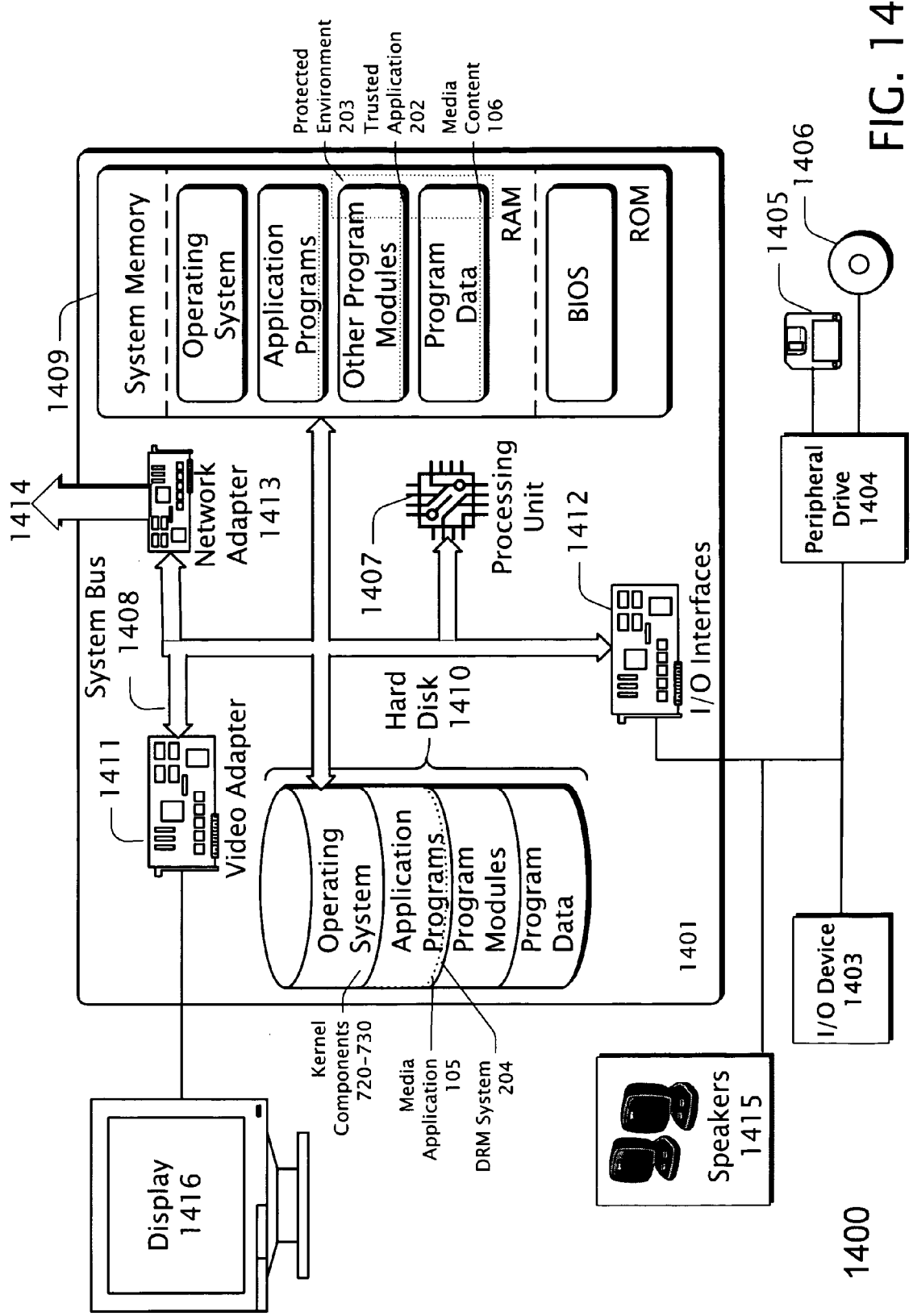
FIG. 14 is a block diagram showing an exemplary computing environment in which the processes, systems and methods for establishing a secure computing environment including a protected environment may be implemented.

FIG. 14 is a block diagram showing an exemplary computing environment 1400 in which the processes, systems and methods for establishing a secure computing environment including a protected environment 203 may be implemented. Exemplary personal computer 1400 is only one example of a computing system or device that may provide secure computing environment and/or a protected environment and is not intended to limit the examples described in this application to this particular computing environment or device type.

A suitable computing environment can be implemented with numerous other general purpose or special purpose systems. Examples of well known systems may include, but are not limited to, personal computers ("PC") 1400, hand-held or laptop devices, microprocessor-based systems, multiprocessor systems, set top boxes, programmable consumer electronics, gaming consoles, consumer electronic devices, cellular telephones, PDAs, and the like.

The PC 1400 includes a general-purpose computing system in the form of a computing device 1401 couple to various peripheral devices 1403, 1404, 1415, 1416 and the like. The components of computing device 1401 may include one or more processors (including CPUs, GPUs, microprocessors and the like) 1407, a system memory 1409, and a system bus 1408 that couples the various system components. Processor 1407 processes various computer executable instructions to control the operation of computing device 1401 and to communicate with other electronic and/or computing devices (not shown) via various communications connections such as a network connection 1414 an the like. The system bus 1408 represents any number of several types of bus structures, including a memory bus or memory controller, a peripheral bus, an accelerated graphics port, and/or a processor or local bus using any of a variety of bus architectures.

The system memory 1409 may include computer readable media in the form of volatile memory, such as random access memory (RAM), and/or non-volatile memory, such as read only memory (ROM). A basic input/output system (BIOS) may be stored in ROM. RAM typically contains data and/or program modules that are immediately accessible to and/or presently operated on by one or more of the processors 1407. By way of example, shown loaded in system memory for operation is a trusted application 202 utilizing a protected environment 203 and the media content being processed 106.

Mass storage devices 1404 and 1410 may be coupled to the computing device 1401 or incorporated into the computing device 1401 by coupling to the system bus. Such mass storage devices 1404 and 1410 may include a magnetic disk drive which reads from and writes to a removable, non volatile magnetic disk (e.g., a "floppy disk") 1405, and/or an optical disk drive that reads from and/or writes to a non-volatile optical disk such as a CD ROM, DVD ROM or the like 1406. Computer readable media 1405 and 1406 typically embody computer readable instructions, data structures, program modules and the like supplied on floppy disks, CDs, DVDs, portable memory sticks and the like.

Any number of program programs or modules may be stored on the hard disk 1410, other mass storage devices 1404, and system memory 1409 (typically limited by available space) including, by way of example, an operating system(s), one or more application programs, other program modules, and/or program data. Each of such operating system, application program, other program modules and program data (or some combination thereof) may include an embodiment of the systems and methods described herein. Kernel components 720-730 may be stored on the disk 1410 along with other operating system code. Media application 105 and/or a digital rights management system 204 may be stored on the disk 1410 along with other application programs. These components 720-730 and applications 105, 204 may be loaded into system memory 1409 and made operational.

A display device 1416 may be coupled to the system bus 1408 via an interface, such as a video adapter 1411. A user can interface with computing device 1400 via any number of different input devices 1403 such as a keyboard, pointing device, joystick, game pad, serial port, and/or the like. These and other input devices may be coupled to the processors 1407 via input/output interfaces 1412 that may be coupled to the system bus 1408, and may be coupled by other interface and bus structures, such as a parallel port(s), game port(s), and/or a universal serial bus (USB) and the like.

Computing device 1400 may operate in a networked environment using communications connections to one or more remote computers and/or devices through one or more local area networks (LANs), wide area networks (WANs), the Internet, radio links, optical links and the like. The computing device 1400 may be coupled to a network via a network adapter 1413 or alternatively via a modem, DSL, ISDN interface or the like.

Communications connection 1414 is an example of communications media. Communications media typically embody computer readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media include wired media such as a wired network or direct-wired connection, and wireless media such as acoustic, radio frequency, infrared, and other wireless media.

Those skilled in the art will realize that storage devices utilized to store computer-readable program instructions can be distributed across a network. For example a remote computer or device may store an example of the system described as software. A local or terminal computer or device may access the remote computer(s) or device(s) and download a part or all of the software to run a program(s). Alternatively the local computer may download pieces of the software as needed, or distributively process the software by executing some of the software instructions at the local terminal and some at remote computers and/or devices.

Those skilled in the art will also realize that by utilizing conventional techniques known to those skilled in the art that all, or a portion, of the software instructions may be carried out by a dedicated electronic circuit such as a digital signal processor ("DSP"), programmable logic array ("PLA"), discrete circuits, or the like. The term electronic apparatus as used herein includes computing devices and consumer electronic devices comprising any software and/or firmware and the like, and/or electronic devices or circuits comprising no software and/or firmware and the like.

The term computer readable medium may include system memory, hard disks, mass storage devices and their associated media, communications media, and the like.

Forming a Protected Computing Environment with Renewable and Individualized Elements Systems and methods for forming a protected environment such that it's elements or components can be renewed and/or individualized are described below.

Figure 15:
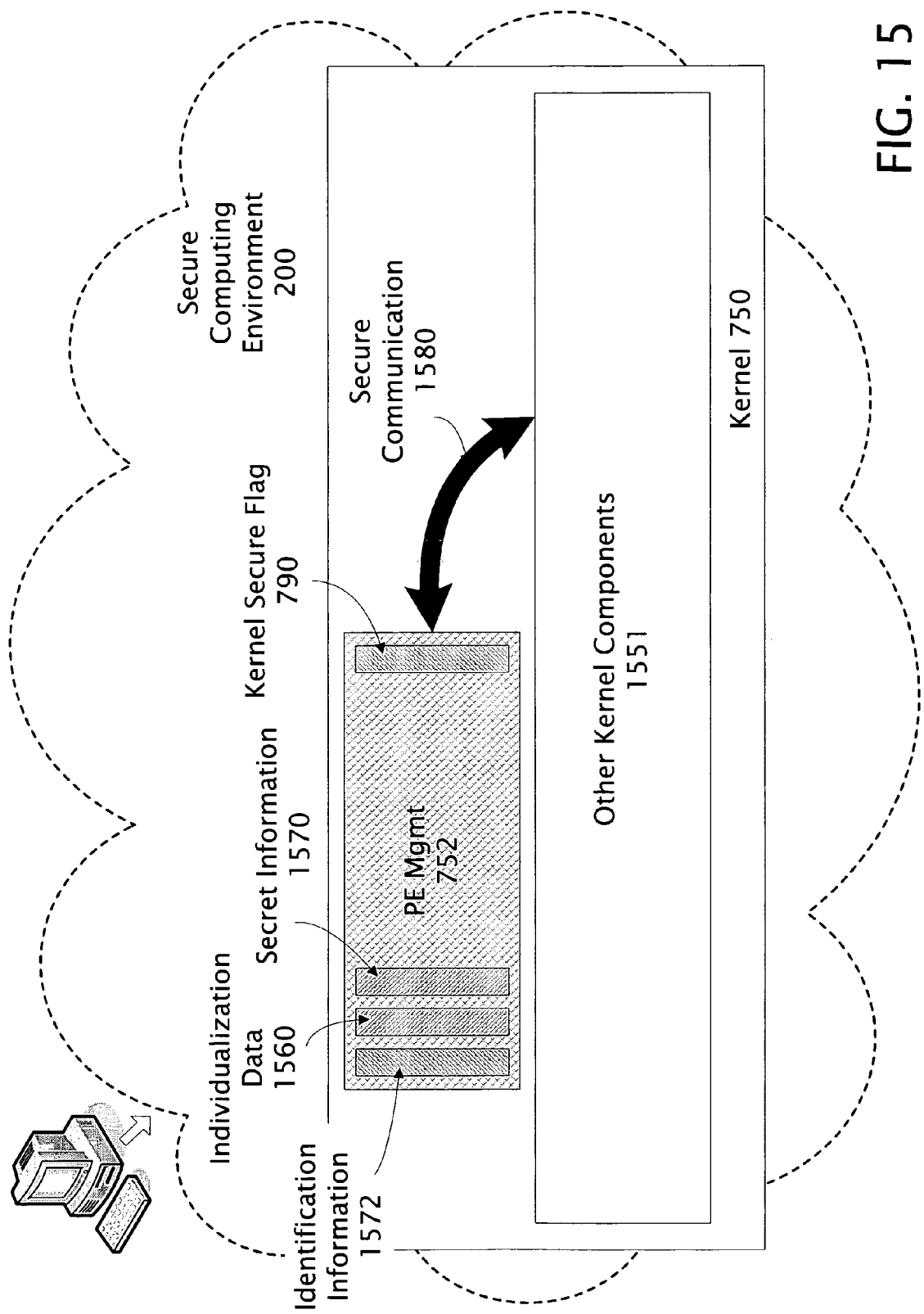
FIG. 15 is a block diagram showing an exemplary operating system kernel including a protected environment management portion of the kernel, separated out as a distinct element or component, along with the other kernel components that tend to be utilized in the creation and management of an exemplary secure computing environment.

FIG. 15 is a block diagram showing an exemplary operating system kernel including a protected environment ("PE") management portion 752 of the kernel 752, separated out as a distinct element or component, along with the other kernel components 1551 that tend to be utilized in the creation and management of an exemplary secure computing environment 200. The PE management component 752 may be renewable and/or individualizable and the other components or elements of the kernel 750 or the secure computing environment 200 may also be renewable and/or individualizable.

The PE management component 752 may play a primary role in the creation of a protected environment, the loading of application or other components into the protected environment and the maintenance and management of the protected environment. Further, the PE management component may monitor and track the security state of the kernel 750 and/or the computing environment 200 in addition to maintaining data, such as the secure kernel flag 790, and handling requests regarding the security state of the system. These functions may be performed in conjunction with other components of the kernel 1551 and/or the secure computing environment 200.

By separating out the PE management portion of the kernel 750 into a separate component 752 it may be easier to replace this individual component of the kernel should the need arise. One example of a reason to replace this component is if a security flaw is discovered after the PE management component 752 has been installed on a computer system or device. As the PE management component 752 may maintain secret security information 1570 and may provide functionality for creating and maintaining a protected environment, it may be an attractive target for attacks which may expose flaws. If the PE management component 752 were an integral part of the kernel, fixing such a flaw may necessitate replacing the entire kernel or operating system, a potentially costly and time consuming operation. Another example is if the functionality of the PE management component 752 could be updated to better protect against newly discovered threats. Once again, it may be easier and less expensive to replace this individual component 752 rather than the entire operating system or larger portions of it. Should it be necessary to replace the distinct PE management component 752, this may be done by revoking and renewing it as described below. Such revocation may involve disabling the component until is it renewed or replaced with another version.

The process of revoking and renewing a component, as described below, may also be applied to any other component or group of components of the kernel 750. Further, this process may be applied to any component or collection of components of the overall operating system or to the components of application software or other software installed on the system, or any combination thereof. Providing this revoking and renewing functionality in conjunction with the PE management component 752 of the kernel 750 may make it significantly easier and less expensive to quickly respond to discovered flaws and/or newly discovered security threats.

The structure, data and/or code of the PE management component 752 may be obfuscated, as indicated in the diagram by the hash marks. Such obfuscation may reduce the ability of an attacker to discover the secrets or other security information and mechanisms held within the component. Obfuscation may be performed using various methods including methods known to those skilled in the art and other relevant methods determined in the future.

The PE management component 752 in one embodiment may include the kernel secure flag 790. Maintaining this flag 790 and holding it securely within the PE management component 752 may restrict attackers from tampering with it or circumventing it so as to make an un-secure kernel appear to be secure. The kernel secure flag 790 may be obfuscated and/or encrypted, etc., within the PE management component 752 to further reduce unauthorized access to it.

The PE management component 752 may also include identification information 1572 that may be used for revocation and renewal, as described below. This identification information 1572 may include version information and/or other identifying information that may be used for comparison against a revocation list (FIG. 12, 754) or used as part of a revocation and renewability system or the like.

The PE management component 752 may also include additional secret information 1570 which may include private keys for use, among other things, in secure communications 1580 with other kernel components 1551 and/or with trusted applications operating within protected environments (FIG. 12, 608 and 202). The secret information 1570 may be obfuscated and/or encrypted, etc., within the PE management component 752 to reduce unauthorized access to it.

Should the PE management component 752 be loaded by an unauthorized component, instead of by the kernel 750 itself or one of its authorized components 1551, PE management 752 could be used inappropriately or bypassed altogether thus resulting in an un-secure system that appears to be secure. In order to reduce this possibility, the kernel 750 may send an authentication message to PE management 752 at the time the kernel 750 loads the PE management component 752. In one embodiment, this authentication message may include a timestamp and be signed using a private key held securely by the kernel 750. The PE management component 752 may be formed such that it will not provide access to the kernel secure flag 790 or other secret information 1570 it maintains unless it has received and verified this authentication message. In the case that the authentication message was not appropriately received and/or verified, it may not be possible to create a protected environment since it may not be possible to ensure the computing environment is secure. Therefore, applications or media content that require a protected environment may not be able to operate thus reducing the risk that media content, other data and/or the overall computing environment may be compromised.

The PE management component 752 may also include individualization data 1560. Upon initial installation of an operating system, kernel 750 or the PE management component 752 itself, the individualization data 1560 may be in the form of a generic or device certificate template (FIG. 24, 2412), as described below, that may be similar to or the same as other "out-of-the-box" versions installed on other computer systems or devices. When the user attempts to use protected media content or other protected data or applications that tend to require a protected environment, unique individualization data or a unique device certificate (FIG. 24, 2411) may also be required. In this case, system or device specific information, or a unique device ID, tends to be used in the creation of the unique individualization data, which may be provided in the form of a unique device certificate (FIG. 24, 2411) or the like. The creation of this unique device certificate may be accomplished using the systems and methods for individualizing elements of a protected computing environment described below.

An individualized version of PE management 752 with unique individualization data 1560, which may be in the form of a unique device certificate (FIG. 24, 2411), may be considered "bound" to the specific system or device from which the unique device ID originated. Alternatively, any component or element of the system or device may be similarly individualized and bound. This binding may be accomplished by forming the individualization data 1560, at least in part, based on system or device specific data or unique device ID. Such a binding between the PE management component 752 and a specific system or device may render that specific PE management component 752 useless on any other system or device. This being the case, it may not be possible for a user to copy their individualized, and possibly compromised, version of PE management 752 to a different system or device and provide a secure computing environment. Therefore, if an attacker were able to hack into their version of the PE management component 752 and compromise it, or access it's secret information 1570 or it's kernel secure flag 790, it is unlikely that the compromised version would provide a secure computing environment on any other system or device, thus reducing the risk of such security breaches spreading quickly.

Revoking and Renewing Elements of a Protected Computing Environment

The description below provides systems and methods for revoking and renewing elements of protected computing environments. An example of a revoking and renewing system and methods is provided in U.S. patent application Ser. No. 10/835,951, filed Apr. 30, 2004, which is hereby incorporated by reference in its entirety and described below.

Figure 16:
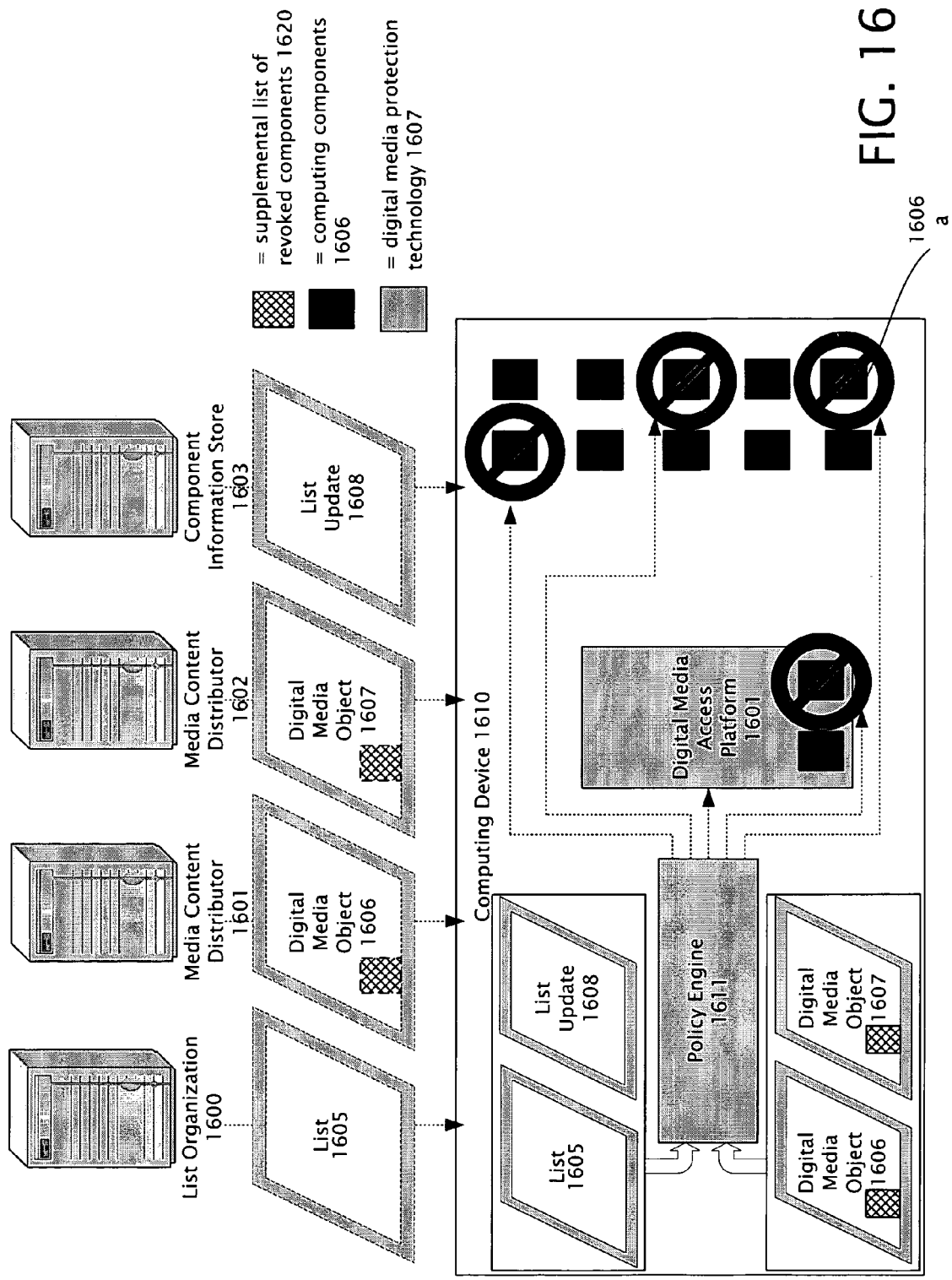
FIG. 16 is a block diagram showing an overview of revoking and renewing, with a list that is downloaded from a list organization to a computing device.

A block diagram showing many of the aspects of revoking and renewing elements of a protected environment and how they relate to one another is provided in FIG. 16. A list of computing components 1605 to be disabled can be distributed through a computer readable medium to computing devices such as 1610 that may access digital media objects 1606, 1607 and the like, which may be specific instances of media content (FIG. 1, 106). A process 1611 on these computing devices 1610 can read the list 1605 as well as any supplemental lists 1620 and disable the components on the lists 1605, 1620, e.g., component 1630. The process 1611 can ensure that all components 1660 specified on the lists 1605, 1620 are disabled prior exposing a digital media object, e.g., 1606 to the operation of such components. Lists 1605 and 1620 may be variations of revocation lists (FIG. 7, 714) and/or loaded revocation lists (FIG. 7, 754) as discussed previously. Computing device 1610 may be a PC or CE device (FIG. 2, 201) and provide a secure computing environment (FIG. 2, 200).

The list 1605 can provide for global revocation, or disabling of a component for all protected media objects, but it can also provide for more flexible revocation. Components 1660 on the list may be marked for temporary revocation, in which they are disabled for a limited time only. They can also be marked for content-specific revocation, in which they are disabled only when a particular type of media content is accessed, for example, music media objects. They can also be marked for media object-specific revocation, disabling only for access to a particular media object e.g., digital media object 1606, or media object source-specific revocation, disabling only for access of media objects from a particular source, e.g., media content distributor 1601. After disabling components as specified on the list 1605, as updated 1608, and with any supplemental lists 1620, a media object 1606, 1607 can be processed by the digital media access platform 1650 for use by applications and enjoyment of users in the usual way. These processes are left out of FIG. 16 for clarity of illustration.

In addition to flexible revocation, the list 1605 may provide for flexible distribution and updating. The list 1605 can be distributed and updated by an organization responsible for maintaining the list 1600. It can also be distributed or updated by other organizations with permission to do so 1603. A supplemental list 1620 may be provided by a digital media object 1606, 1607 that specifies a more or less stringent revocation policy for that object 1606 or 1607, or for other objects from the same source 1601 or 1602. A media object 1606 or 1607 may also specify a maximum age for the list 1605, requiring that a list 1605 used by a computing device 1610 has been updated within a specified time interval. This allows owners of digital media to control the stringency of media protection for their property e.g., 1606. Controls may be added to the list 1605 specifying which components 1660 may be revoked, and a type of revocation that is permitted from those allowed to update the list, e.g., 1601, 1602, 1603, and 1604.

Further, the process 1611 on a computing device 1610 that accesses the list 1605 may comprise functions for facilitating the use of the list 1605 and 1607, such as prompting updates to the list, informing users of component disabling, and prompting replacement of disabled components. Several techniques for prompting a user to update the list are provided, in addition to automatic and transparent updates. The process 1611 may also inform users prior to disabling a component 1630, and give users a choice of whether to disable a component 1630 or forego access to a media object 1606, 1607. The list 1605 may contain a Uniform Resource Locator ("URL") for replacing a component 1630, and the process 1611 may prompt users to visit the URL to replace a disabled component 1630.

The invention may utilize techniques for securely transmitting and storing the list 1605 to protect it from alteration by unauthorized entities. Secure data transmission and storage techniques are understood in the art, and the invention is not limited to any such technique, however an existing secure transmission technique, called the "secure clock" technique, is suggested for preferred embodiments. This technique comprises retrieving a secure clock time, T2, from a trusted source, e.g., 1603, and comparing it to a secure clock time stored with a list 1605, T1. If it is determined that an update is needed, T1 can be sent along with other identifying information to the trusted source 1603. The trusted source 1603 may then return a list update 1608 along with a new clock time, T3, and the original clock time, T1. T1 may then be verified by the recipient to determine if the trusted source 1603 was compromised.

Finally, techniques for certifying and identifying components 1660 are provided as an additional check on components 1660 and as a way to uniformly identify components 1660 for the list 1605. A unique identifier can be assigned to all components 1660. This identifier may be created by an owner or creator of a component. This person may then certify the unique identifier with an organization responsible for maintaining the list, by agreeing that the identifier used is truly unique, and that the component does not have properties that can be used to compromise digital media protection technology. This can be double-checked by the certifying organization, and the unique identifier may then be used to identify the component. If the component is determined to allow circumvention of digital media protection technology, its unique identifier can be listed and the component can be disabled as described below.

Disabling a component tends to refer to restricting or completely blocking the use of the component on a computing device. Disabling as used in this document may refer to a broad range of potential actions, unless the term is further limited to describe a particular kind of disabling. Disabling can be as drastic as permanent global disabling of a component for all purposes, such as erasing a software component from all forms of computer memory and prohibiting its reinstallation for any reason. Disabling can also be more unobtrusive, for example by temporarily restricting a component or a subset of component functions from engaging in specified actions for a limited time, or temporarily restricting a component from operating on a specified digital media object. The term disable and the term revoke tend to be synonymous herein.

Two types of revocation are frequently referred to in this specification. Global revocation, as used here, tends to refer to permanently revoking a component for all protected media objects. An object that has been globally revoked may no longer allowed to operate when any protected media object is accessed by the digital media access platform 1650. Limited revocation tends to refer to completely disabling a component while a particular media object is operated upon by a computing device, and subsequently allowing the component to resume normal functions. A component that is the subject of limited revocation may not be accessible for any purpose while a particular media object is manipulated by digital media access platform 1650, but after the media object is safely removed from active operations the component may be permitted its full range of normal operations. Limited revocation may also be referred to herein as exclusion.

A digital media object will be referred to occasionally as a media object. A digital media object may be a discrete digital representation of consumable media. Motion pictures, songs, books, essays, illustrations, photographs, and databases or useful collections of data are all capable of being stored digitally, and as such may take the form of digital media objects. A wide variety of digital file formats are available for such media objects, such as the familiar wave (".wav") and MPEG Audio Layer-3 (".mp3") format for songs, the document (".doc") and Rich Text Format (".rtf") for written documents, the .Tag Image File Format (".tiff") and Joint Photographic Experts Group (".jpeg") formats for digital images, and so on. In general, media objects are stored in some form of computer readable medium.

Various embodiments of a list suitable for use with the invention are provided in FIG. 17. Referring to FIG. 17, a list is shown in a table format. It will be understood that a table is not required, and instead components and any related information could be lumped into a single column or the like. The table provides a column for unique identifiers 1700, in which information used to uniquely identify components can be placed. Identifiers in the unique identifier column 1700 may also uniquely identify groups of components, for example any component from a particular source. The unique identifiers in FIG. 17 are illustrated as "Component A," 1701, "Component B," 1702, and so on. Strings of numbers, text, symbols, and so on can also be used, such as the string "Yu2#abc" 1704. In a preferred embodiment, Global Unique Identifiers ("GUIDs") 1705 can be used as unique identifiers of components for the list.

A revocation scope column 1710 can be provided that defines the revocation characteristics for the corresponding component. For example, a component may be marked for global revocation 1711, such as Component A 1701. Component B 1702 is marked for limited revocation 1712. Component C 1703 is marked for "media content type" revocation 1713. Imagine, for example, that Component C actually uniquely identifies a class of media objects, for example, movies, or music files, or files stored in a jpeg format. A revocation may be applied to such a class using a media content type revocation 1713. The Yu2#abc 1704 component is marked for media source type revocation 1714. This revocation 1714 can be used to disable the corresponding component 1704 for all media objects from a specified source. Finally, any other type of revocation 1715 can be identified in the revocation scope column 1710. There may be many revocation nuances that are contrived for various situations, and any such nuances can be specified in one or more revocation scope 1710 columns.

A renewal URL column 1720 may be provided to provide information for renewing components that are marked for global revocation. While FIG. 17 uses the familiar World Wide Web ("www") URLs to suggest locations for replacement components, any location may be specified in such a column, including an intranet or network location, or even a telephone number or street address. The purpose of such a column 1720 tends to be to facilitate accessing replacement components for users of computing devices that are subject to component revocation.

An internet location may provide a convenient way to replace software components that have been globally revoked. For example, a URL in the renewal URL column 1720 may specify an internet location for a list organization such as 1600 from FIG. 16 that was responsible for revoking a component. This is suggested by element 1721 in FIG. 17. The list organization (FIG. 16, 1600) can provide a new or replacement component, or can redirect the computing device to a location that is able to provide a new or replacement component. Likewise, the list may provide a direct link to a component developer, as in 1722, or a link to a media object owner or some other entity responsible for revoking a component, as suggested by 1724 and 1725.

Finally with regard to the columns of FIG. 17, any number of additional columns, x, y, z, and n may be provided to provide other useful information 1730 with regards to the components on the list. Some exemplary information that could be stored in such columns may include a plain English description of the component and its function. In a situation where the user of a computing device is prompted to revoke a component on the list, the user may benefit from the availability of such a description. Also, if multiple organizations are allowed to provide updates to the list, there may be certain components that are identified as only to be updated by a specific organization, such as the list organization (FIG. 16, 1600).

The list of FIG. 17 may also indicate a time of last update T1 1760. Because new discoveries regarding the security of components are constantly made, a recent revocation list may provide greater security than an old, or stale, revocation list. Even if the list does not change, content owners may want to be assured that the computing devices that replay their media objects bear the most up to date list.

The acceptable staleness of a list may be related to the value of the media object. Highest valued content—for example a high definition movie that has recently been released to the big-screen theaters market, may require a check for an updated list just before rendering the content. Medium valued content—for example standard definition movies that have recently been released to the DVD home-video market may require a list that is no more than one month old. Lower valued content—for example protected content that is also available in unprotected formats, such as "redbook audio" content, may never force a list update.

The list of FIG. 17 further includes a variation identifier 1750. The variation identifier may be used in updating the list and to provide easily accessible information about the properties of a list.

In lieu of providing a single master list that provides all component, revocation, replacement and other information, multiple lists can be provided. For example, in various preferred embodiments of the invention, a revocation scope column 1710 may be not employed. Instead, a global revocation list 1870 may be provided by an organization responsible for maintaining such a global revocation list 1870. A global revocation list 1870, shown on the left hand side of FIG. 18, contains only unique identifiers for components that will be globally revoked. Component A 1701, component D 1806, component E 1807, and so on are shown on the exemplary global revocation list 1870 and therefore are designated for global revocation.

Further, with respect to FIG. 18, any number of limited revocation lists, such as limited revocation list 1871, may be provided by owners and distributors of media objects. These may be provided, for example, as supplemental lists 1620 bundled with digital media objects 1606, 1607 as shown in FIG. 16. Limited revocation lists 1871 tend to contain only components that are designated for limited revocation. Therefore component B 1702, component M 1810, component N 1811 and component O 1812 are all shown as designated for limited revocation.

Bifurcation of the globally revoked components and the limited revoked components, as in FIG. 18, tends to allow for flexible and secure use of the invention. Global revocation of a component may have serious consequences for a computing device, and therefore it may not be advisable to allow global revocation powers to a broad group of actors. Limited revocation, however, tends to apply only to a media object that specifies components to be revoked for that object. Therefore limited revocation need not have consequences for a computing device beyond the replay of the particular media object for which the revocation is requested. By bifurcating global and limited revocation, a list organization (FIG. 16, 1600) can ensure a generally secure environment to prevent unauthorized access to most media objects, while media object owners and distributors can increase the security level for their own media objects without negatively affecting the normal functions of a computing device.

Figure 19:
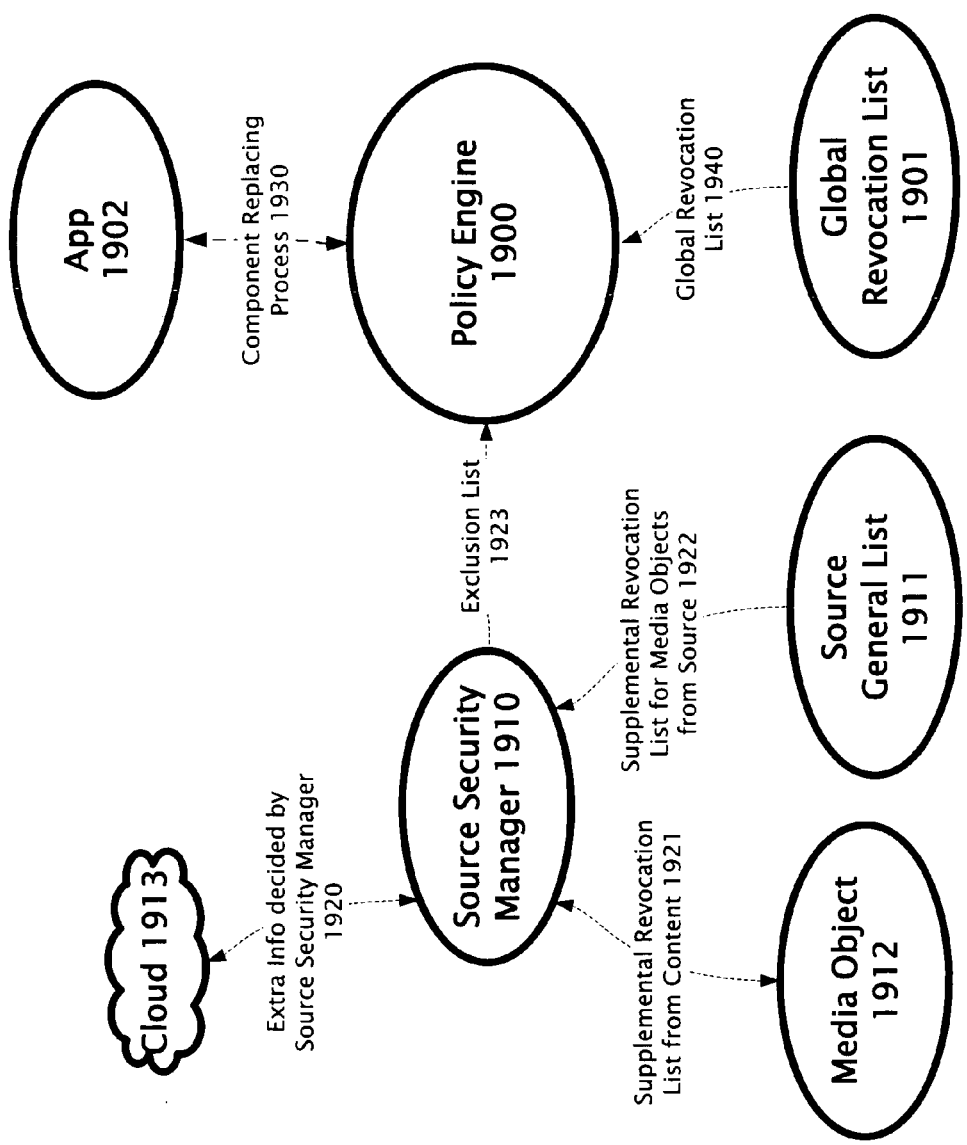
FIG. 19 is a block diagram showing an additional security feature in which media content owners can specify their own lists to be enforced alongside a global revocation list.

FIG. 19 is a block diagram showing an exemplary technique for enforcing the multiple lists of FIG. 18. FIG. 19 can be best understood by first referring briefly to FIG. 16. A list 1605, as updated 1608, along with any supplemental lists 1620 may be enforced by a policy engine 1611 or the like that disables the components, e.g., 1630 on the lists 1605, 1608, 1620. This can be done before a media object 1606 or 1607 is passed to the platform 1650, and thereby exposed to the operation of the various components 1660.

Content owners can provide a source security manager 1910 to ensure that components are revoked prior to allowing access to a media object 1912. The source security manager 1910 can be tailored to the needs of content owners. In this regard, it can read a supplemental list 1921 from a media object 1912. It can also read any additional lists, such as a source general list 1911 that specifies components to be disabled for all media objects from the source. Further, the source security manager can access other information 1920, as desired, to determine any other components that should be disabled prior to replay of a particular media object 1912. After a determination of all components to be disabled, an exclusion list 1923 can be passed to the general policy engine 1900 or the like.

The general policy engine 1900 can enforce the exclusion list 1923 as well as the global revocation list 1901 that applies to all media objects. It can interface with applications 1902, as necessary, to inform a user of a computing device of revoked components and to prompt a user to replace any components 1930. Alternatively this could be performed automatically without user intersection or awareness. Once the computing device is prepared to render a media object 1912, it can inform the source security manager 1910, and the source security manager may pass the media object 1912 to the policy engine or the like.

Figure 20:
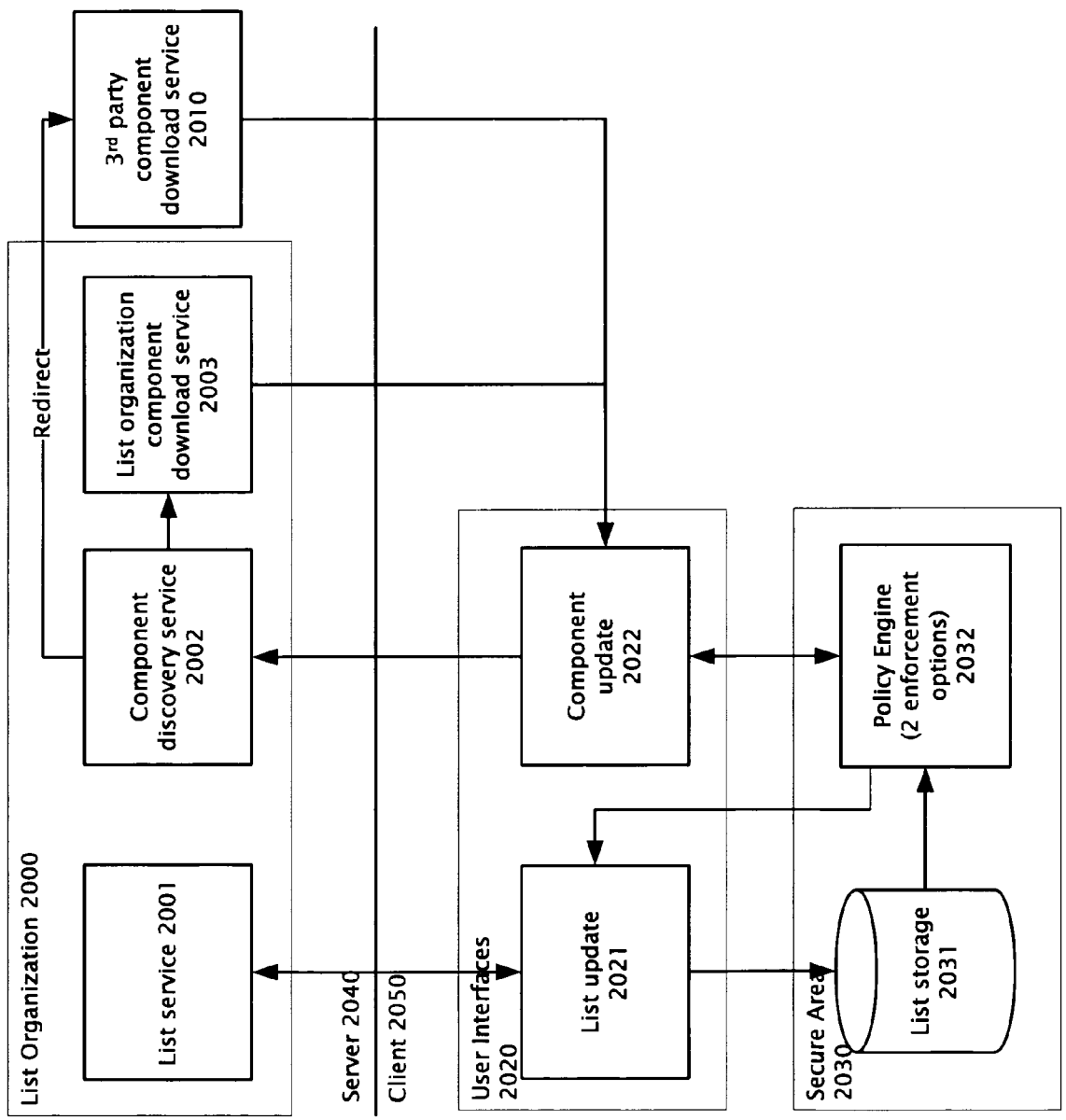
FIG. 20 is a block diagram showing an interaction between a client and server when a client retrieves updated lists, and also when a client retrieves replacement components for components that have been disabled or revoked.

Various functions of a policy engine 2032 are illustrated in FIG. 20. The policy engine 2032 may be responsible for reading and enforcing the component revocations specified on a global or a supplemental list. This tends to involve comparing any components on a list to each component that may interact with a media object. Two or more different enforcement experiences may be provided, depending on whether a listed component is optional or required for access to a desired media object. If a component is optional, the component update user interface can indicate it is disabled, the component transform can be excluded from the process and the media object can continue to play. If the component is required, the user may be notified, the component may be excluded from the process and the media object can be skipped, i.e., blocked from replay. After a replacement component is found and installed, the user may again attempt to access the desired media object.

Pursuant to enforcing the lists, a policy engine 2032 may also update the lists and the disabled components. These processes are illustrated in FIG. 20. Note that while any list may be updated by a policy engine 2032, in preferred embodiments media objects specify their own list of components to be excluded, and perhaps also a freshness level for a global revocation list. In such a configuration, only global revocation lists tend to be updated.

There may be a variety of ways to trigger a list update. In various embodiments, an operating system or device can periodically check for an updated global revocation list. Source security managers, which may also be referred to as source trust authorities, can also trigger an update by requiring an updated list. An update may be performed automatically, or a user can be provided with the option to refuse to check or update the global revocation list. If a user refuses to perform an update, content that requires an updated list may not play.

Once an update is triggered, the processes indicated in FIG. 20 can take place. First, the policy engine 2032 can initiate a list update UI 2021. This can inform the user of a computing device that a list update is pending, and provide an opportunity to decline the update. The user may be allowed to specify how and when they want to update a list. For example, the user may specify to never check for updates, or to check for updates periodically and notify the user. In this latter case, a search for an updated list from the list organization 2000 list service web site 2001 or the like can be made when the device is online. If a new list is available, an icon may appear on the user's desktop indicating a new list is available. A user may also be allowed to specify automatic updates to the list. When the device is online, an updated list, if one is available, can be automatically downloaded from the list organization 2000 list service web site 2001 or the like. Updates can be securely stored in the list storage 2031.

Components that have been placed on a global revocation list may be replaced by the policy engine 2032 or the like by launching a replacement UI 2022 for a user of a computing device. The UI can notify a user that a component is revoked. It may also provide further information to the user, describing when a component was revoked, the revoked component name, who revoked the component, and whether the revocation was global, limited, or for all content from a specified source. A user may further be informed of whether a component is necessary for a media session, the location to replace the revoked component, and so on. In this regard, an 'update now' and a 'more info' button can be a part of the UI. 'More info' can take a user to a web page or the like that describes the problem and the steps a user can take to resolve it. 'Update now' can take a user to a download experience to replace the component. Alternatively, a component may be replaced automatically without user input or awareness. The terms replaced and renewed may be used synonymously in this context.

The download experience can first access a component discovery service 2002. This service 2002 can use the unique identifier from a list to determine which components are to be replaced. Once such a determination is made, the service may download a replacement component directly to the client 2050 through a list organization component download service 2003. Otherwise, the list organization may redirect the client 2050 to a third party component download service 2010. By maintaining a list of the locations where components are available, the list organization can ensure that the client 2050 is not directed to out of date or incorrect internet locations. Upon completion of the component download or renewing process, the component update UI 2022 can prompt the user to install the replacement component, or the replacement component can be automatically installed by the policy engine 2032 or the like.

In connection with the download of updated lists, note that updates to lists may come from any source, not only a centralized list organization. In this regard, FIG. 16 shows a list update 1608 coming from a separate component information store 1603. This separation of the list originator 1600 and the list updater 1603 in FIG. 16 is intended to suggest that list updates may come from any trusted source. However, in preferred embodiments it may be more efficient for a single organization, such as 1600, to both originate and update the list 1605.

Various preferred embodiments will provide for secure transmission and storage of a list to prevent tampering. If a list is tampered, components that should be disabled may not be, thereby compromising the security of the media objects, other data and/or the overall system that the invention is designed to protect. Also, as new information is discovered, potential security loopholes may be discovered, and so updates to a list may be made available periodically. These updates should be secure to prevent tampering. Such updates may be available at any interval, although experience has shown that monthly updates provide a satisfactory interval for a global revocation list. If no new components are added to a list, a blank update or the like can be provided to client devices to satisfy freshness requirements of content owners.

Various techniques for securely transmitting and storing data are known in the art, and any such technique can be used. A preferred method for transmitting the list is known as the secure clock method. This method has the advantage of thwarting replay attacks, man-in-the-middle attacks, and clock rollback attacks. Using this technique, communication between a client 2110 and an update server 2100 engages in the process shown in FIG. 21. First, a client computing device 2110 tends to retrieve the last update clock T1 for a current global revocation list it has 2101. Next, client 2110 tends to retrieve 2102 a current secure clock T2 from a list service secure clock service 2100. Next, client 2110 tends to compare T1 and T2 and determines 2103 whether it needs to send an update request to a list service update service 2100. Such a request, if sent, can include T1, a unique identifier such as a GUID to identify a global revocation list, and a client version number. The list service update service 2100 then tends to get the client's 2110 request and its current freshness clock T1. It tends to check if the global revocation list has been updated since T1 2105. If yes, the list service 2100 can prepare to send the latest global revocation list back to client 2110. If no, the list service 2100 can simply prepare to send a response string to identify empty update. The list service 2100 can also retrieve 2105 a current secure clock time T3. Client version, T1, T3 and the response can be signed together 2105 by the list service 2100 to prevent tampering. This signed package can be sent 2106 to client 2110.

When the client 2110 gets the response, it can check 2107 the response integrity and the clock times T1, T3 it contains. T3 should be greater that T2, and T1 and the client version should be same as the original values the client 2110 sent to the server 2100. This tends to be to prevent man-in-the-middle and clock rollback attacks. Finally, the client 2110 can update 2108 its global revocation list's last update clock to T3 and update 2108 the global revocation list itself if needed. Those of skill in the art will understand that other secure protocols and variations of the above protocol, and the like, are feasible and may be desirable in certain situations to provide for the secure update of a list.

Note the use of a client version number. This allows a list service 2100 to update the distribution mechanism for future distributions to client 2110. For example, a list service 2100 may begin by only conducting complete or empty revocation lists to the client. But if later a list service 2100 determines that download of a full revocation list is too big, it may design a delta mechanism to send only a update portion of a global revocation list. If so, the new client 2110 can be assigned a different version number.

After successful transmission, the list may be stored in any appropriate location. If it is signed, it need not be stored in a secure location, because it can be verified every time it is accessed. Alternatively, it can be placed in a secure store that is not subject to file rollback attacks, to ensure that revoked components stay revoked.

The above description explains in detail various embodiments of a list, including various types and sources for lists and processes for enforcing and updating such lists. The following brief description will be directed to techniques for generating such a list by a list service, such as list service 1600 from FIG. 16. In general, this process comprises generating a unique identifier for components 1660 that may operate on a computing device in connection with media objects 1606, 1607. Additional features are provided whereby components can also be certified for safety by a list organization. In various preferred embodiments, only certified components may be allowed to operate in connection with media objects.

Figure 22:
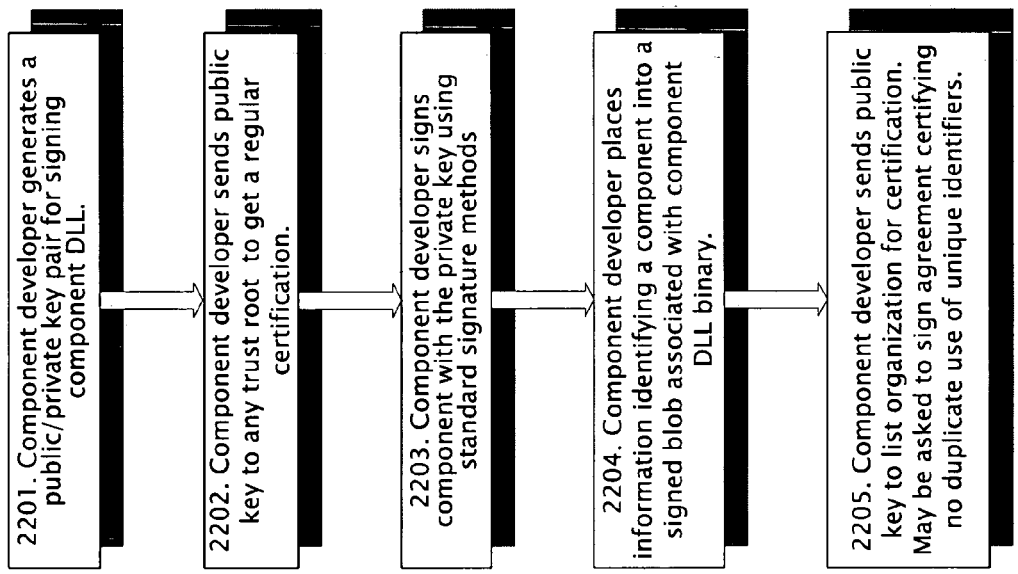
FIG. 22 is a block diagram showing an exemplary process for associating a unique identifier with a computing component.

FIG. 22 is a block diagram showing an exemplary procedure for how plug-ins (FIG. 16, 1660) can be associated with identification information that allows them to be loaded into a digital media platform (FIG. 16, 1650). In various preferred embodiments, no component is allowed to operate in connection with the digital media platform or the like unless it has been certified by a list organization. A unique identifier is assigned to a component as part of the certification process, and this unique identifier can be matched against a revocation list. FIG. 22 therefore provides a certification process that allows component developers to get a certification and unique identifier for a developed component that they desire to make available for use with a digital media platform or the like.

First, the steps of FIG. 22 demonstrate that component developers can get a regular certificate for their component, and sign their component, by following exemplary steps 2201 through 2203. The component developer can generate a public/private key pair ($K1_{pub}$, $K1_{pri}$) for themselves 2201. Next, the component developer can send the public key $K1_{pub}$ to any trust root, for example VERISIGN®, to get a regular certification 2202. Next, the component developer can sign each of their components with the private key $K1_{pri}$ using standard signature methods 2203. This signature along with the certificate from 2202 generally allows users of the component to confirm that the component really belongs to the said component developer and that it has not been modified after it was created.

The above steps 2201 to 2203 may be recognizable from other contexts to those of skill in the art. After performing the above steps of 2201 to 2203, the further steps 2204 to 2205 may also be required prior to allowing a component to be loaded into a digital media platform or the like. As shown in step 2204, a developer may be required to place information identifying a component into a signed blob associated with the component, such as a Digital Link Library ("DLL") or the like. This blob could be, for example, an XML manifest. The identification information would preferably include a hash of the component, which confirms that the blob is really for an identified component. Other information included in the blob can be a unique identifier, such as a GUID, that is unique to the component, the developer's company name, and other useful information to associate with a component. Remember, the unique identifier will be used to identify a component for a revocation list. This unique identifier may contain any pattern, e.g., vendor name, public key, unique ID, as unique identifier information. Any information that is signed by a trusted root may be used for matching purposes. If desired, the component developer can use the same private key $K1_{pri}$, from step 2201 or a new private key $K2_{pri}$ to sign the identification blob.

Finally, the component developer can send the corresponding public key ($K1_{pub}$ or $K2_{pub}$) to a list organization for a separate certification 2205. At this point, the list organization may ask component developers to sign an agreement that the identification information provided is correct, that there will be no duplicate use of unique identifiers, and that the component abides by some common compliance rules designed to protect the digital content.

The policy engine (FIG. 16, 1611) or the like may trust the list organization. Therefore a certification 2205 from the list organization indicates to the policy engine that the certified component can be safely loaded in a digital media platform or the like and that the identification information does indeed belong to this component and has not been tampered with.

Figure 23:
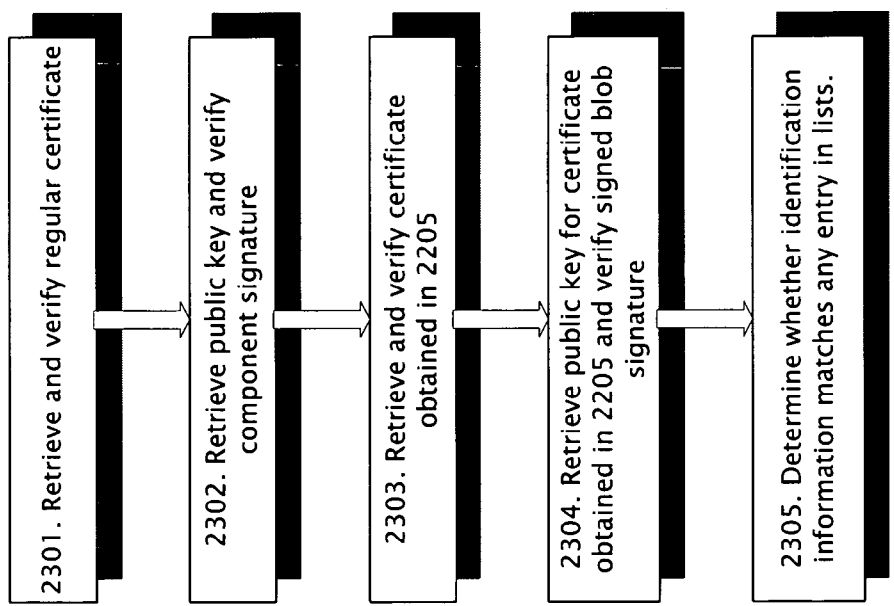
FIG. 23 is a block diagram showing an exemplary process for verifying a unique identifier assigned to a component.

FIG. 23 is a block diagram showing a process to verify that the information coming from component developers is correct. The steps of FIG. 23 can be carried out by software, digital logic or the like charged with enforcing a list, such as a policy engine or the like. First, the policy engine can retrieve the regular certificate obtained in 2202 from a component. It verifies the integrity of the certificate using standard methods 2301. Next, it can retrieve a component developer's public key from the certificate and uses the public key to verify the signature of a component 2302. At this point, if the verifications are successful, the policy engine has ensured that the component developer vouches for the component, and that the component has not been modified since that time.

In the subsequent steps of FIG. 23, the policy engine repeats steps 2301 and 2302 to verify the identification blob from 2204. Specifically, the policy engine can first retrieve the certificate obtained in 2205 and verify the integrity of that certificate using standard methods 2303. It can then retrieve the component developer's public key from the list organization certificate and use that public key to verify the signature on the identification information 2304. As mentioned earlier, the identification information blob preferably contains a hash of the component, which can be used to verify the blob. The policy engine or the like may retrieve this hash and then verifies that it matches the component, which in turn confirms that the identification information really corresponds to the component.

Finally, the policy engine can determine whether the identification information in the signed blob matches one of the entries in a revocation list 2305. This process can entail checking the unique identifier against both a global revocation list obtained from the list service and an exclusion list from a digital media object or the like. As mentioned earlier, the identification information can include a unique GUID, developer's company name, developer's public key etc. Each entry of the revocation list can have a pattern that matches one or more of these fields. This enables the list service or the digital media object to revoke a specific component (by GUID) or all components from a specific developer or all components signed with a specific key, and so on.

If the identification information of the component matches one of the entries of the revocation list then the policy engine may not allow the component to get access to the content of digital media object. This denial itself can be implemented using various mechanisms as will be appreciated by those of skill in the art.

To summarize the above description of disabling or revoking components to protect digital media, a list may be used to identify components that will be revoked. The list should be transmitted and stored securely. A trusted process can read the list and take responsibility for revoking the components thereon. Varying degrees of revocation may be specified. A global list can revoke components for all media objects, while any number of supplemental lists can enumerate components to be revoked only for subsets of media objects. The list may also provide information for a user interface that can inform users of revocations, updates to lists, and guide them through replacing or renewing disabled components.

Individualizing Elements of a Protected Computing Environment

The description below provides systems and methods for individualization of elements or components of a protected environment, including the creation of a unique device certificate, and associating that unique device certificate to a device, system or software component to provide for individualization. By building a consumer electronics devices, systems or software components with a template a unique device certificate can be generated at a later time. By making it possible to delay the generation of a device certificate the manufacturing process tends so be simplified. The template contains information that tends to be common to all devices in a manufacturer's product line, and allows the device, system or component to generate and/or be updated with a unique device certificate, utilizing an individualization process, after the manufacturing process has been completed. An example of an individualization system and methods is provided in U.S. patent application Ser. No. 11/018,095, filed Dec. 20, 2004, which is hereby incorporated by reference in its entirety and described below.

An individualized component is one that has been made unique through individualization, which is like receiving a unique security upgrade. Content providers may require their digital content to be played only on a system that has been individualized. During the individualization process, a certificate authority's individualization service or the like may generate a unique certificate that is bound to the component. Once the component has been individualized, a public/private key pair may be generated. The private key may be stored in the component that is generated in the individualization process. The corresponding public key may be used as the component's identifier when requesting a license and a clearinghouse may encrypt the license using this key. If the component is moved to another host, it may require another individualization. The license granted by the clearinghouse may not be transferable or usable on another system, such as a computer or consumer electronics device.

Individualization can reduce the damage caused by attacks because if the component on a system is compromised, only that system tends to be affected. However, this may introduce a difficulty concerning the portability of rights: for example, when a user wants to watch a movie at his friend's place or listen to music on his friend's portable device (PDAs, mobile phones, portable players, etc.), he may have to acquire a new license for each device to enable content consumption. To reduce the impact of the digital licensing process on the user experience, some solutions allow users to back up their licenses and restore them to another system. To prevent abuse, users can typically only do this a restricted number of times.

Figure 24:
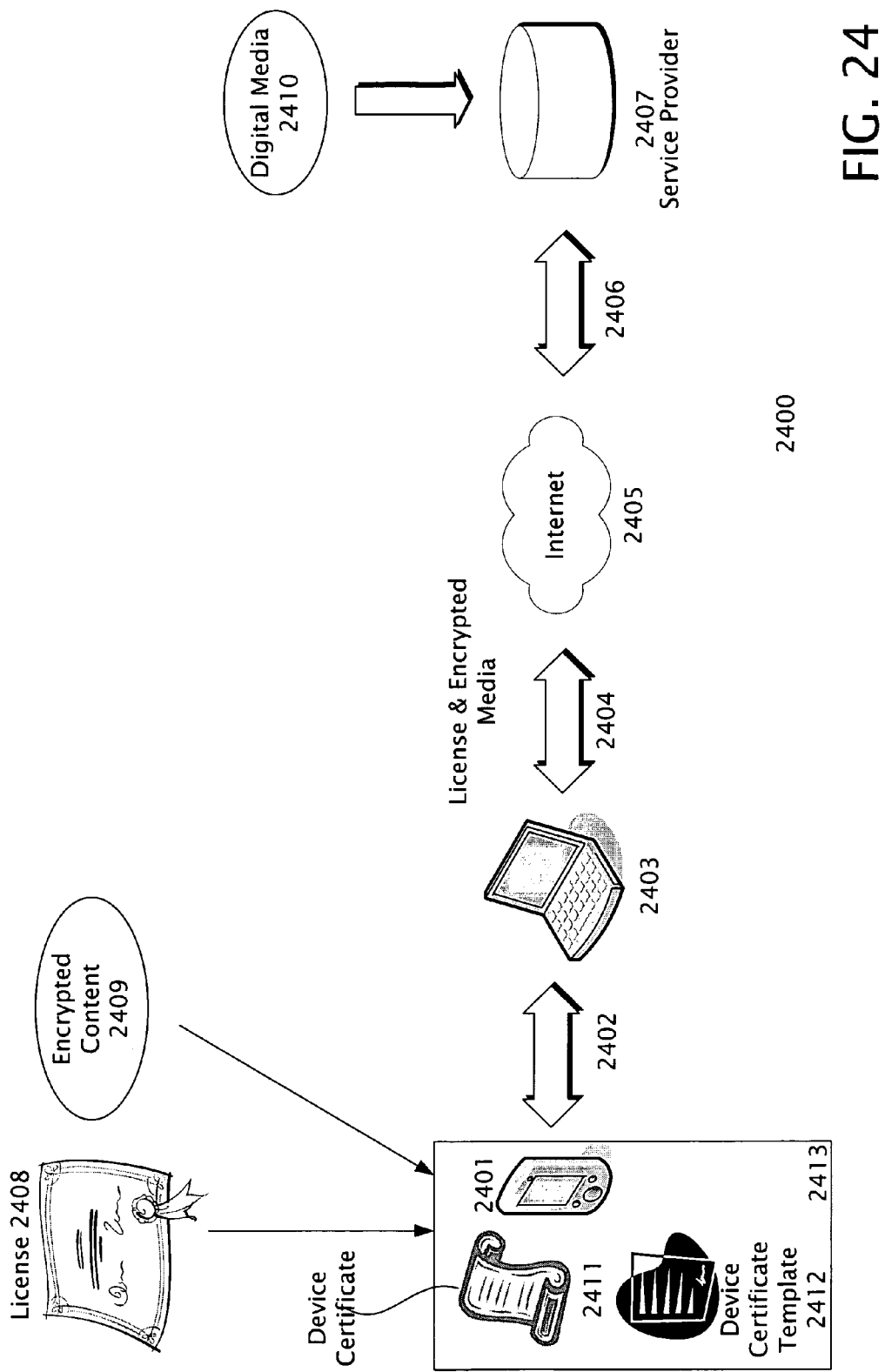
FIG. 24 is a block diagram showing a typical digital rights management system.

FIG. 24 is a block diagram showing a typical digital rights management system 2400. Digital rights management (DRM) tends to provide a system for defining, incorporating, and enforcing rights in digital media 2410, among other things. A DRM system 2400 tends to provide secure distribution of media content 2410 from a service provider 2407 over channels such as the Internet 2405, which may be insecure. The system 2400 can enforce usage rules and protect the multimedia content 2410 from being used illegally. Usage rules can include expiration dates, the number of times a user can play an audio or video file, and the number of times a user can copy an audio or video file and the like.

As an example, a personal computer 2403 may be used to connect to the internet 2405 and transfer content from the service provider 2407 to a consumer electronics device 2401. Protocols for transferring information to the PC 2403, and to the CE device 2401 over paths 2402 and 2404 may be achieved by conventional connections such as USB, infrared, Blue Tooth, MTP and the like. In alternative embodiments, a consumer electronics device may be coupled to a service provider without using the personal computer 2403. The personal computer and the CE devices may operate utilizing any number of suitable operating systems known to those skilled in the art. The instructions for implementing the functions described in this description may exist as software, hardware (for example instructions burned into an ASIC), or a combination of both.

In typical use, DRM 2400 tends to protect contents 2410 by providing encrypted data files 2409. Since files 2409 are encrypted, the data itself is protected. Thus, the files 2409 may be moved, archived, copied, or distributed without restriction. There is no need to hide files or make them inaccessible, or to put special protection in place when encrypted files are transmitted from system to system because copying a file and giving it to another will not enable them to use the file. In order to be able to use an encrypted file, a user must obtain a license 2408. This license 2408 is a way of exercising control over the encrypted file 2410. A license 2408 is typically granted to a single machine 2401, and even if copied, it will not tend to function on other systems.

Each license 2408 contains rights and restrictions, defining how the data in a file may be used, and under what conditions. For example, a music file license may contain a "right to play" but not a "right to burn to CD", and it might enable these rights for the period between Oct. 1, 2005 and Nov. 1, 2005. It is also possible that there will be multiple licenses for a file. As long as one of those licenses grants the needed right, the user will be able to access and use the file in the manner desired. Access may refer to cryptographically decrypting a file, gaining access to a file by password, and the like so that the consumer electronics device or system can view, play and otherwise use the content of the file.

In the described embodiments the license 2408 tends to work in conjunction with a device certificate 2411 that allows the encrypted content 2409 to be played on a consumer electronics device 2401 or the like. The file can also be viewed if the system provides video, or picture capabilities. Files for viewing or playback would typically include music files, picture files, video files, documents, and the like. In short, anything that a service provider wishes to transmit securely over a channel. The system identifies itself through a device certificate. This exemplary XML structure, or its equivalent, describes the CE device, lists supported features, and also contains the system's public key. The device certificate 2411 may be unique to an individual system, consumer electronics device, or the like. In the embodiments the unique device certificate 2411 tends to be generated from a device certificate template 2412 that is packaged 2413 with the consumer electronics device 2401, software component, or the like. The device certificate template may be considered a special pattern, guide or the like that aids in the creation of a unique device certificate.

Consumer electronic devices 2401, computer systems or other systems or the like that provide for usage or playback of content, data or the like may be referred to as digital rights management ("DRM") devices. Such devices may be part of a DRM system 2400 that controls the distribution of protected content 2409 and access to that content 2410, data, etc. DRM-enabled devices 2401 may contain an XML (or the equivalent of XML) object called a "Device Certificate" ("Dev Cert") 2411 which may be used to help ensure the security of DRM operations. Typically a device certificate can be provided in any format or data structure, including but not limited to XML. The device certificate 2411 may be unique to each CE device 2401 or component and is typically harder for a manufacturer to provide in the CE device 2401 component than a simple serial number or the like.

Device certificates 2411 are security devices that may be used in consumer electronics devices 2401 or components or the like to provide security by authenticating that a device 2401 or component is allowed to access protected content 2409. Device certificates are the credentials that are trusted and relied upon by an outside entity that may cause the entity to provide content to the CE device. Device certificates may also be used to validate or authorize a component for use in accessing content or data. Such automated device authentication may be used in systems 2400 designed for secure playback or use of protected media content or other data.

The exemplary device certificate 2411 may be an XML object that gathers together device identification, device capabilities claims, vital info, public key info, and the like and present the information in a single digitally signed device certificate or the like. A device certificate typically utilizes as a minimum a public key and a signature; other information included in the device certificate tends to be optional The device certificate 2411 may be signed by an OEM signing certificate (not shown), which may be a certification by the OEM that the device certificate 2411 is an accurate reflection of the device 2401 or component accompanying it, and perhaps by a third party content regulator certificate (not shown) which certifies that the OEM is authorized to create and certify DRM systems.

The embodiments described tend to solve manufacturing problems associated with generating unique and verifiable device certificates 2411 for each consumer electronics device 2401 in an OEMs product line, or for software components which may be installed on many systems. The embodiments tend to allow the manufacturer to ship an entire product line using a device certificate template 2412 which is typically identical for all systems in the product line. Using the template 2412, a device 2401 may automatically and securely self-individualize after manufacturing. In other words, the device creates a unique device certificate 2411 based on the template 2412 built into the device. Alternatively, individualization may be accomplished with the assistance of an individualization service distinct from but coupled to the device. The device 2401 may then access encrypted content 2409 when the proper license 2408 or individualized component is present.

The device certificate template 2412 may have the sections of a typical device certificate, but device specific sections tend to be empty. The template 2412 may be signed by the OEM or manufacturer and may include the third party content provider's own device authorization certificate. To create the device certificate 2411 from the device certificate template 2412 a process of device certificate individualization is initiated. Once the device certificate has been created, protected content may be access and utilized by the device.

FIG. 25 is a block diagram showing a conventional method of manufacturing consumer electronics devices, components or systems 2501, 2502, 2503 with complete device certificates 2504, 2505, 2506. Each device 2501, 2502, 2503 tends to be manufactured with a corresponding unique device certificate 2504, 2505, 2506. Each device certificate tends to be unique to the device or component with which it is shipped. Providing such a unique device certificate is typically an additional step that is needed in the manufacture of devices or components that tends to increase the cost and complexity of manufacturing.

Figure 26:
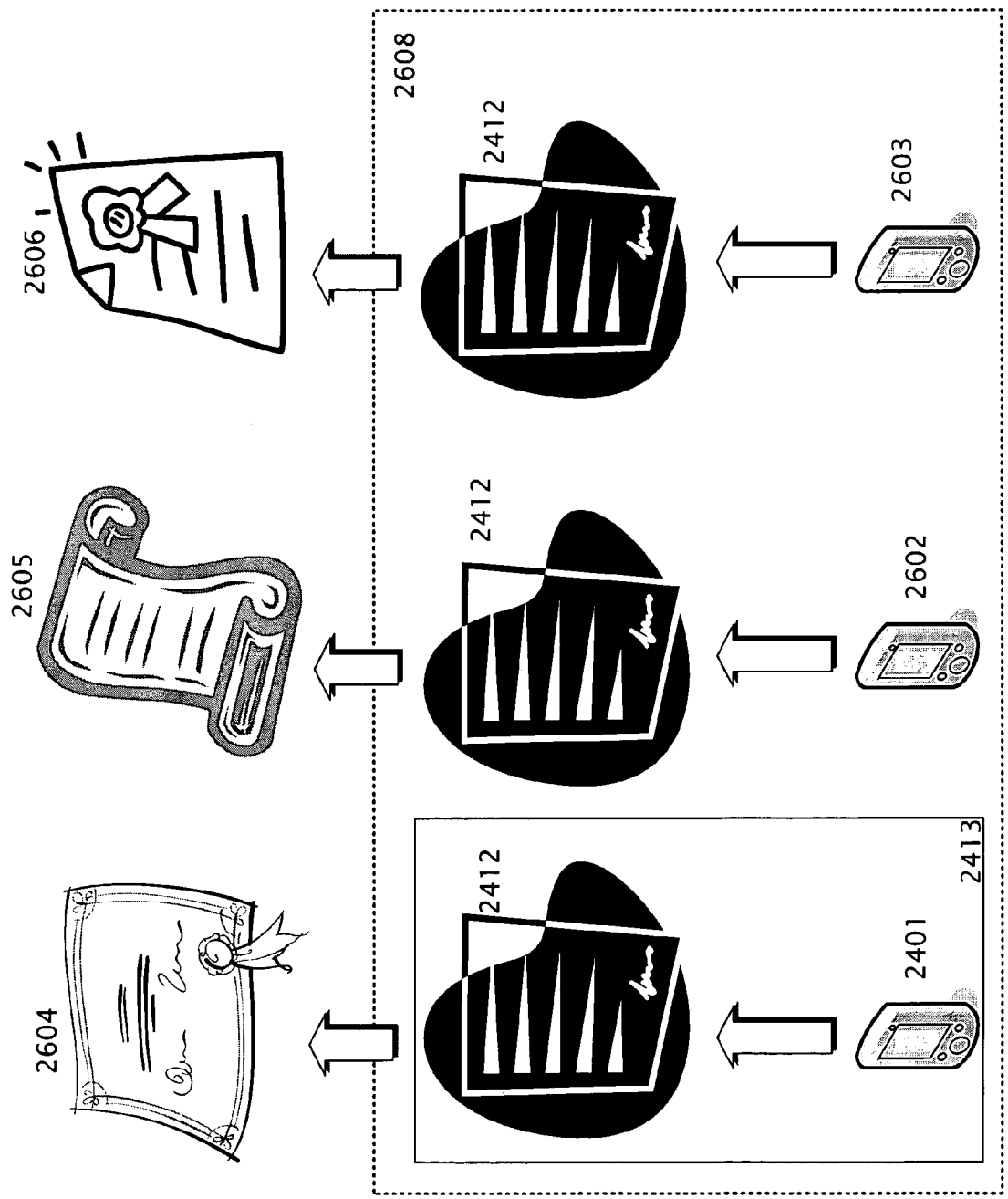
FIG. 26 is a block diagram showing a method of manufacturing devices, software components and the like with common device templates that enable the creation of unique device certificates at a later time.

FIG. 26 is a block diagram showing a method of manufacturing devices 2401, 2602, 2603, software components and the like with common device templates 2412 that enable the creation of unique device certificates 2604, 2605, 2606 at a later time. In the example shown any number of devices or components may be built in a production run, each typically with the same device certificate template 2412. Loading each device or component with the same template may aid the manufacturing process by allowing the device certificate to be created at a later time by modifying the common template.

Figure 27:
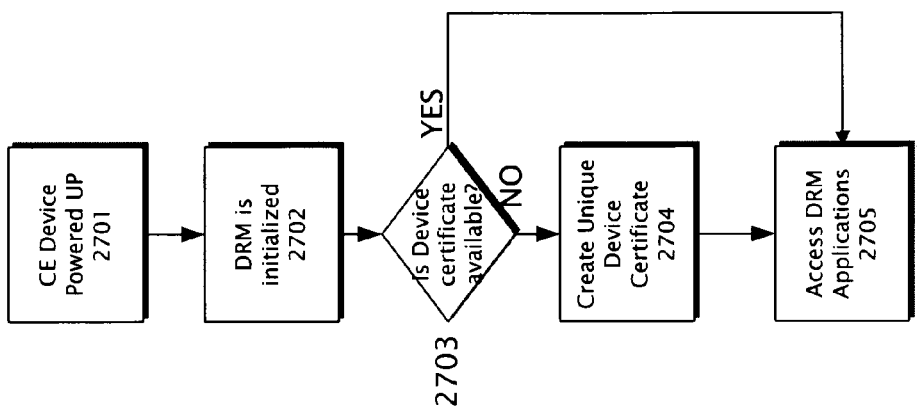
FIG. 27 is a block diagram showing a device certificate individualization or initialization process that may transform the device certificate template into a unique device certificate.

FIG. 27 is a block diagram showing a device certificate individualization or initialization process that may transform the device certificate template into a unique device certificate. Device certificate individualization may occur after the device or component has been installed and/or shipped, and typically creates the device certificate before DRM content is accessed. Non-DRM content typically will not initiate the self individualization process, since a device certificate is typically not needed to access non-DRM content. If the device is compromised, device certificate individualization may be repeated after wiping out old device certificate. However the device may also need to get an updated template from the manufacturer or service, because the device certificate is based on a template. If the device certificate is revoked, a new device certificate from the old template may also be revoked.

At block 2701 the CE device is powered up. Power up, or in alternative embodiments an attempt to access DRM protected content, may initiate the individualization process. At block 2702 DRM is initialized. At block 2703, if the device certificate is available, the process skips to block 2705. If the device certificate is not available at block 2703 the process continues to block 2704.

At block 2704 a unique device certificate is created. And finally at block 2705 the DRM content is accessed.

Figure 28:
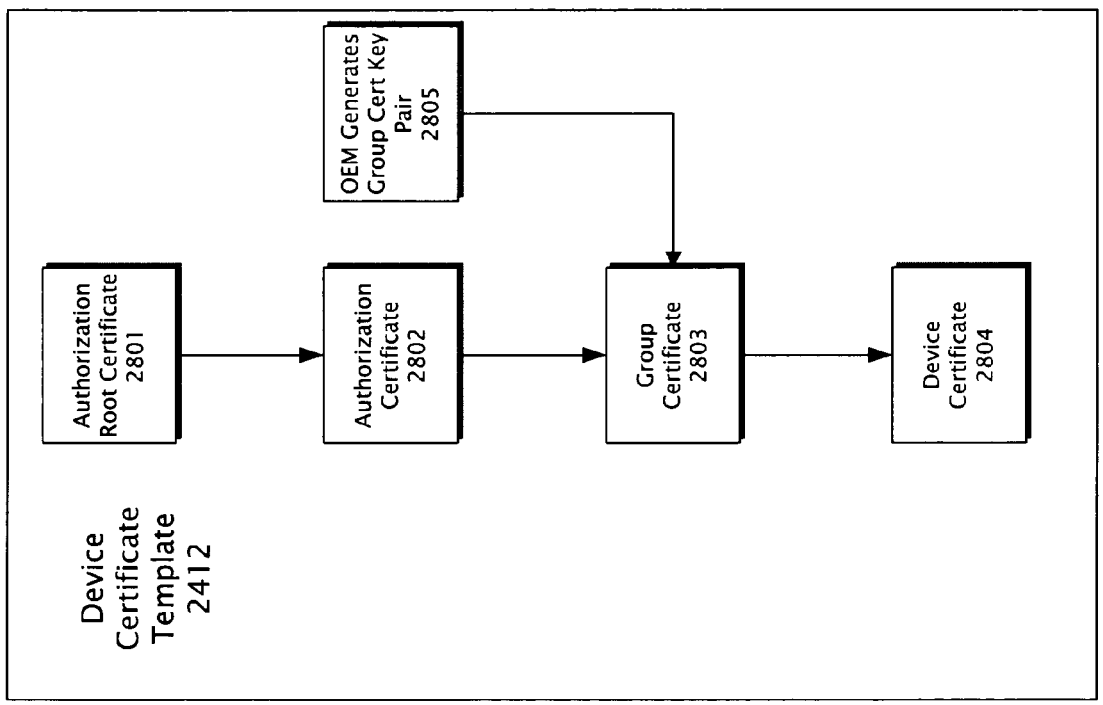
FIG. 28 is a block diagram showing the sections that tend to make up the device certificate template.

FIG. 28 is a block diagram showing the sections that tend to make up the device certificate template 2412. A template as described would typically be stored in a memory of the consumer electronic device. Equivalently the template may be stored on other types of memories such as flash RAM ASICS, one or more floppy disks, optical disks, hard disks or other computer-readable medium and the like. The sections of the device certificate template work together to establish a route of trust so that the content provider has a reasonable expectation that the device or component including the template or a unique device certificate derived there from is valid and authorized for the intended use. For backwards compatibility, or other purposes, more than one route of trust may be provided in the device certificate template.

In establishing a route of trust that is reflected in the device certificate template an OEM typically generates a public and private key pair which may be used in forming a device authorization certificate. The device authorization certificate ("DAC") generated by the OEM typically includes a private key that is stored in a secure location by the OEM. Also included is a public key that is typically sent to a certificate authority. The certificate authority verifies the OEM's DAC and returns an authorization root certificate and authorization certificate which are sent back to the OEM.

The OEM is typically equipped with a software tool from the certificate authority to generate a group certificate. The group certificate may include features of the device or component, limits and/or other metadata (manufacturer name, model number and the like). The OEM then signs this group certificate with the DAC private key. Including the AUTHORIZATION_ROOT certificate 2801, AUTHORIZATION certificate 2802 and the group certificate with the unsigned template allows the template to be generated and included with the device or component plus the group certification private key. After manufacture, a trigger, such as powering the device up, or attempting to access a file, will typically cause the device certificate to be generated from the template by filling out any needed information called for in the template and signing with the group certification private key. The trigger may be thought of as an initiating event, or a start command that starts the self individualization process or device certificate generation.

In establishing the route of trust each of the individual certificates in the device certificate establishes a route of trust that can be traced back to the OEM. If need be individual certificates can be revoked, breaking the chain of trust.

The AUTHORIZATION_ROOT Certificate 2801 is a section contained in the device certificate template. This section typically contains the certificate authority's root certificate information. The certificate authority's root certificate is typically the highest level of authorization, and is issued by a certificate authority. Other certificates that make up the chain of trust may be based upon the authorization root certificate. In general, the root certificate contains an ID (Identifying whom are you certifying) and a public key which is being certified. This certificate is typically signed by the certificate authority's private key. The private key is typically stored in a secure location controlled by the certificate authority. A corresponding public key is typically stored in the device or component and used to verify the signature.

AUTHORIZATION Certificate: This section typically contains authorization to an OEM by the certificate authority to produce device certificates. The data section typically contains an authorization ID of the OEM, max security level of the device, and a public key to sign group certificates. This data section is typically signed using the certificate authority's private key. The corresponding public key is typically stored in the authorization root certificate.

GROUP Certificate: This data section typically contains device features which are identical for the entire product line such as name of device or component, manufacturer, etc. It contains a GROUP certificate public key which is in turn a basis of verifying the DEVICE certificate section. The corresponding private key is hidden on the device. The device certificate section is typically signed using this private key.

FIG. 29 shows an exemplary XML device certificate template. A device certificate template may be embodied in XML or some other form. An example of using XML to implement an authorization root certificate 2801 is shown. The authorization root certificate typically includes the public key. Also included in the device certificate template is the XML code that makes up the authorization certificate 2802. And above that, the XML code that makes up the group certificate 2803 is shown. Lastly the section of the XML encoded template that will be filled in to create a device certificate 2804 is shown at the top of the page. Provisions for backwards compatibility or legacy licensing 2901 may be included in the XML code.

The various sections that make up the device certificate template may appear in any order in the template, with the shown order being but one example. Also the device certificate template may be coded in a variety of languages or formats such as html, binary format and the like. In alternative embodiments it is also possible to load the template from a server or service, rather than having the manufacturer preload the template on the device or component.

FIG. 30 is a block diagram showing a process for device certificate individualization to create an exemplary unique device certificate. The process may utilize a challenge and response exchange between the device or system and a service provider. During this exchange security tends to be maintained by providing an exchange of keys having an intermediate security level. The keys having the intermediate security level are typically used to initiate the process and "bootstrap" the verification process up to a higher security level.

In order to provide the unique device certificate or "Unique Dev-cert" an individualization process is typically used to create the unique device certificate (FIG. 27, 2704). Beginning an exemplary process, at block 3003 the device or system constructs a device certificate challenge by gathering device specific info at block 3002 and a signed device certificate template at block 3001. The device certificate template 2412 provided to this block may be as previously described and may include an authorization certificate from the service provider, device information (manufacturer, model, version and the like), template field confirming a template is provided, a URL to which the device certificate challenge should be sent, a public key used to encrypt device private data in the device certificate challenge, and a digital signature for the data portion of the template. The device specific information may include information that is unique to the device or component that is seeking to have its device certificate formed, and may also be known as the "unique device ID". In one embodiment, device specific information may include an identification string based on a device serial number or other unique system information.

At block 3004 this unique information from the challenge is sent to a server (or "Dev-cert indiv server") or the like that may be operated by the OEM of the device or component. The data sent to the server is typically private and protected. The server typically validates the incoming challenge and creates the unique device certificate "Unique Dev-cert" at block 3005 based on the challenge data. A response, including the device certificate that has been created, is returned to the device ("Dev-cert response") at block 3006. At block 3007 the device validates the received response. At block 3008 the device or system stores the device certificate that has been created. In one embodiment, storage of the unique device certificate may include updating a component with the unique device certificate, such as the PE management component (FIG. 15, 752) shown in FIG. 15.

Figure 31:
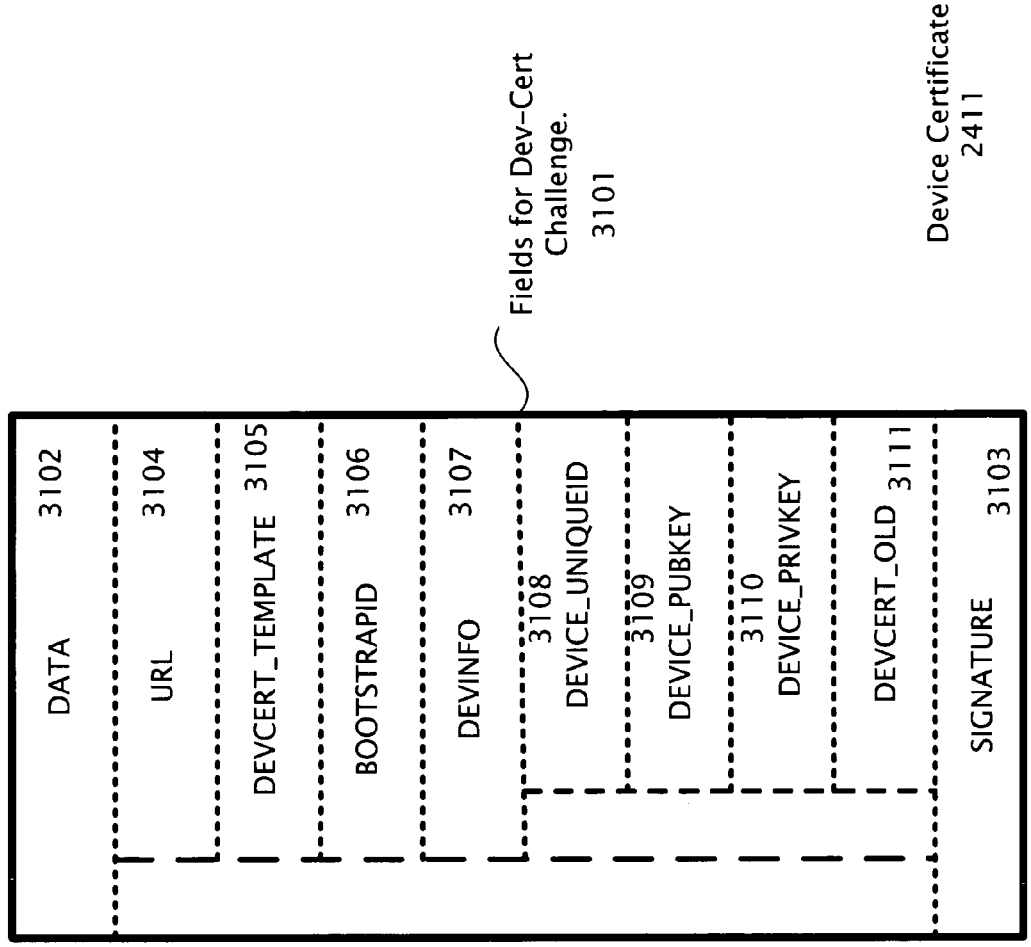
FIG. 31 is a block diagram showing the sections that make up an exemplary device certificate challenge used in the process of device certificate individualization.

FIG. 31 is a block diagram showing the sections that make up an exemplary device certificate challenge used in the process of device certificate individualization. The arrangement of sections in the device certificate may be varied, and the language or protocol used to encode the information in the various sections may vary as well. The Data section typically includes URL (3104), DEVCERT_TEMPLATE (3105), BOOTSTRAPID (3106) and DEVINFO (3107). The DEVINFO may contain DEVICE_UNIQUEID (3108), DEVICE_PUBKEY (3109), DEVICE_PRIVKEY (3110) and DEVCERT_OLD (3111).

The DATA section is shown at 3102. This data section or tag contains some or all of the data presented by the device certificate challenge. This tag is typically mandatory. Typically this data may include URL (3104), DEVCERT_TEMPLATE (3105), BOOTSTRAPID (3106) and DEVINFO (3107). The DEVINFO may contain DEVICE_UNIQUEID (3108), DEVICE_PUBKEY (3109), DEVICE_PRIVKEY (3110) and DEVCERT_OLD (3111).

The SIGNATURE section is shown at 3103. Typically the contents of the DATA section, including the strings <DATA> and </DATA> of dev-cert challenge are digitally signed by a BOOTSTRAP private key which is provided by OEM. This section also contains a digital signature that is typically mandatory.

The URL section is shown at 3104. In this section the URL that the device certificate challenge is to be sent to is typically recorded. It is generally stored in the clear (unencrypted). This URL may be taken from the device certificate template so that the application does not need to separately parse the device certificate template to get the URL. This tag may be mandatory. In an alternative embodiment the URL may be parsed from the device certificate template.

The DEVCERT_TEMPLATE section of the device certificate challenge is shown at 3105. A valid device certificate template provided in this section is typically signed by the OEM private key. This node may also be in the clear. This tag is typically mandatory.

The BOOTSTRAPID section of the device certificate challenge is shown at 3106. The Bootstrap ID is also typically provided by the OEM. The bootstrap ID is typically provided to help the server find the right key for verifying the dev-cert challenge signature. This node is typically in the clear. This tag may be mandatory.

The DEVINFO section of the device certificate challenge is shown at 3107. This section typically contains device specific private information which generally must be protected. The contents under this tag are typically encrypted using the Indiv server public key which is generally present in dev-cert template. This information may then be Base64 encoded. This tag is typically mandatory. This node may contain DEVICE_UNIQUEID (3108), DEVICE_PUBKEY (3109), DEVICE_PRIVKEY (3110) and DEVCERT_OLD (3111).

The DEVICE_UNIQUEID section of the device certificate challenge is shown at 3108. This section typically contains the unique device ID. This tag is typically mandatory.

The DEVICE_PUBKEY section of the device certificate challenge is shown at 3109. In the process of constructing the challenge, the device or system typically generates a public private key pair, and hides the private key as previously described. This section typically contains a Base 64 encoded device public key. Those skilled in the art will realize that other equivalent encodings may be provided. The public key is typically inserted, by the server or service, into the actual device unique device certificate. This public key may also be used by the server to encrypt the response returned to the device. This tag is typically mandatory.

The DEVICE_PRIVKEY section of the device certificate challenge is shown at 3110. This section may contain a base 64 encoded device private key. The device private key may be used by the server to encrypt an escrow key generated by the server. An escrow key typically encrypts any old keys present from the client. This tag is typically mandatory.

The DEVCERT_OLD section of the device certificate challenge is shown at 3111. This section typically contains an old "device unique dev-cert". This section is typically an optional tag. It may be included in case of re-individualization of the device so that the server can, among other things, extract the old key pairs from this device certificate and include them in a new device certificate.

Figure 32:
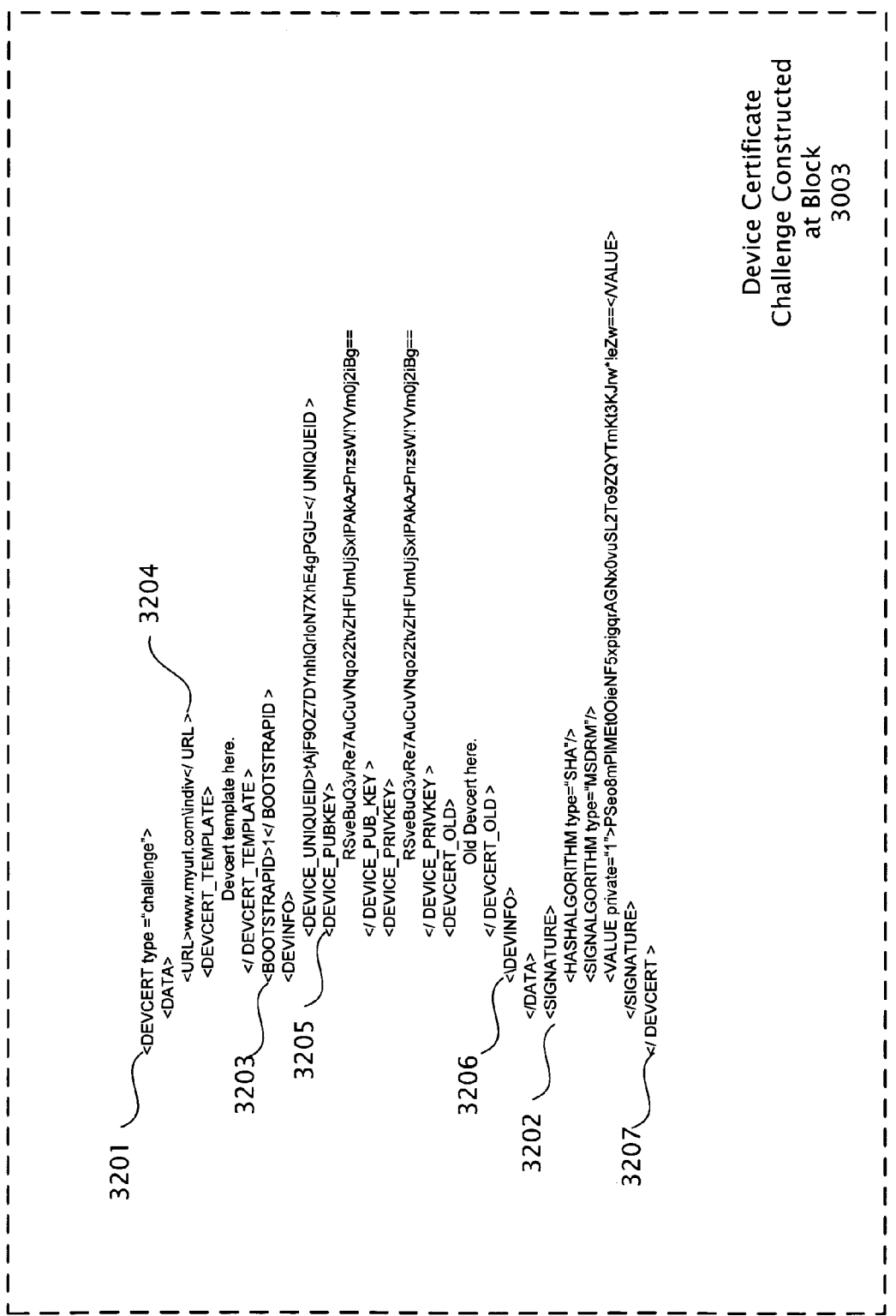
FIG. 32 shows an exemplary XML device certificate challenge.

FIG. 32 shows an exemplary XML device certificate challenge previously constructed at block (FIG. 30, 3003). In the example shown the device certificate coded in XML (or its equivalent) may be base 64 encoded. Alternatively other types of encoding may be performed to facilitate transmission of the device certificate challenge to the server or service. In further alternative embodiments encoding may not be performed.

When the server receives the challenge 3201, the server, identified by the supplied URL 3204, verifies the authenticity of the challenge by verifying the device challenge's digital signature 3202. The BOOTSTRAP ID 3203 typically allows the server to find the proper key for signature verification. The server also tends to verify the signature of the device certificate template 3205 that is included in the challenge. The server may then decode and decrypt the DEVINFO section 3206 to access the device specific information or unique device ID.

After gathering the device specific information, the device certificate challenge creates the actual device unique device certificate and includes this device certificate in the response 3207. To protect privacy, the device certificate response may be encrypted using the device public key. This encryption tends to ensure that the response can only be decrypted by the device or system from which device certificate challenge was received.

FIG. 33 shows an exemplary XML device certificate response. The device response is shown in HTML format. However, any suitable format and/or protocol may be used for the device certificate response.

The device certificate response may include the following fields. The error field ("ERROR") 3301 may be an optional field. Presence of the error field may indicate that the challenge sent to the server had some error in it that may be indicated by an error code.

The field DEVCERT_NEW 3302 typically contains the actual device unique device certificate produced by the exchanges made between the device or system and the service coupled to the device. As previously described a personal computer may be present between the device and the service provider or a personal computer may be the device.

When a device receives the device certificate response, it generally decodes and decrypts it. If an error field 3301 is present, the device may return the error code to the application. If the error tag is not present, it generally extracts the device certificate, verifies its signature, service provider authorization certificate, unique device id, device public key and all other sections of the device certificate. Then the device certificate is stored in the device or included with the component being individualized.

Figure 34:
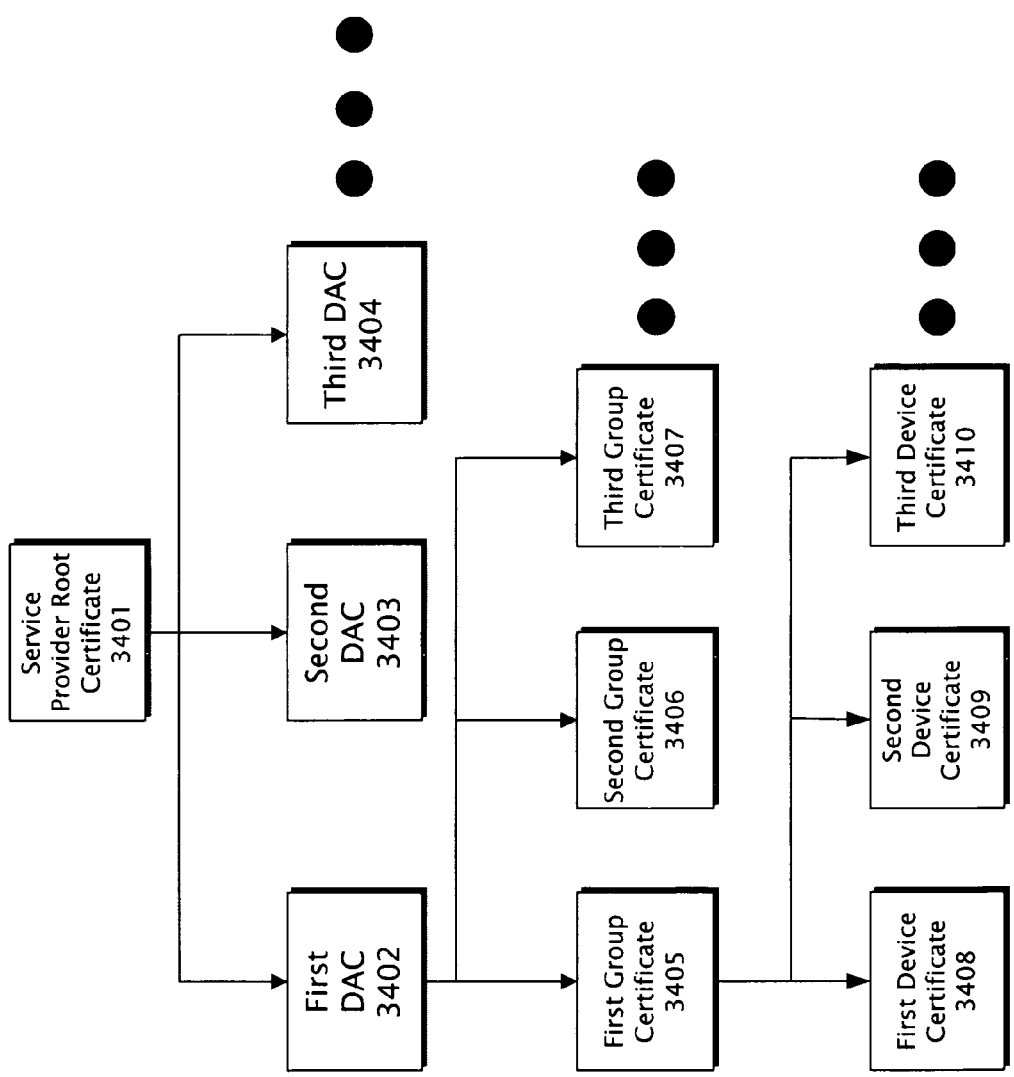
FIG. 34 is a block diagram showing a chain of trust structure that may be present in an embodiment of a device certificate template.

FIG. 34 is a block diagram showing a chain of trust structure 3400 that may be present in an embodiment of a device certificate template. In the chain of trust structure an authorization root certificate 3401 tends to generate numerous authorization certificates or DACs 3402, 3403, 3404 for individual OEMs. The DACS also may include a security level. Each horizontal level may be thought of as a link in the chain of trust as a path is traversed from top to bottom. Each link typically has a certificate associated with it to establish the validity of the link, and couple it to the previous and following link. For example blocks 3401, 3402, 3405, and 3408 may be thought of as links going from the authorization root link 3401 to the device certificate 3408. A device certificate template is typically formed by incorporating each link in the chain of trust in a section of fields that form the template.

From each DAC given to an OEM, that OEM can generate multiple group certificates 3405, 3406, 3407 for each model of device or each component produced by the OEM. Device certificates 3408, 3409, 3410 may be generated for each device built and tend to be based upon the group certificates. It may be possible to change the levels of security by adding or removing levels of group certificates. For example a level of device certificates can be added to differentiate production runs of a particular model of consumer electronics device.

The invention claimed is:

1. A method for providing a protected computing environment comprising:
    separating out a protected environment management component of a kernel from one or more other components of the kernel, wherein the protected environment management component of the kernel includes an obfuscated and encrypted version of a secure flag indicating whether the kernel is considered secure for the protected computing environment, and wherein the protected environment management component is configured to respond to one or more requests regarding a state of the secure flag;
    providing identification information as a part of the protected environment management component; and
    providing individualization information for an associated computing device as part of the protected environment management component, wherein the individualization information comprises an XML object configured to gather and present device identification information, device capability information, and key information, and wherein the XML object serves to bind the protected environment to the associated computing device to render the protected environment management component useless on a computing device other than the associated computing device, and wherein providing the individualization information comprises utilizing a template common to a plurality of computing devices to generate the individualization information for the associated computing device.

2. The method for providing a protected computing environment of claim 1, further comprising comparing the identification information against a revocation list.

3. The method for providing a protected computing environment of claim 1, in which the protected environment management component comprises secret information.

4. The method for providing a protected computing environment of claim 1, in which the protected environment management component's structure is obfuscated.

5. The method for providing a protected computing environment of claim 1, in which code embodying the protected environment management component is obfuscated.

6. The method for providing a protected computing environment of claim 1, in which the protected environment management component interacts with the kernel of the associated computing device at least in part via secure communications.

7. The method for providing a protected computing environment of claim 1, wherein the template is built into the associated computing device.

8. A method of establishing a protected environment within a device, the method comprising:
    validating a secure operating environment;
    indicating a security state of the secure operating environment by responding to one or more requests regarding a state of an obfuscated and encrypted secure flag maintained in a management component of a kernel of the device, the device comprising at least one processor and at least one system bus;
    establishing the protected environment;
    securely communicating between the secure operating environment and the protected environment at least in part by utilizing secret information, wherein access to the secret information is controlled by the management component of the kernel of the device, and wherein the management component is distinct from one or more other components of the kernel; and
    individualizing the management component at least in part by utilizing a device certificate template to generate a unique device certificate for the device, wherein the unique device certificate comprises an XML object configured to gather and present device identification information, device capability information, and key information, and wherein the unique device certificate serves to bind the management component to the device to render the management component useless on another device.

9. The method of claim 8, further comprising disabling functionality of the management component.

10. The method of claim 9, further comprising renewing the functionality of the management component.

11. The method of claim 8, further comprising periodically checking the security state of the secure operating environment.

12. The method of claim 8, wherein validating the secure operating environment provides an indication of the security state of the secure operating environment.

13. The method of claim 8, further comprising obfuscating code associated with the management component or the management component's structure.

14. The method of claim 8, wherein establishing the protected environment includes utilizing the identification information.

15. A system for providing a secure computing environment, the system comprising:
- a kernel of a device operating system of an associated device, the kernel comprising a protected environment management component, wherein the protected environment management component is distinct from other kernel components and is configured to track a security state of the kernel and the secure computing environment;
- identification information for the protected environment management component; and
- a device certificate template built into the associated device and comprising template information common to a plurality of computing devices;
- individualization information for the protected environment management component, wherein the individualization information is generated from the template information and is included in the protected environment management component of the kernel in the form of a unique device certificate that serves to bind the protected environment management component to the associated device, and wherein the unique device certificate comprises an XML object configured to gather and present device identification information, device capability information, and key information.

* * * * *

UNITED STATES PATENT AND TRADEMARK OFFICE
CERTIFICATE OF CORRECTION

PATENT NO. : 8,074,287 B2
APPLICATION NO. : 11/191448
DATED : December 6, 2011
INVENTOR(S) : Sumedh N. Barde et al.

It is certified that error appears in the above-identified patent and that said Letters Patent is hereby corrected as shown below:

In Title page, in Item (54), under "Title" column 1, line 2, after "PROTECTED" insert -- COMPUTING --.

In column 1, line 2, after "PROTECTED" insert -- COMPUTING --.

In column 1, line 6, delete "APPLICATION APPLICATIONS" and insert -- APPLICATIONS --, therefor.

Signed and Sealed this
Seventh Day of February, 2012

David J. Kappos
*Director of the United States Patent and Trademark Office*